United States Patent [19]

Waldron

[11] 4,427,896
[45] Jan. 24, 1984

[54] SYSTEM AND METHOD FOR OPERATING A STEAM TURBINE WITH CAPABILITY FOR BUMPLESSLY CHANGING THE SYSTEM CONFIGURATION ON-LINE BY MEANS OF SYSTEM PARAMETER CHANGES

[75] Inventor: Gerald E. Waldron, Pittsburgh, Pa.

[73] Assignee: Westinghouse Electric Corp., Pittsburgh, Pa.

[21] Appl. No.: 377,173

[22] Filed: Jul. 6, 1973

Related U.S. Application Data

[63] Continuation of Ser. No. 247,880, Apr. 26, 1972, abandoned.

[51] Int. Cl.$^2$ .............................................. H02P 9/04
[52] U.S. Cl. ................................ 290/40 R; 60/660; 364/494; 364/495
[58] Field of Search .................... 290/40, 40.2, 2; 60/105; 235/151.21; 364/492, 494, 495

[56] References Cited

U.S. PATENT DOCUMENTS

| | | | |
|---|---|---|---|
| 2,861,194 | 11/1958 | Bristol | 290/2 |
| 2,895,056 | 7/1959 | Bristol | 290/2 |
| 3,552,872 | 1/1971 | Giras et al. | 290/40 |
| 3,564,273 | 2/1971 | Cockrell | 290/40 |
| 3,588,265 | 6/1971 | Berry | 290/40 |
| 3,609,384 | 9/1971 | Strohmeyer | 290/40 |
| 3,643,437 | 2/1972 | Birnbaum | 60/105 |

Primary Examiner—Gene Z. Rubinson
Assistant Examiner—John W. Redman
Attorney, Agent, or Firm—E. F. Possessky

[57] ABSTRACT

A steam turbine is provided with an electrohydraulic control system having an automatic control which includes a digital computer and further having a manual backup control for operating the turbine on automatic or operator switchover to backup control. The automatic control includes control elements and logic elements associated with valve control loops coupled to the turbine and high and low limits and other constants, setpoints and other parameters are characteristic to these control and logic elements and the interrelations among them and the turbine. A switch arrangement is provided for generating parameter value signals corresponding to changed values for the system parameters and for coupling the parameter value signals to the automatic control system where they are registered. The automatic control system is structured to reject invalid parameter value changes and to register only those parameter value changes which can be validly entered as part of the system structure. Once the switch arrangement is activated to initiate a parameter change, the automatic control system bumplessly rejects to the manual backup control so that the control configuration can be restructured while on-line turbine operation continues without substantial interruption. Once the parameter change process is completed, return can be made to automatic operation.

11 Claims, 33 Drawing Figures

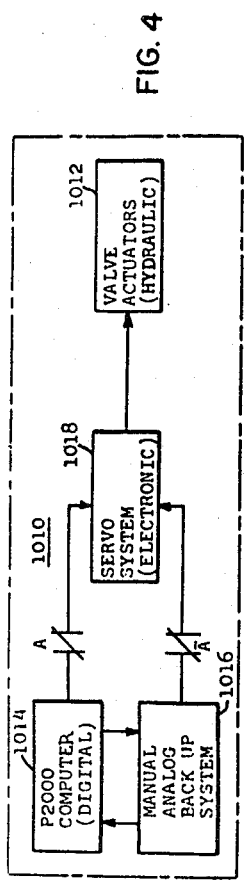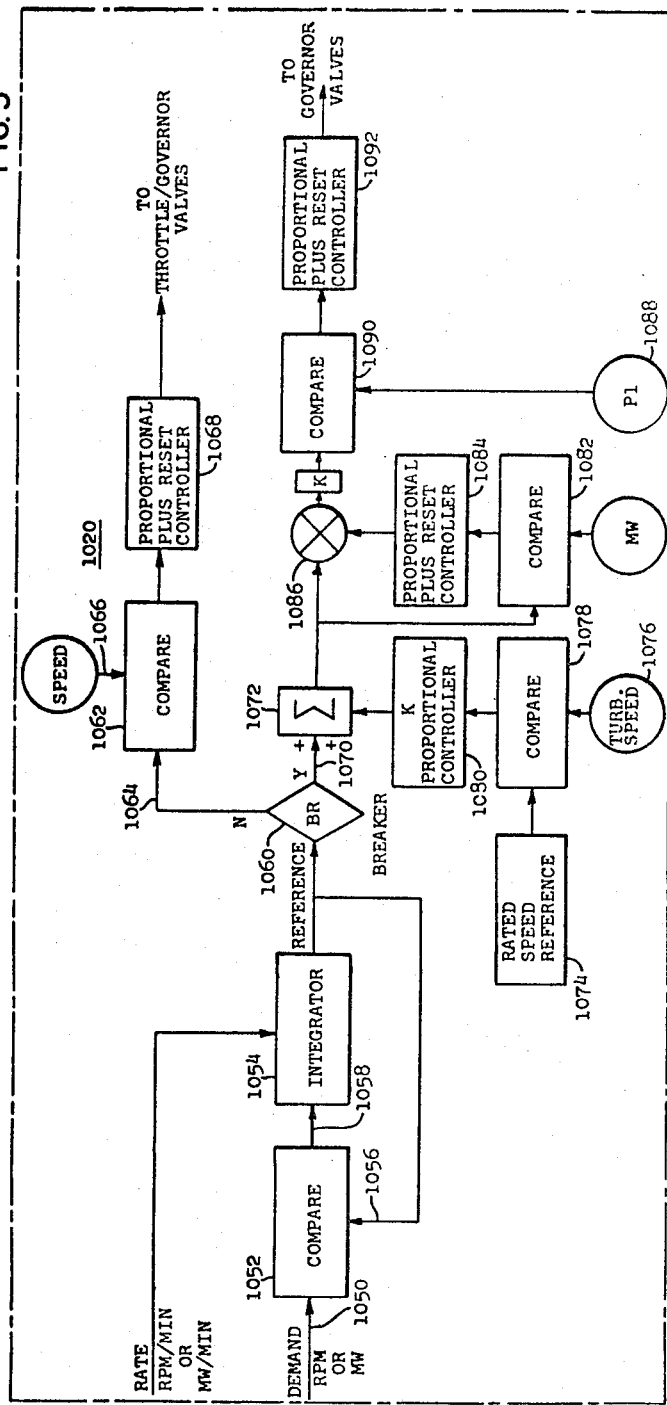

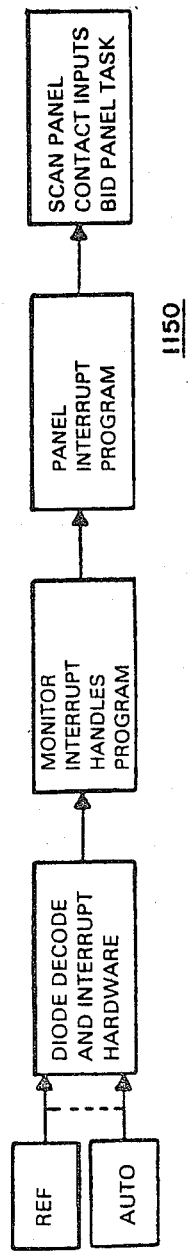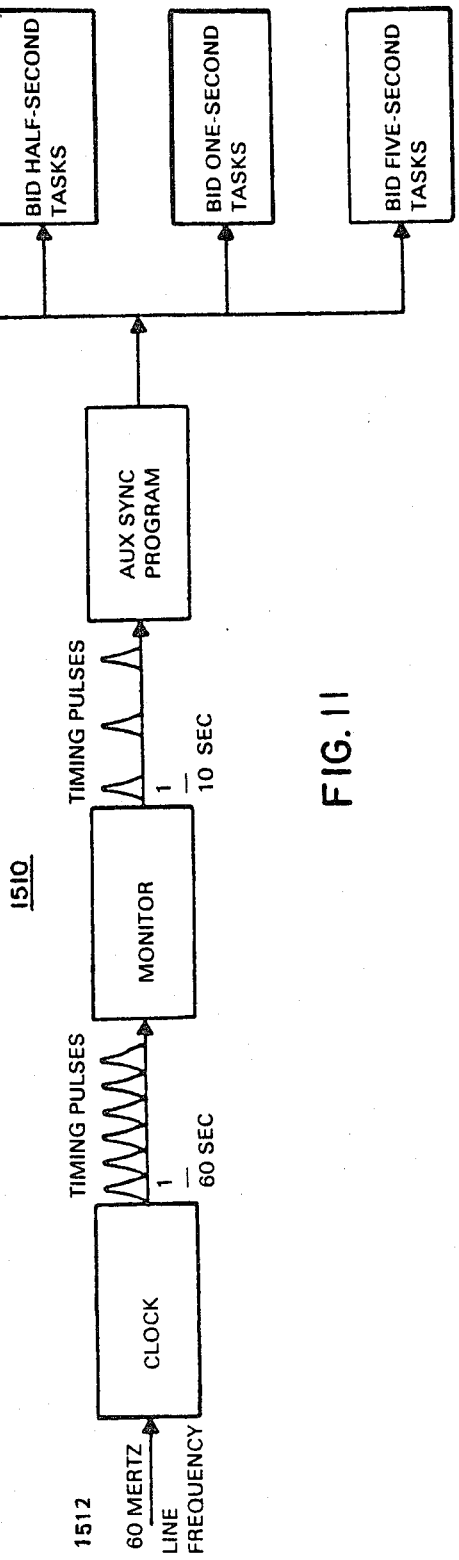
FIG. 13
FIG. 11

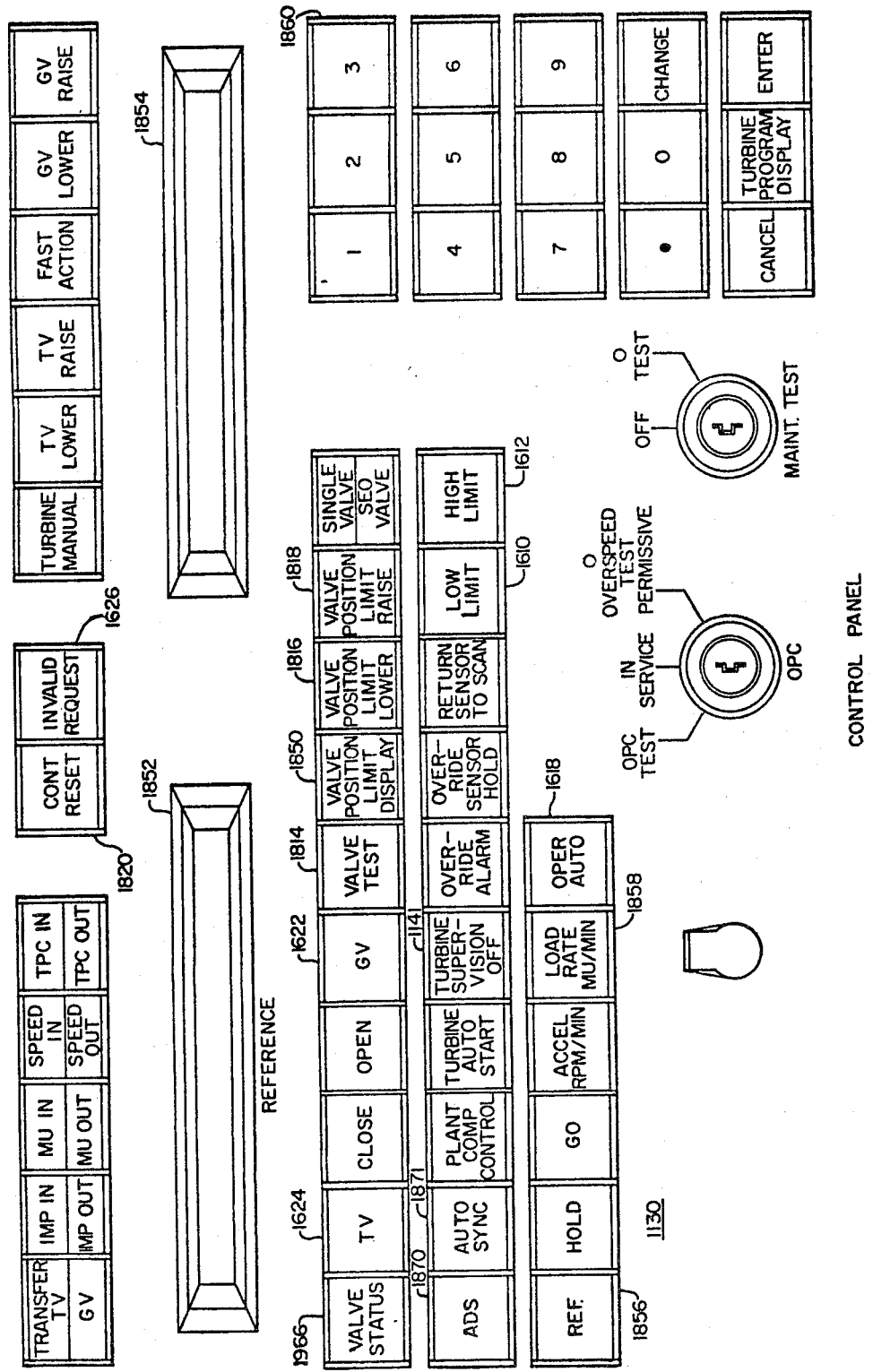

| Pushbutton | IPBX | Function |
|---|---|---|
| REF | 1 | Display REFERENCE in REF windows and DEMAND in DMD windows |
| ACCEL RATE | 2 | Display ACCELERATION RATE in REF windows and clear DMD windows |
| LOAD RATE | 3 | Display LOAD RATE in REF windows and clear DMD windows |
| LOW LIMIT | 4 | Display LOW LOAD LIMIT in REF windows and clear DMD windows |
| HIGH LIMIT | 5 | Display HIGH LOAD LIMIT in REF windows and clear DMD windows |
| VALVE POSITION LIMIT | 6 | Display VALVE POSITION LIMIT in REF windows and governor valve variable being limited in DMD windows |
| PARAMETER DISPLAY | 7 | Initiate display of internal control system variable; see operating instructions |
| VALVE STATUS | 8 | Initiate display of valve position; see operating instructions |

FIG. 14

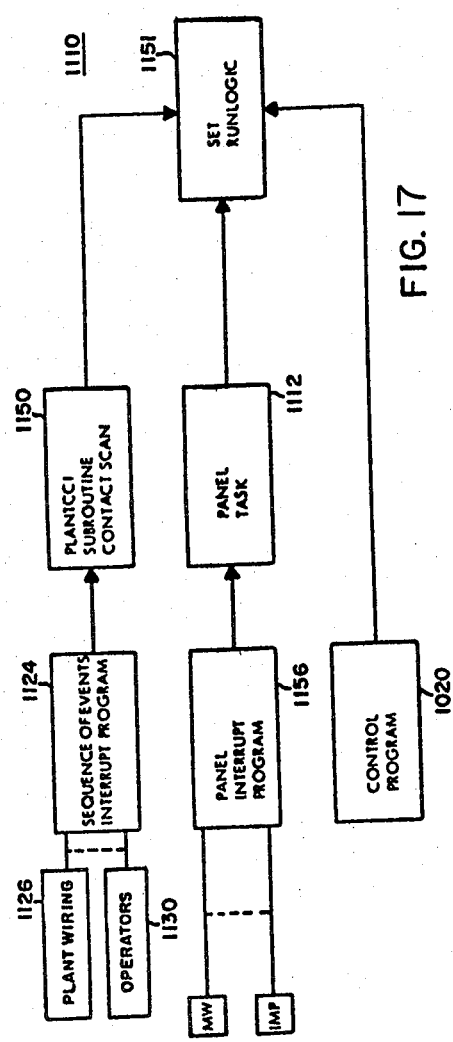
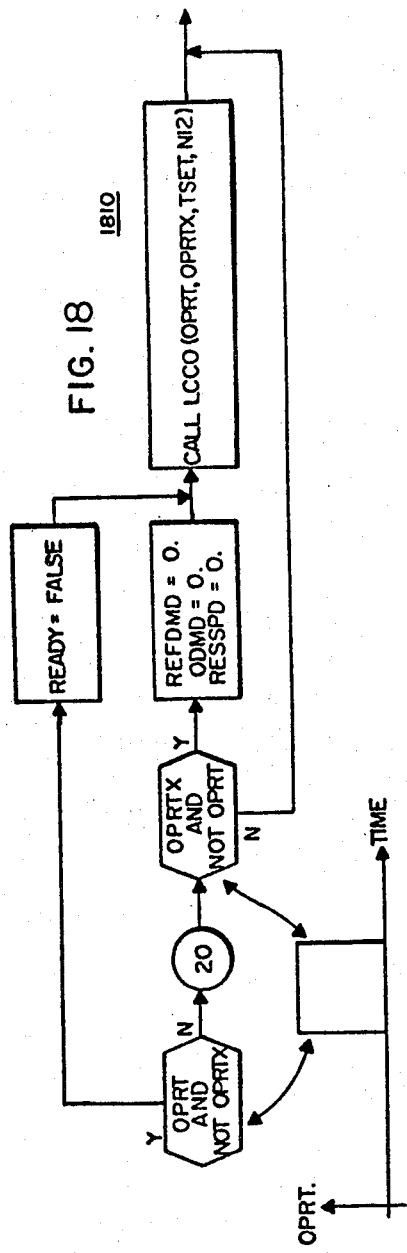
FIG. 17
FIG. 18

SYSTEM AND METHOD FOR OPERATING A STEAM TURBINE WITH CAPABILITY FOR BUMPLESSLY CHANGING THE SYSTEM CONFIGURATION ON-LINE BY MEANS OF SYSTEM PARAMETER CHANGES

This is a continuation of application Ser. No. 247,880, filed Apr. 26, 1972, now abandoned.

CROSS-REFERENCE TO RELATED APPLICATIONS

1. Ser. No. 722,799, entitled "Improved System and Method for Operating a Steam Turbine and an Electric Power Generating Plant" filed by Theodore C. Giras and Manfred Birnbaum on Apr. 4, 1968, assigned to the present assignee, and continued as Ser. No. 124,993 on Mar. 16, 1971, and Ser. No. 319,115, on Dec. 29, 1972.

2. Ser. No. 408,962, entitled "System and Method for Starting, Synchronizing and Operating Steam Turbine with Digital Computer Control" filed as a continuation of Ser. No. 247,877 which had been filed by Theodore C. Giras and Robert Uram on Apr. 26, 1972, assigned and hereby incorporated by reference; other related cases are set forth in Ser. No. 408,962 to the present assignee.

BACKGROUND OF THE INVENTION

The present invention relates to electric power plant steam turbines and more particularly to systems and methods for operating such turbines in such a way that changes in the turbine operating system can be flexibly and conveniently instituted.

In the operation of steam turbines in electric power plants, it is necessary to control the steam flow to the turbine so as to control the turbine speed and load and to do so in such a manner as to protect the turbine against damage. A large number of parameters are associated with the control system for the steam valves and overspeed and other protection control systems typically supplied with power plant turbines. Characteristically, such control systems have been supplied to customers with the great bulk of system parameters fixed by system design in electronic or electrohydraulic apparatus and typically with only a limited number of input demand parameters such as load and speed and rate demands and valve position being readily adjustable by simple switching operations to achieve control actions directed to satisfy the input demand. More extensive parameter adjustability has generally been or can be provided by the use of extensive switching circuitry or by the use of a digital computer, but there has been lacking in the electric power plant turbine art any specific application of such parameter adjustability so that in effect some restructuring of the turbine operating system can be flexibly achieved in accordance with empirically determined knowledge after the turbine has been manufactured and placed in the field for use in electric power generation.

The description of prior art herein is made on good faith and no representation is made that any prior art considered is the best pertaining prior art nor that the interpretation placed on it is unrebuttable.

SUMMARY OF THE INVENTION

A steam turbine is provided with an electrohydraulic control system having means for automatically controlling the operation of the steam valves and means for providing manual backup control of the steam valves in the event a switchover occurs from the automatic control means. The automatic control means includes control and logic elements having various parameters associated therewith, and means are provided for applying signals to the automatic control means to register changes in the parameter values. Means are provided for bumplessly switching the control system from automatic to backup control when parameter changes are made without interruption of the on-line turbine operation.

BRIEF DESCRIPTION OF THE DRAWINGS

FIG. 4 shows a simplified block diagram of the digital Electro Hydraulic Control System in accordance with the principle of the invention;

FIG. 5 shows a block diagram of a control program used in accordance with the principles of the invention;

FIG. 11 shows a block diagram of an auxiliary synchronizer computer program which is operable in accordance with the principles of the invention.

FIG. 12 shows a view of a part of the operator's control panel which is operable in accordance with the principles of the invention;

FIG. 13 is a block diagram of a panel interrupt program which is operable in accordance with the principles of the invention;

FIG. 14 is a table of display buttons which is operable in accordance with the principles of the invention;

FIG. 17 is a flow chart of a logic contact closure output subroutine which is operable in accordance with the principles of the invention;

FIG. 18 is a flow chart of a maintenance test logic program which is operable in accordance with the principles of the invention;

FIG. 32 shows a block diagram of the Digital Electro Hydraulic System which is operable in accordance with the principles of the invention.

DESCRIPTION OF THE PREFERRED EMBODIMENT

A. Power Plant

Figure 1:
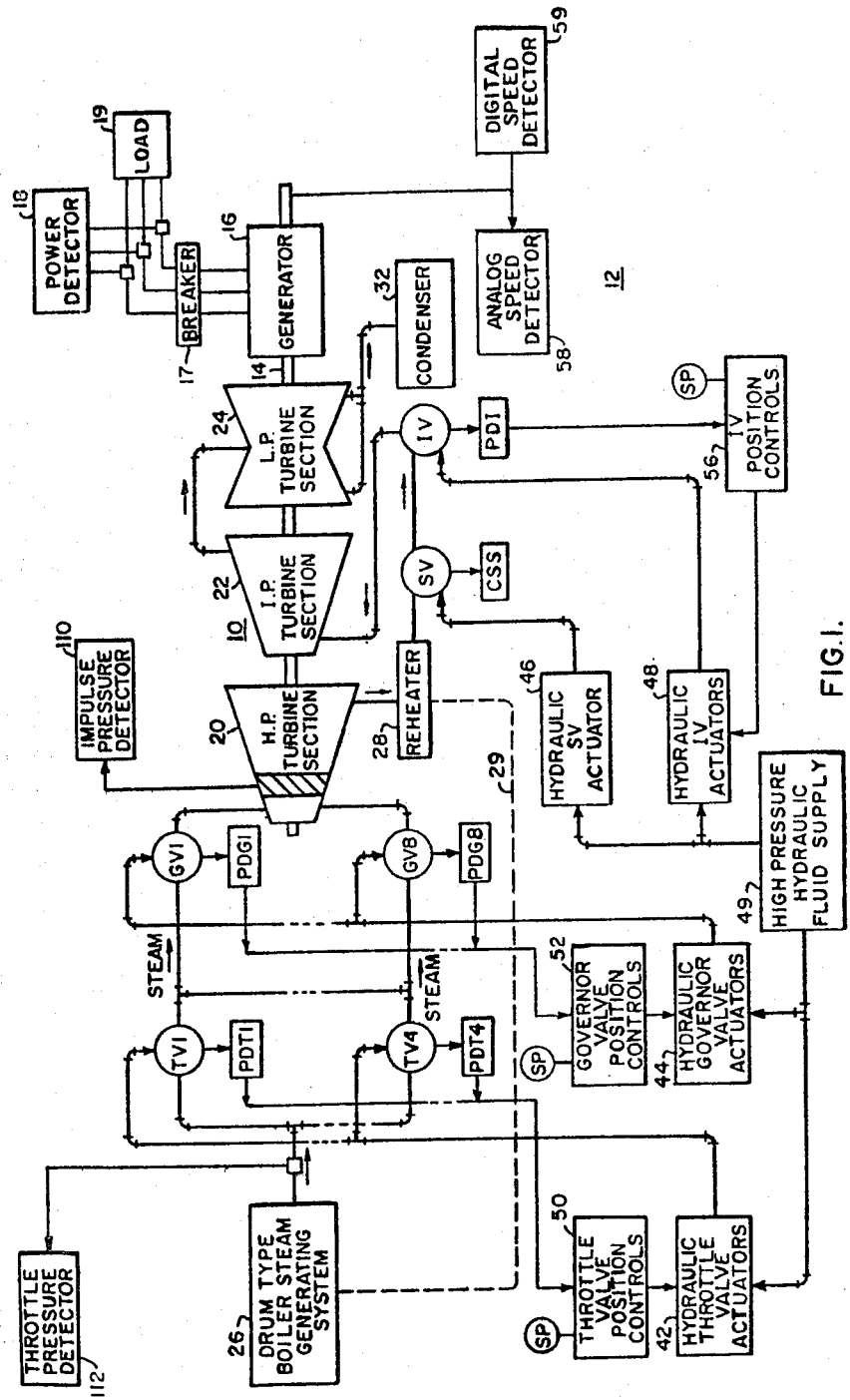
FIG. 1 shows a schematic diagram on an electric power plant including a large steam turbine and a fossil fuel fired drum type boiler and control devices which are all operable in accordance with the principles of the invention.
Figure 2:
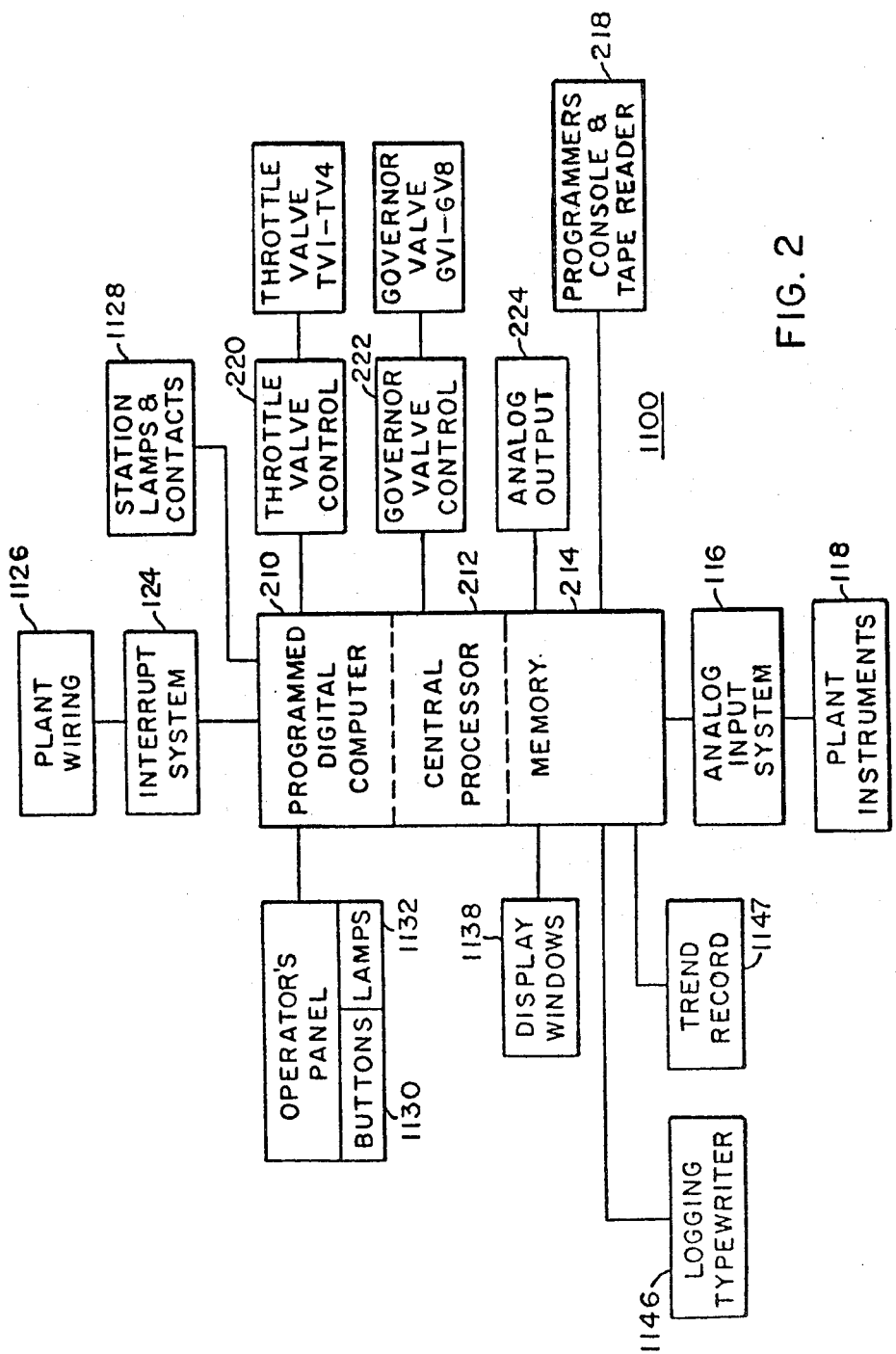
FIG. 2 shows a schematic diagram on a programmed digital computer control system operable with a steam turbine and its associated devices shown in FIG. 1 in accordance with the principles of the invention.

More specifically, there is shown in FIG. 1 a large single reheat steam turbine constructed in a well known manner and operated and controlled in an electric power plant 12 in accordance with the principles of the invention. As will become more evident through this description, other types of steam turbines can also be controlled in accordance with the principles of the invention and particularly in accordance with the broader aspects of the invention. The generalized electric power plant shown in FIG. 1 and the more general aspects of the computer control system to be described in connection with FIG. 2 are like those disclosed in the aforementioned Giras and Birnbaum patent application Ser. No. 319,115. As already indicated, the present application is directed to general improvements in turbine operation and control as well as more specific improvements related to digital computer operation and control of turbines.

The turbine 10 is provided with a single output shaft 14 which drives a conventional large alternating current generator 16 to produce three-phase electric power (or any other phase electric power) as measured by a conventional power detector 18 which measures the rate of flow of electric energy. Typically, the generator 16 is connected through one or more breakers 17 per phase to a large electric power network and when so connected causes the turbo-generator arrangement to operate at synchronous speed under steady state conditions. Under transient electric load change conditions, system frequency may be affected and conforming turbo-generator speed changes would result. At synchronism, power contribution of the generator 16 to the network is normally determined by the turbine steam flow which in this instance is supplied to the turbine 10 at substantially constant throttle pressure.

In this case, the turbine 10 is of the multistage axial flow type and includes a high pressure section 20, an intermediate pressure section 22, and a low pressure section 24. Each of these turbine sections may include a plurality of expansion stages provided by stationary vanes and an interacting bladed rotor connected to the shaft 14. In other applications, turbines operating in accordance with the present invention may have other forms with more or fewer sections tandemly connected to one shaft or compoundly coupled to more than one shaft.

The constant throttle pressure steam for driving the turbine 10 is developed by a steam generating system 26 which is provided in the form of a conventional drum type boiler operated by fossil fuel such as pulverized coal or natural gas. From a generalized standpoint, the present invention can also be applied to steam turbines associated with other types of steam generating systems such as nuclear reactor or once through boiler systems.

The turbine 10 in this instance is of the plural inlet front end type, and steam flow is accordingly directed to the turbine steam chest (not specifically indicated) through four throttle inlet valves TV1–TV4. Generally, the plural inlet type and other front end turbine types such as the single ended type or the end bar lift type may involve different numbers and/or arrangements of valves.

Steam is directed from the admission steam chest to the first high pressure section expansion stage through eight governor inlet valves GV1–GV8 which are arranged to supply steam to inlets arcuately spaced about the turbine high pressure casing to constitute a somewhat typical governor valving arrangement for large fossil fuel turbines. Nuclear turbines might on the other hand typically utilize only four governor valves.

During start-up, the governor valves GV1–GV8 are typically all fully opened and steam flow control is provided by a full arc throttle valve operation. At some point in the start-up process, transfer is made from full arc throttle valve control to full arc governor valve control because of throttling energy losses and/or throttling control capability. Upon transfer the throttle valves TV1–TV4 are normally operated in the single valve mode. Subsequently, the governor valves may be fully opened, and the governor valves GV1–GV8 are individually operated in a predetermined sequence usually directed to achieving thermal balance on the rotor and reduced rotor blade stressing while producing the desired turbine speed and/or load operating level. For example, in a typical governor valve control mode, governor valves GV5–GV8 may be initially closed as the governor valves GV1–GV4 are jointly operated from time to time to define positions producing the desired corresponding total steam flows. After the governor valves GV1–GV4 have reached the end of their control region, i.e, upon being fully opened, or at some overlap point prior to reaching their fully opened position, the remaining governor valves GV5–GV8 are sequentially placed in operation in numerical order to produce continued steam flow control at higher steam flow levels. This governor valve sequence of operation is based on the assumption that the governor valve controlled inlets are arcuately spaced about the 360° periphery of the turbine high pressure casing and that they are numbered consecutively around the periphery so that the inlets corresponding to the governor valves GV1 and GV8 are arcuately adjacent to each other.

The preferred turbine start-up method is to raise the turbine speed from the turning gear speed of about 2 rpm to about 80% of the synchronous speed under throttle valve control and then transfer to governor valve control and raise the turbine speed to the synchronous speed, then close the power system breakers and meet the load demand. On shutdown, similar but reverse practices or simple coastdown may be employed. Other transfer practice may be employed, but it is unlikely that transfer would be made at a loading point above 40% rated load because of throttling efficiency considerations.

After the steam has crossed past the first stage impulse blading to the first stage reaction blading of the high pressure section, it is directed to a reheater system 28 which is associated with a boiler or steam generating system 26. In practice, the reheater system 28 may typically include a pair of parallel connected reheaters coupled to the boiler 26 in heat transfer relation as indicated by the reference character 29 and associated with opposite sides of the turbine casing.

With a raised enthalpy level, the reheated steam flows from the reheater system 28 through the intermediate pressure turbine section 22 and the low pressure turbine section 24. From the latter, the vitiated steam is exhausted to a condenser 32 from which water flow is directed (not indicated) back to the boiler 26.

To control the flow of reheat steam, a stop valve SV including one or more check valves is normally open and closed only when the turbine is tripped. Interceptor valves IV (only one indicated), are also provided in the reheat steam flow path, and they are normally open and if desired they may be operated over a range of position control to provide reheat steam flow cutback modulation under turbine overspeed conditions. Further description of an appropriate overspeed protection system is presented in the U.S. Pat. No. 3,643,437 issued to M. Birnbaum, A. Braytenbah and A. Richardson and assigned to the present assignee.

In the typical fossil fuel drum type boiler steam generating system, the boiler control system controls boiler operations so that steam throttle pressure is held substantially constant. In the present description, it is therefore assumed as previously indicated that throttle pressure is an externally controlled variable upon which the turbine operation can be based. A throttle pressure detector 38 of suitable conventional design measures the throttle pressure to provide assurance of substantially constant throttle pressure supply, and, if desired as a programmed computer protective system override control function, turbine control action can be directed to throttle pressure control as well as or in place of speed and/or load control if the throttle pressure falls outside predetermined constraining safety and turbine condensation protection limits.

In general, the steady state power or load developed by a steam turbine supplied with substantially constant throttle pressure steam is determined as follows:

$$\text{power or load} = K_P \frac{P_i}{P_0} = K_F S_F \qquad \text{Equation (1)}$$

where
$P_i$ = first stage impulse pressure
$P_O$ = throttle pressure
$K_P$ = constant of proportionality
$S_F$ = steam flow
$K_F$ = constant of proportionality Where the throttle pressure is held substantially constant by external control as in the present case, the turbine load is thus proportional to the first stage impulse pressure $P_i$. The ratio $P_i/P_O$ may be used for control purposes, for example to obtain better anticipatory control of $P_i$ (i.e. turbine load) as the boiler control throttle pressure $P_O$ undergoes some variation within protective constraint limit values. However, it is preferred in the present case that the impulse pressure $P_i$ be used for feedback signalling in load control operation as subsequently more fully described, and a conventional pressure detector 40 is employed to determine the pressure $P_i$ for the assigned control usage.

Within its broad field of applicability, the invention can also be applied in nuclear reactor and other applications involving steam generating systems which produce steam without placement of relatively close steam generator control on the constancy of the turbine throttle pressure. In such cases, throttle control and operating philosophies are embodied in a form preferred for and tailored to the type of plant and turbine involved. In cases of unregulated throttle pressure supply, turbine operation may be directed with top priority to throttle pressure control or constraint and with lower priority to turbine load and/or speed control.

Respective hydraulically operated throttle valve actuators indicated by the reference character 42 are provided for the four throttle valves TV1–TV4. Similarly, respective hydraulically operated governor valve actuators indicated by the reference character 44 are provided for the eight governor valves GV1–GV8. Hydraulically operated actuators indicated by the reference characters 46 and 48 are provided for the reheat stop and interceptor valves SV and IV. A computer monitored high pressure fluid supply 50 provides the controlling fluid for actuator operation of the valves TV1–TV4, GV1–GV8, SV and IV. A computer supervised lubricating oil system (not shown) is separately provided for turbine plant lubricating requirements.

The respective actuators 42, 44, 46 and 48 are of conventional construction, and the inlet valve actuators 42 and 44 are operated by respective stabilizing position controls indicated by the reference characters 50 and 52. If desired, the interceptor valve actuators 48 can also be operated by a position control 56 although such control is not employed in the present detailed embodiment of the invention. Each position control includes a conventional analog controller (not shown in FIG. 1) which drives a suitably known actuator servo valve (not indicated) in the well known manner. The reheat stop valve actuators 46 are fully open unless the conventional trip system or other operating means causes them to close and stops the reheat steam flow.

Since the turbine power is proportional to steam flow under the assumed control condition of substantially constant throttle pressure, steam valve positions are controlled to produce control over steam flow as an intermediate variable and over turbine speed and/or load as an end control variable or variables. Actuator operation provides the steam valve positioning, and respective valve position detectors PDT1-PDT4, PDG1-PDG8 and PDI are provided to generate respective valve position feedback signals for developing position error signals to be applied to the respective position controls 50, 52 and 56. One or more contact sensors CSS provides status data for the stop valving SV. The position detectors are provided in suitable conventional form, for example, they may make conventional use of linear variable differential transformer operation in generating negative position feedback signals for algebraic summing with respect to position setpoint signals SP in developing the respective input error signals. Position controlled operation of the interceptor valving IV would typically be provided only under a reheat steam flow cutback requirement.

The combined position control, hydraulic actuator, valve position detector element and other miscellaneous devices (not shown) form a local hydraulic electric analog valve position control for each throttle or governor inlet steam valve. The position setpoints SP are computer determined and supplied to the respective local loops and updated on a periodic basis. Setpoints SP may also be computed for the interceptor valve controls when the latter are employed. A more complete general background description of electrohydraulic steam valve positioning and hydraulic fluid supply systems for valve actuation is presented in the aforementioned Birnbaum and Noyes paper.

In the present case, the described hybrid arrangement including local loop analog electrohydraulic position control is preferred primarily because of the combined effects of control computer operating speed capabilities and computer hardware economics, i.e., the cost of manual backup analog controls is less than that for backup computer capacity at present control computer operating speeds for particular applications so far developed. Further consideration of the hybrid aspects of the turbine control system is presented subsequently herein. However, economic and fast operating backup control computer capability is expected and direct digital computer control of the hydraulic valve actuators will then likely be preferred over the digital control of local analog controls described herein.

A speed detector 58 is provided for determining the turbine shaft speed for speed control and for frequency participation control purposes. The speed detector 58 can for example be in the form of a reluctance pickup (not shown) magnetically coupled to a notched wheel (not shown) on the turbo-generator shaft 14. In the detailed embodiment subsequently described herein, a plurality of sensors are employed for speed detection. Analog and/or pulse signals produced by the speed detector 58, the electric power detector 18, the pressure detectors 38 and 40, the valve position detectors PDT1-PDT4, PDG1-PDG8 and PDI, the status contact or contacts CSS, and other sensors (not shown) and status contacts (not shown) are employed in programmed computer operation of the turbine 10 for various purposes including controlling turbine performance on an on-line real time basis and further including monitoring, sequencing, supervising, alarming, displaying and logging.

B. Deh-Computer Control System

As generally illustrated in FIG. 2, a Digital Electro-Hydraulic control system (DEH) 1100 includes a programmed digital computer 210 to operate the turbine 10 and the plant 12 with improved performance and operating characteristics. The computer 210 can include conventional hardware including a central processor 212 and a memory 214. The digital computer 210 and its associated input/output interfacing equipment is a suitable digital computer system such as that sold by Westinghouse Electric Corporation under the trade name of P2000. In cases when the steam generating system 26 as well as the turbine 10 are placed under computer control, use can be made of one or more P2000 computers or alternatively a larger computer system such as that sold by Xerox Data Systems and known as the Sigma 5. Separate computers, such as P2000 computers, can be employed for the respective steam generation and turbine control functions in the controlled plant unit and interaction is achieved by interconnecting the separate computers together through data links or other means.

The digital computer used in the DEH control system 1100 is a P2000 computer which is designed for real time process control applications. The P2000 typically uses a 16 bit word length with 2's complement, a single address and fixed word length operated in a parallel mode. All the basic DEH system functions are performed with a 16,000 word (16K), 3 microsecond magnetic core memory. The integral magnetic core memory can be expanded to 65,000 words (65K).

The equipment interfacing with the computer 210 includes a contact interrupt system 124 which scans contacts representing the status of various plant and equipment conditions in plant wiring 1126. The status contacts might typically be contacts of mercury wetted relays (not shown) which operate by energization circuits (not shown) capable of sensing the predetermined conditions associated with the various system devices. Data from status contacts is used in interlock logic functioning and control for other programs, protection analog system functioning, programmed monitoring and logging and demand logging, etc.

Operator's panel buttons 1130 transmit digital information to the computer 2010. The operator's panel buttons 1130 can set a load reference, a pulse pressure, megawatt output, speed, etc.

In addition, interfacing with plant instrumentation 1118 is provided by an analog input system 1116. The analog input system 1116 samples analog signals at a predetermined rate from predetermined input channels and converts the signals sampled to digital values for entry into the computer 210. The analog signals sensed in the plant instrumentation 1118 represent parameters including the impulse chamber pressure, the megawatt power, the valve positions of the throttle valves TV1 through TV4 and the governor valves GV1 through GV8 and the interceptor valve IV, throttle pressure, steam flow, various steam temperatures, miscellaneous equipment operating temperature, generator hydrogen cooling pressure and temperature, etc. A detailed list of all parameters is provided in the Appendix 1. Such parameters include process parameters which are sensed or controlled in the process (turbine or plant) and other variables which are defined for use in the programmed computer operation. Interfacing from external systems such as an automatic dispatch system is controlled through the operator's panel buttons 1130.

A conventional programmer's console and tape reader 218 is provided for various purposes including program entry into the central processor 212 and the memory 214 thereof. A logging typewriter 1146 is provided for logging printouts of various monitored parameters as well as alarms generated by an automatic turbine startup system (ATS) which includes program system blocks 1140, 1142, 1144 (FIG. 6) in the DEH control system 1100. A trend recorder 1147 continuously records predetermined parameters of the system. An interrupt system 124 is provided for controlling the input and output transfer of information between the digital computer 210 and the input/output equipment. The digital computer 210 acts on interrupt from the interrupt system 124 in accordance with an executive program. Interrupt signals from the interrupt system 124 stop the digital computer 210 by interrupting a program in operation. The interrupt signals are serviced immediately.

Output interfacing is provided by contacts 1128 for the computer 210. The contacts 1128 operate status display lamps, and they operate in conjunction with a conventional analog/output system and a valve position control output system comprising a throttle valve control system 220 and a governor valve control system 222. A manual control system is coupled to the valve position control output system 220 and is operable therewith to provide manual turbine control during computer shut-down. The throttle and governor valve control system 220 and 222 correspond to the valve position controls 50 and 52 and the actuators 42 and 44 in FIG. 1. Generally, the manual control system is similar to those disclosed in prior U.S. Pat. No. 3,552,872 by T. Giras et al and U.S. Pat. No. 3,741,246 by A. Braytenbah, both assigned to the present assignee.

Digital output data from the computer 210 is first converted to analog signals in the analog output system 224 and then transmitted to the valve control system 220 and 222. Analog signals are also applied to auxiliary devices and systems, not shown, and interceptor valve systems, not shown.

C. Subsystems External To The DEH Computer

Figure 3A:
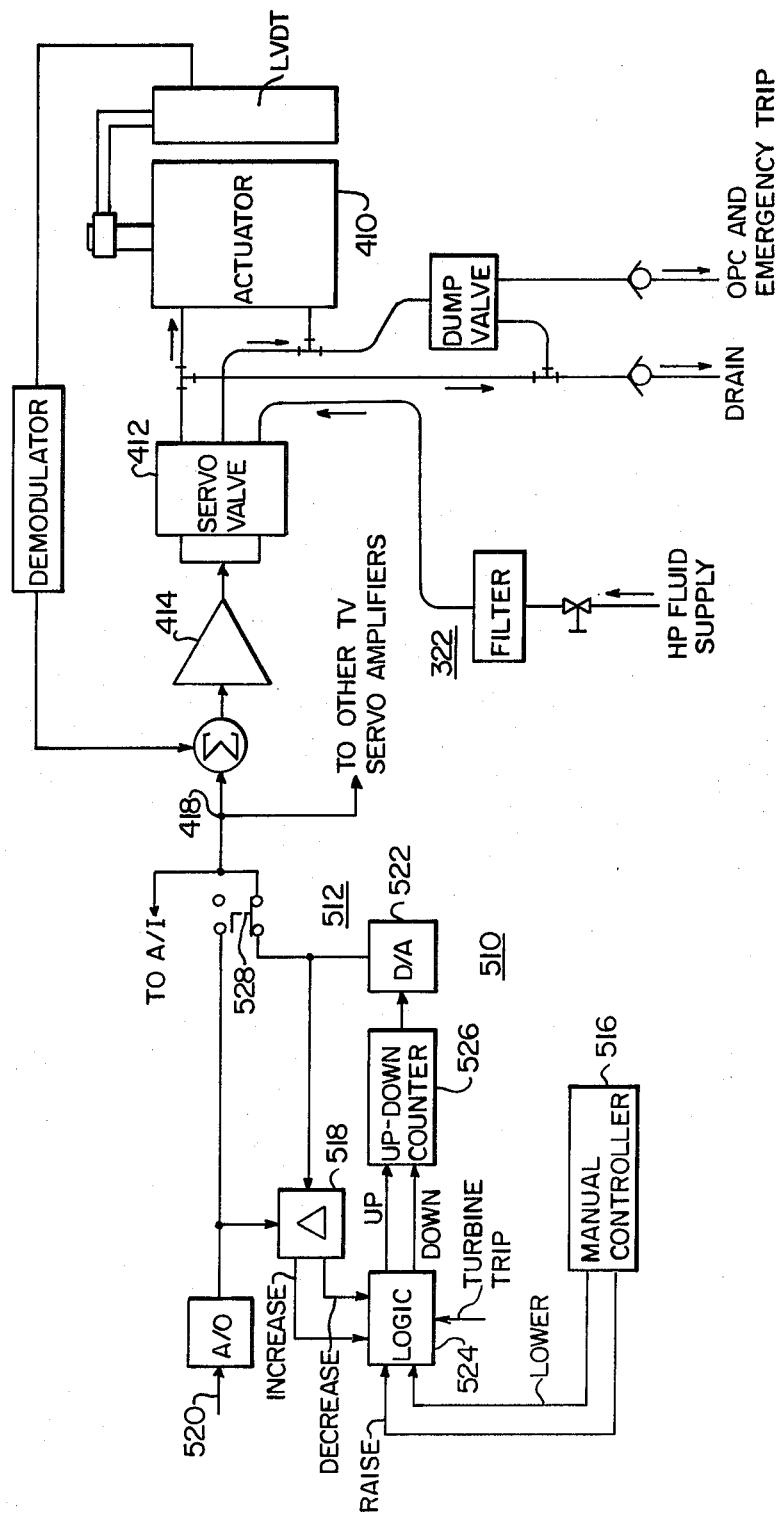
FIGS. 3A, 3B and 3C show a schematic diagram of a hybrid interface between a manual backup system and the digital computer connected with the servo system controlling the valve actuators.
Figure 3B:
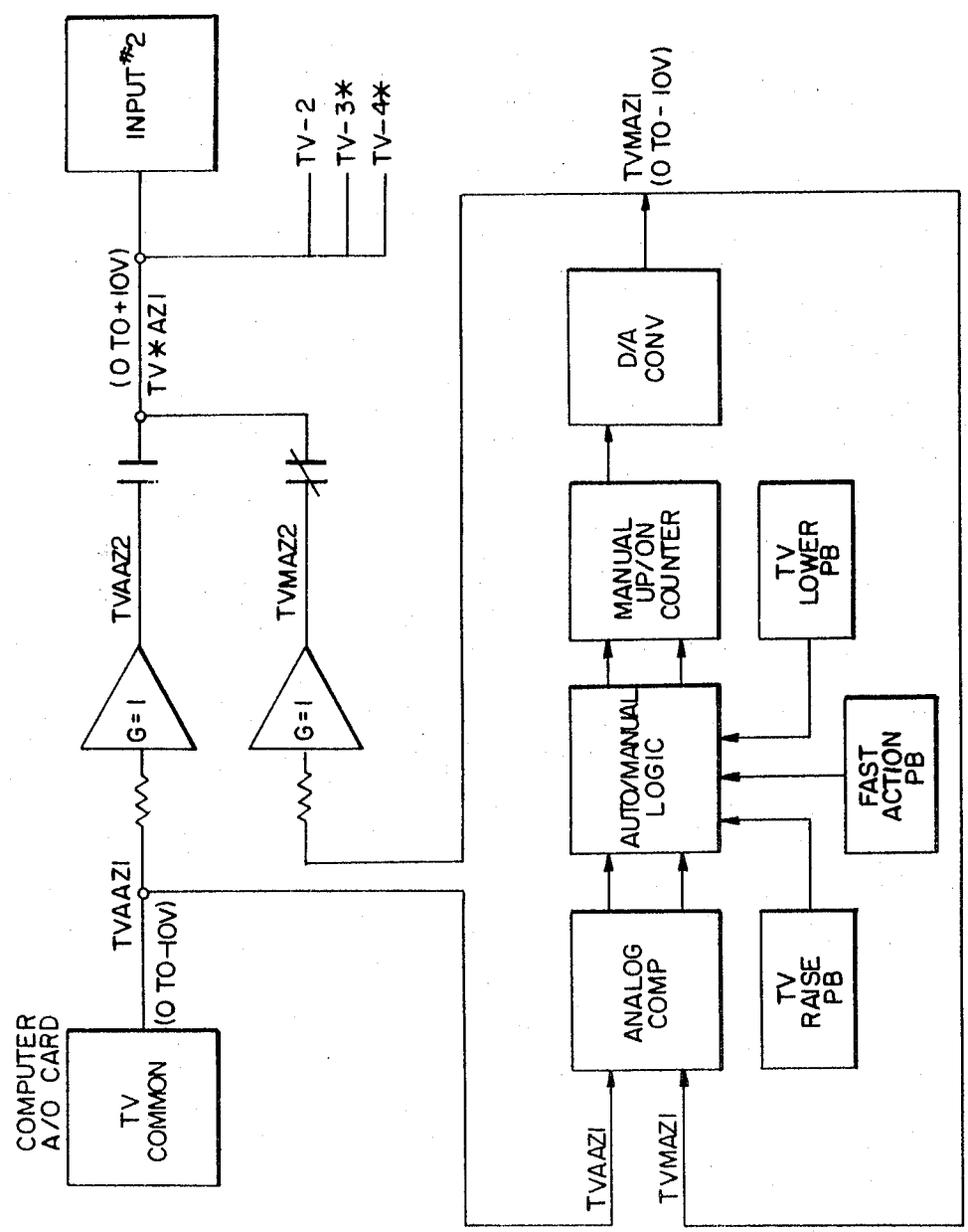
Figure 3C:
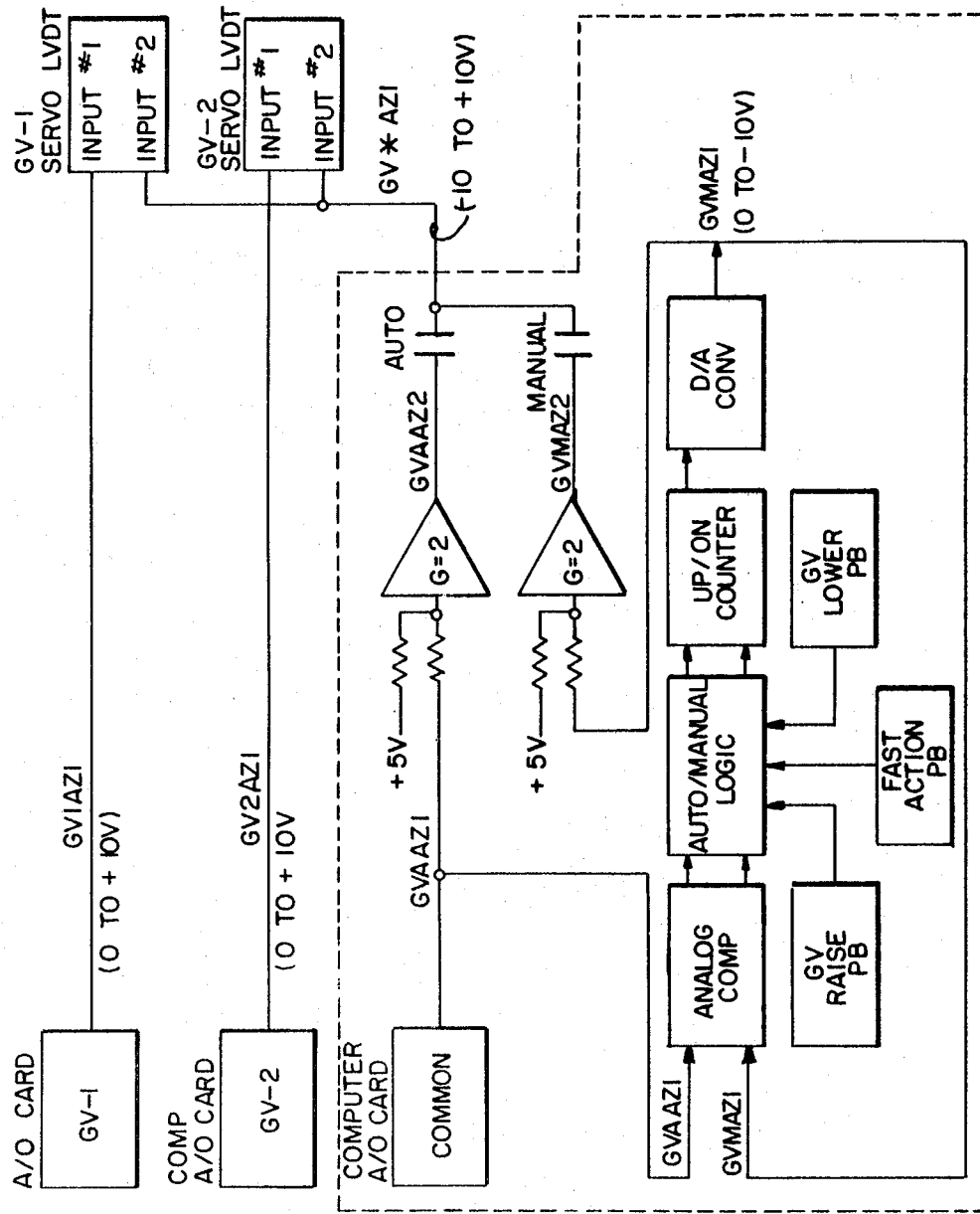

Making reference now to FIGS. 3A-3C, a hardwired digital/analog system forms a part of the DEH control system 1100 (FIG. 2). Structurally, it embraces elements which are included in the blocks 50, 52, 42 and 44 of FIG. 1 as well as additional elements. A hybrid interface 510 is included as a part of the hardwired system. The hybrid interface 510 is connected to actuator system servo-amplifiers 414 for the various steam valves which in turn are connected to a manual controller 516, an overspeed protection controller, not shown, and redundant DC power supplies, not shown.

A controller shown in FIG. 3A is employed for throttle valve TV1-TV4 control in the TV control system 50 of FIG. 1. The governor valves GV1-GV8 are controlled in an analogous fashion by the GV control system 52.

While the steam turbine is controlled by the digital computer 210, the hardwired system 511 tracks single valve analog outputs 520 from the digital computer 210. A comparator 518 compares a signal from a digital-to-analog converter 522 of the manual system with the signal 520 from the digital computer 210. A signal from the comparator 518 controls a logic system 524 such that the logic system 524 runs an up-down counter 526 to the point where the output of the converter 522 is equal to the output signal 520 from the digital computer 210. Should the hardwired system 511 fail to track the signal 520 from the digital computer 210 a monitor light will flash on the operator's panel.

When the DEH control system reverts to the control of the backup manual controller 516 as a result of an operator selection or due to a contingency condition, such as loss of power on the automatic digital computer 210, or a stoppage of a function in the digital computer 210, or a loss of a speed channel in the wide range speed control all as described in greater detail infra, the input of the valve actuation system 322 is switched by switches 528 from the automatic controllers in the blocks 50, 52 (FIG. 1) or 220, 222 (FIG. 2) to the control of the manual controller 516. Bumpless transfer is thereby accomplished between the digital computer 210 and the manual controller 516.

Similarly, tracking is provided in the computer 210 for switching bumplessly from manual to automatic turbine control. As previously indicated, the presently disclosed hybrid structural arrangement of software and hardware elements is the preferred arrangement for the provision of improved turbine and plant operation and control with backup capability. However, other hybrid arrangements can be implemented within the field of application of the invention.

D. DEH PROGRAM SYSTEM

DEH Program System Organization, DEH Control Loops And Control Task Program

With reference now to FIG. 4, an overall generalized control system of this invention is shown in block diagram form. The digital electrohydraulic (DEH) control system 1100 operates valve actuators 1012 for the turbine 10. The digital electrohydraulic control system 1100 comprises a digital computer 1014, corresponding to the digital computer 210 in FIG. 2, and it is interconnected with a hardwired analog backup control system 1016. The digital computer 1014 and the backup control system 1016 are connected to an electronic servo system 1018 corresponding to blocks 220 and 222, in FIG. 2. The digital computer control system 1014 and the analog backup system 1016 track each other during turbine operations in the event it becomes necessary or desirable to make a bumpless transfer of control from a digital computer controlled automatic mode of operation to a manual analog backup mode or from the manual mode to the digital automatic mode.

In order to provide plant and turbine monitor and control functions and to provide operator interface functions, the DEH computer 1014 is programmed with a system of task and task support programs. The program system is organized efficiently and economically to achieve the end operating functions. Control functions are achieved by control loops which structurally include both hardware and software elements, with the software elements being included in the computer program system. Elements of the program system are considered herein to a level of detail sufficient to reach an understanding of the invention. More functional detail on various programs is presented in Appendix 2. Further, a detailed listing of a DEH system program substantially conforming to the description presented herein is presented in Appendix 3 in symbolic and machine language. Most of the listing is compiled by a P2000 compiler from instructions written in Fortran IV. A detailed dictionary of system parameters is presented in Appendix 1, and a detailed computer input/output signal list is presented in Appendix 4. Appendix 5 mainly provides additional hardware information related to the hardwired system previously considered as part of the DEH control system.

As previously discussed, a primary function of the digital electrohydraulic (DEH) system 1100 is to automatically position the turbine throttle valves TV1 through TV4 and the governor valves GV1 through GV8 at all times to maintain turbine speed and/or load. A special periodically executed program designated the CONTROL task is utilized by the P2000 computer along with other programs to be described in greater detail subsequently herein.

With reference now to FIG. 5, a functional control loop diagram in its preferred form includes the CONTROL task or program 1020 which is executed in the computer 1010. Inputs representing demand and rate provide the desired turbine operating setpoints. The demand is typically either the target speed in specified revolutions per minute of the turbine systems during startup or shutdown operations or the target load in megawatts of electrical output to be produced by the generating system 16 during load operations. The demand enters the block diagram configuration of FIG. 5 at the input 1050 of a compare block 1052.

The rate input either in specified RPM per minute or specified megawatts per minute, depending upon which input is to be used in the demand function, is applied to an integrator block 1054. The rate inputs in RPM and megawatts of loading per minute are established to limit the buildup of stresses in the rotor of the turbine-generator 10. An error output of the compare block 1052 is applied to the integrator block 1054. In generating the error output the demand value is compared with a reference corresponding to the present turbine operating setpoint in the compare block 1052. The reference value is representative of the setpoint RPM applied to the turbine system or the setpoint generator megawatts output, depending upon whether the turbine generating system is in the speed mode of operation or the load mode of operation. The error output is applied to the integrator 1054 so that a negative error drives the integrator 1054 in one sense and a positive error drives it in the opposite sense. The polarity error normally drives the integrator 1054 until the reference and the demand are equal or if desired until they bear some other predetermined relationship with each other. The rate input to the integrator 1054 varies the rate of integration, i.e. the rate at which the reference or the turbine operating setpoint moves toward the entered demand.

Demand and rate input signals can be entered by a human operator from a keyboard. Inputs for rate and demand can also be generated or selected by automatic synchronizing equipment, by automatic dispatching system equipment external to the computer, by another computer automatic turbine startup program or by a boiler control system. The inputs for demand and rate in automatic synchronizing and boiler control modes are preferably discrete pulses. However, time control pulse widths or continuous analog input signals may also be utilized. In the automatic startup mode, the turbine acceleration is controlled as a function of detected turbine operating conditions including rotor thermal stress. Similarly, loading rate can be controlled as a function of detected turbine operating conditions.

The output from the integrator 1054 is applied to a breaker decision block 1060. The breaker decision block 1060 checks the state of the main generator circuit breaker 17 and whether speed control or load control is to be used. The breaker block 1060 them makes a decision as to the use of the reference value. The decision made by the breaker block 1060 is placed at the earliest possible point in the control task 1020 thereby reducing computational time and subsequently the duty cycle required by the control task 1020. If the main generator circuit breaker 17 is open whereby the turbine system is in wide range speed control the reference is applied to the compare block 1062 and compared with the actual turbine generator speed in a feedback type control loop. A speed error value from the compare block 1062 is fed to a proportional plus reset controller block 1068, to be described in greater detail later herein. The proportional plus reset controller 1068 provides an integrating function in the control task 1060 which reduces the speed error signal to zero. In the prior art, speed control systems limited to proportional controllers are unable to reduce an a speed error signal to zero. During manual operation an offset in the required setpoint is no longer required in order to maintain the turbine speed at a predetermined value. Great accuracy and precision of turbine speed whereby the turbine speed is held within the RPM over tens of minutes is also accomplished. The accuracy of speed is so high that the turbine 10 can be manually synchronized to the power line without an external synchronizer typically required. An output from the proportional plus reset controller block 1068 is then processed for external actuation and positioning of the appropriate throttle and/or governor valves.

If the main generator circuit breaker 17 is closed, the CONTROL task 1020 advances from the breaker block 1060 to a summer 1072 where the REFERENCE acts as a feedforward setpoint in a combined feedforward-feedback load control system. If the main generator circuit breaker 17 is closed, the turbine generator system 10 is being loaded by the electrical network connected thereto.

In the control task 1020 of the DEH system 1100 utilizes the summer 1072 to compare the reference value with the output of speed loop 1310 in order to keep the speed correction independent of load. A multiplier function has a sensitivity to varying load which is objectionable in the speed loop 1310.

During the load mode of operation the DEMAND represents the specified loading in Mu of the generator 16 which is to be held at a predetermined value by the DEH system 1100. However, the actual load will be modified by any deviations in system frequency in accordance with a predetermined regulation value. To provide for frequency participation, a rated speed value in box 1074 is compared in box 1078 with a "two signal" speed value represented by box 1076. The two signal speed system provides high turbine operating reliability to be described infra herein. An output from the compare function 1078 is fed through a function 1080 which is similar to a proportional controller which converts the speed error value in accordance with the regulation value. The speed error from the proportional controller 1080 is combined with the feedforward megawatt reference, i.e., the speed error and the megawatt reference are summed in summation function or box 1072 to generate a combined speed compensated reference signal.

The speed compensated load reference is compared with actual megawatts in a compare box or function 1082. The resultant error is then run through a proportional plus reset controller represented by program box 1084 to generate a feedback megawatt trim.

The feedforward speed compensated reference is trimmed by the megawatt feedback error multiplicatively to correct load mismatch, i.e. they are multiplied together in the feedforward turbine reference path by multiplication function 1086. Multiplication is utilized as a safety feature such that if one signal e.g. MW should fail a large value would not result which could cause an overspeed condition but instead the DEH system 1100 would switch to a manual mode. The resulting speed compensated and megawatt trimmed reference serves as an impulse pressure setpoint in an impulse pressure controller and it is compared with a feedback impulse chamber pressure representation from input 1088. The difference between the feedforward reference and the impulse pressure is developed by a comparator function 1090, and the error output therefrom functions in a feedback impulse pressure control loop. Thus, the impulse pressure error is applied to a proportional plus reset controller function 1092.

During load control the megawatt loop comprising in part blocks 1082 and 1084 may be switched out of service leaving the speed loop 1310 and an impulse pressure loop operative in the DEH system 1100.

Impulse pressure responds very quickly to changes of load and steam flow and therefore provides a signal with minimum lag which smooths the output response of the turbine generator 10 because the lag dynamics and subsequent transient response is minimized. The impulse pressure input may be switched in and out from the compare function 1090. An alternative embodiment embracing feedforward control with impulse pressure feedback trim is applicable.

Between block 1092 and the governor valve GV1-GV8 a value characterization function for the purpose of linearizing the response of the valves is interposed. The valve characterization function described in detail in Appendix III infra herein is utilized in both automatic modes and manual modes of operation of the DEH system 1100. The output of the proportional plus reset controller function 1092 is then ultimately coupled to the governor valves GV1-GV8 through electrohydraulic position control loops implemented by equipment considered elsewhere herein. The proportional plus reset controller output 1092 causes positioning of the governor valves GV1-GV8 in load control to achieve the desired megawatt demand while compensation is made for speed, megawatt and impulse pressure deviations from desired setpoints.

Figure 6:
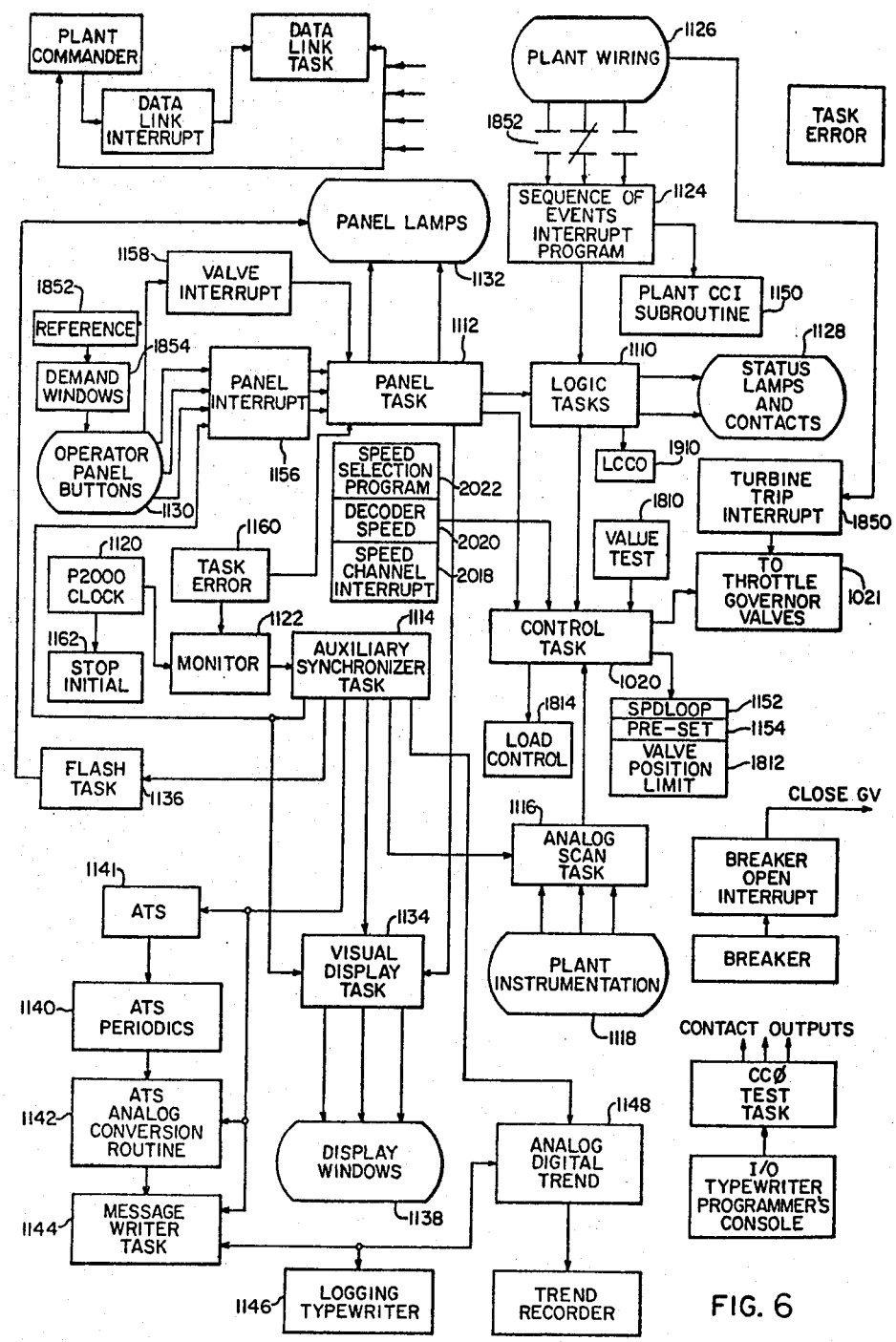
FIG. 6 shows a block diagram of the programs and subroutines of the digital Electro Hydraulic and the automatic turbine startup and monitoring program in accordance with the principles of the invention.

Making reference to FIG. 6, the control program 1020 is shown with interconnections to other programs in the program system employed in the Digital Electro Hydraulic (DEH) system 1100. The periodically executed program 1020 receives data from a logic task 1110 where mode and other decisions which affect the control program are made, a panel task 1112 where operator inputs may be determined to affect the control program, an auxiliary synchronizer program 1114 and an analog scan program 1116 which processes input process data. The analog scan task 1116 receives data from plant instrumentation 1118 external to the computer as considered elsewhere herein, in the form of pressures, temperatures, speeds, etc. and converts such data to proper form for use by other programs. Generally, the auxiliary synchronizer program 1114 measures time for certain important events and it periodically bids or runs the control and other programs An extremely accurate clock function 1120 operates through a monitor program 1122 to run the auxiliary synchronizer program 1114.

The monitor program or executive package 1122 also provides for controlling certain input/output operations of the computer and, more generally, it schedules the use of the computer to the various programs in accordance with assigned priorities. For more detail on the P2000 computer system and its executive package, reference is made to Appendix 4. In the appendix description, the executive package is described as including analog scan and contact closure input routines, whereas these routines are considered as programs external to the executive package in this part of the disclosure.

The logic task 1110 is fed from outputs of a contact interrupt or sequence of events program 1124 which monitors contact variables in the power plant 1126. The contact parameters include those which represent breaker state, turbine auto stop, tripped/latched state interrogation data states, etc. Bids from the interrupt program 1124 are registered with and queued for execution by the executive program 1111. The control program 1110 also receives data from the panel task 1112 and transmits data to status lamps and output contacts 1128. The panel task 1112 receives data instruction based on supervision signals from the operator panel buttons 1130 and transmits data to panel lamps 1132 and to the control program 1020. The auxiliary synchronizer program 1114 synchronizes through the executive program 1111 the bidding of the control program 1020, the analog scan program 1116, a visual display task 1134 and a flash task 1136. The visual display task transmits data to display windows 1138.

The control program 1020 receives numerical quantities representing process variables from the analog scan program 1116. As already generally considered, the control program 1020 utilizes the values of the various feedback variables including turbine speed, impulse pressure and megawatt output to calculate the position of the throttle valves TV1-TV4 and governor valves GV1-GV8 in the turbine system 10, thereby controlling the megawatt load and the speed of the turbine 10.

To interface the control and logic programs efficiently, the sequence of events program 1124 normally provides for the logic task 1110 contact status updating on demand rather than periodically. The logic task 1110 computes all logical states according to predetermined conditions and transmits this data to the control program 1020 where this information is utilized in determining the positioning control action for the throttle valves TV1-TV4, and the governor valves GV1-GV8. The logic task 1110 also controls the state of various lamps and relay type contact outputs in a predetermined manner.

Another important part of the DEH system is the OPERATOR'S PANEL program. The operator communicates through the panel with the DEH control programs by means of various buttons, which have assigned functions. When any button is pressed, a special interrupt is generated; this interrupt triggers a PANEL INTERRUPT program which decodes the button pressed, and then bids the PANEL task. The PANEL program processes the button and takes the proper action, which usually means manipulating some panel lamps, as well as passing on the button information to both the LOGIC and the CONTROL tasks.

The Operator's Panel also has two sets of display windows which allow display of all turbine program parameters, variables, and constants. A visual display task presents this information in the windows at the request of the operator through various dedicated display buttons and a numerical keyboard. The visual display values are periodically updated in the windows as the quantity changes.

Certain important turbine operating conditions are communicated to the DEH operator by way of flashing lamps on the panel. Therefore a special FLASH program is part of the DEH system. Its function is to monitor and detect such contingency conditions, and flash the appropriate lamp to alert the operator to the state.

E. DEH PROGRAMS OR TASKS

1. Preset Subroutine

Figure 7:
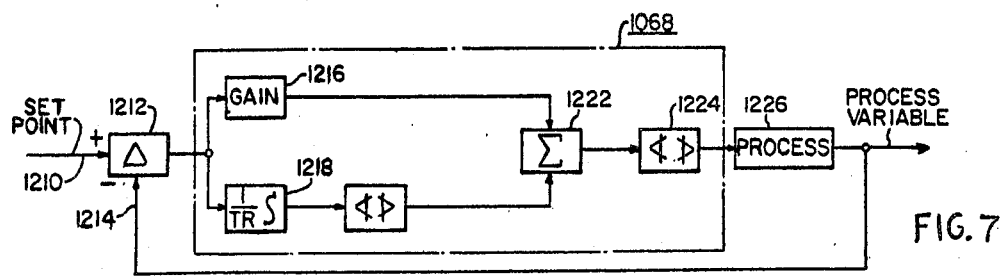
FIG. 7 shows a block diagram of a proportional-plus-reset controller program which is operable in accordance with the principles of the invention.

Making reference now to FIG. 7, a functional diagram of the proportional plus reset controller task program 1068 of FIG. 5 is shown in greater detail. The proportional plus reset controller subroutine 1068 is called by the control program 1020 of FIG. 5 when the DEH turbine control system 1100 is in the speed mode of control and also when the DEH turbine control system 1100 is in the load mode of control with the megawatt and impulse pressure feedback loops in service. As already indicated utilizing a proportional plus reset function during speed control provides very accurate control of the angular velocity of the turbine system.

The proportional plus reset controller 1068 provides an output which is composed of the sum of two parts. One part of the output is proportional to an input and the other part is an integral of the input. Therefore, instantaneous response is available as well as the capability of zero input error. A setpoint or dynamic reference from a demand source is applied to an input 1210 of a difference function 1212. The difference function 1212 compares the input and the actual controlled process value. An output from the difference function 1212 is fed to a proportional gain function 1216 and to an input of an integrator or integrating function 1218 having a reset time TR. An output from the integrator 1218 is high and low limited by the program as represented by the reset windup prevention function 1220 in order to avoid excessive integrator outputs which could occur with a reset windup.

Proportional and integral outputs from the gain function 1216 and the integrator 1218 windup limited are summed in a summing function 1222. The total output from the summing function 1222 is high and low limited by another function 1224 and fed to a process function 1226 thereby limiting the total output to a useful output range.

Figure 8:
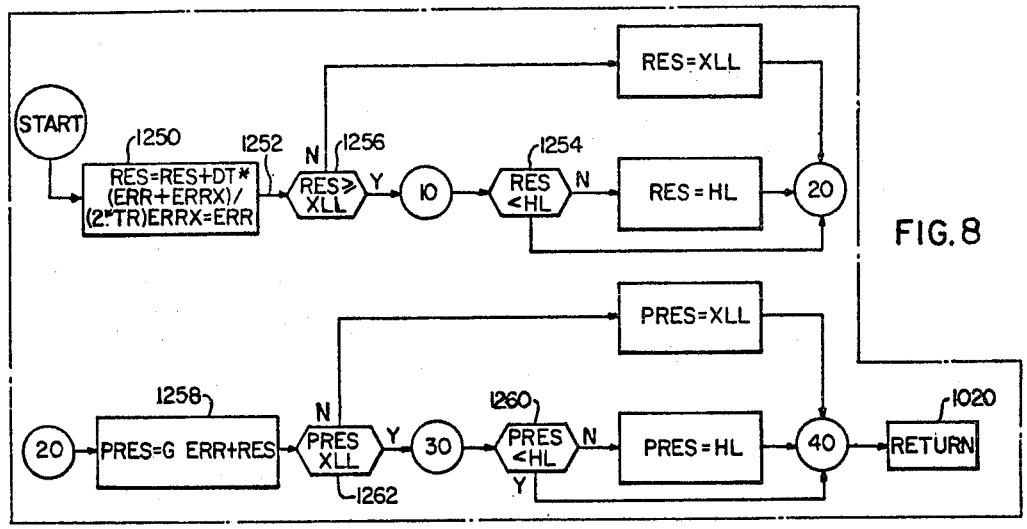
FIG. 8 shows a flow chart of the proportional-plus-reset subroutine (PRESET) which is operable in accordance with the principles of the invention.

Making reference now to FIG. 8, a pictorial representation of a flow chart for the proportional plus reset controller program is shown. In the preferred embodiment the Preset program is designed such that a call from the control program 1030 provides a list of variables necessary to evaluate the controller 1068 output. The structure of the subroutine is indicated by the Fortran statement given below.

SUBROUTINE PRESET (ERR, ERRX, G, TR, HL, XLL, RES, PRES)

The variables in the above equation are defined as follows:

| FORTRAN Variables | English Language Equivalents |
|---|---|
| ERR | The current input |
| ERRX | The last input |
| G | The controller proportional gain |
| TR | The controller reset time |
| HL | The controller high limit |
| XLL | The controller low limit |
| RES | The controller integral output |
| PRES | The controller total output. |

Again making reference to FIG. 8, where standard FORTRAN notation is used, the Preset subroutine 1068 first evaluates the integral part of the controller output according to equation:

$$Y(N) = Y(N-1) + \frac{DT}{2*TR} *[X(N) + X(N-1)].$$

The subroutine 1068 next saves the current input ERR in storage location ERRX 1250 for the following call to the subroutine 1068. The controller integral output RES 1252 is then checked against the high limit 1254 and the low limit 1256 to prevent reset/windup. The proportional part of the output is computed and added to the integral part of the output integrator 1218 to form the total output PRES 1258. PRES 1258 is checked against high limit 1260 and low limit 1262 after which the proportional plus reset controller subroutine 1068 returns to the control task 1020.

As previously considered, the proportional plus reset controller subroutine 1068 is used by the control task program 1020 during three different phases of operation of the turbine system. During startup of the turbine system 10, the proportional plus reset controller subroutine program 1068 is used as a speed controller in order to regulate and hold the speed of the turbine 10 at a predetermined value or at a predetermined acceleration rate. Because of the integral function of the proportional plus reset controller subroutine program 1068 the speed of the turbine system 10 can be held to within 1 rpm. Also, in order for an operator to keep the speed of the turbine system 10 at a predetermined value, an error offset input signal typical of a purely proportional system is not required. Therefore, the reference and the controlled variable, both turbine speed in this case, will be equal. The proportional plus reset controller subroutine program 1068 is also used in the megawatt controller feedback loop and the impulse chamber pressure controller feedback loop.

During turbine startup, the quantity REFDMD is the internal speed reference while WS is the actual turbine speed. GS1 and T1 are the proportional gain and reset time, HLS and O. are the high and low limits, RESSPD is the integral part of the output, SPDSP is the total output, and RESSPDX is the last value of the input.

In the megawatt controller during megawatt loop operation, REF1 is the megawatt set point, MW is the megawatt feedback, and GR2 is a ranging gain to convert from engineering units to per-unit form. GL2 and T2 are the proportional gain and the reset time, while HEL and LEL are high and low limits. RESMW is the integral output, Y is the total output, and RESMWX is the last input.

With impulse pressure loop operation, PISP is the set point for the impulse pressure controller, PI is the feedback and GL3 and T3 are the proportional gain and the reset time, GR4 and O. are the high and low limits, RESPI is the integral output, VSP is the total output, and RESPIX is the last input.

Reset Integrator Algorithm

To perform the mathematical function of integration in a digital computer it is desirable to use numerical techniques to approximate the exact value of the integral. In the preferred embodiment, the algorithm uses the trapezoidal rule for integration and it is simple in format, requires little computer storage and is executed very rapidly. The algorithm uses one value of input past history to achieve a high degree of accuracy.

The following algorithm is used in the computer:

$$Y(N) = Y(N-1) + \frac{DT}{2*TR} [X(N) + X(N-1)].$$

Definitions of the terms in this equation follow:
(N)-The current instant of real time
(N−1)-The last instant of real time.
DT-The sampling interval, or the time duration between evaluations of the integration algorithm. In the DEH Control System this is normally 1 sec.
TR-The controller reset time in sec.
X(N)-The current value of the input.
X(N−1)-The last value of the input.
Y(N)-The current value of the output.
Y(N−1)-The last value of the output.

To use the integrator algorithm, the DEH control system is organized so that the parameters DT and TR, the input variables X(N) and X(N−1), and the output variables Y(N) and Y(N−1) are in known areas of COMMON storage. The CONTROL task computes the current value of X(N) and calls the PRESET subroutine. The PRESET subroutine evaluates the current value of Y(N) according to the integrator algorithm and stores the value for use by all other parts of the DEH system.

2. SPEED LOOP SUBROUTINE

Figures 9, 10:
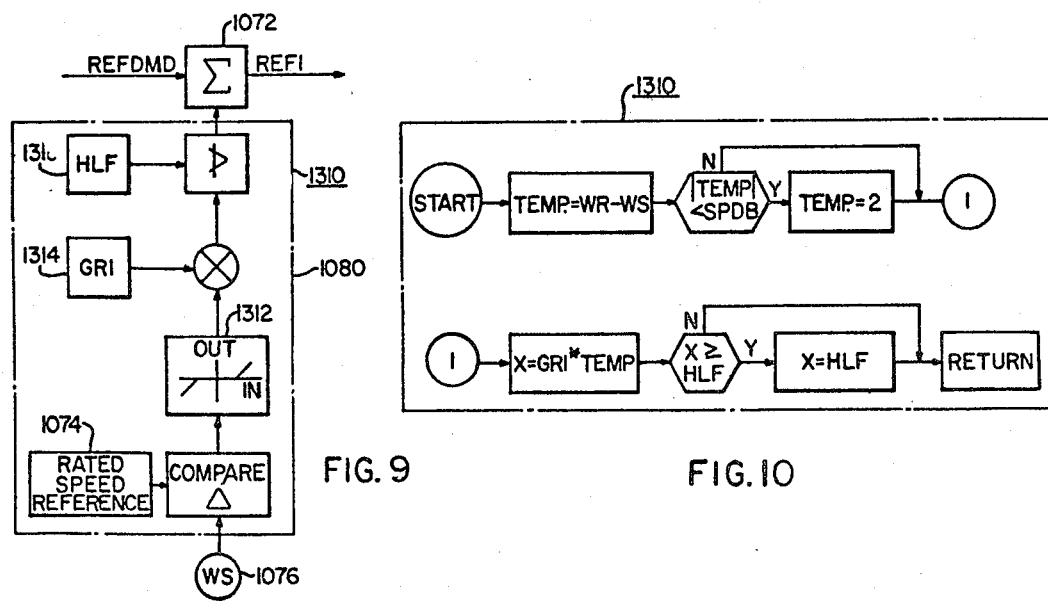
FIG. 9 shows a block diagram of a proportional controller function with dead band which is operable in accordance with the principles of the invention.
FIG. 10 shows a flow chart of a speed loop (SPDLOOP) subroutine which is operable in accordance with the principles of the invention.

Making reference now to FIG. 9, a speed loop program 1310 which functionally is part of the arrangement shown in FIG. 5 is shown in greater detail. The speed loop (SPDLOOP) program 1310 normally computes data required in the functioning of the speed feedback in the load control comprising as shown in FIG. 5 the rated speed reference 1074, the actual turbine speed 1076, the compare function 1078, the proportional controller 1080 and the summing function 1072. During the load control, the speed feedback loop adjusts the load reference (and thus the governor valves) to correct for any turbine speed deviation from rated speed. The speed feedback loop uses a proportional controller to accomplish this function. The speed loop subroutine 1310 is called upon to perform speed control loop functions by the control program 1020. In FIG. 9, the functioning of the proportional controller 1080 is shown in detail. The error output from the compare function 1078 is fed through a deadband function 1312. A proportionality constant (GR1) 1314 and a high limit function(HLF) 1316 are included in the computation.

The speed loop (SPDLOOP) subroutine is by the control Task during the load control mode and when switching occurs between actual speed signals. Subroutine form reduces the requirement for memory storage space thereby reducing the computer expense required for operation of the DEH system 1100.

The deadband function 1312 provides for bypassing small noise variations in the speed error generated by the compare function 1078 so as to prevent turbine the speed changes which would otherwise occur. Systems without a deadband continuously respond to small variations which are random in nature resulting in undue stress in the turbine 10 and unnecessary, time and duty cycle consuming operation of the control system. A continuous hunting about the rated speed due to the gain of the system would occur without the deadband 1312. The speed regulation gain GR1 at 1314 is set to yield rated megawatt output power speed correction for a predetermined turbine speed error. The high limit function HLS at 1316 provides for a maximum speed correction factor.

The turbine speed 1076 is derived from three transducers. The turbine digital speed transducer arrangement is that disclosed in greater element and system implementation detail in the aforementioned Reuther Application Ser. No. 412,513. Briefly, in the preferred embodiment for determining the speed of the turbine, the system comprises three independent speed signals. These speed signals consist of a very accurate digital signal generated by special electronic circuitry from a magnetic pickup, an accurate analog signal generated by a second independent magnetic pickup, and supervisory analog instrument signal from a third independent pickup. The DEH system compares these signals and through logical decisions selects the proper signal to use for speed control or speed compensated load control. This selection process switches the signal used by the DEH control system 1100 from the digital channel signal to the accurate analog channel signal or vice versa under predetermined dynamic conditions. In order to hold the governor valves at a fixed position during this speed signal switching the control program 1020 uses the speed loop subroutine 1310 and performs a computation to maintain a bumpless speed signal transfer.

Making reference to FIG. 10, the speed loop (SPDLOOP) subroutine flow chart 1310 is shown in greater detail. Two FORTRAN statements signify the operations of the speed loop subroutine program flow chart 1310. These statements are:
CALL SPDLOOP
REF1=REFDMD+X Variables in the flow chart 1310 are defined as follows:

| FORTRAN VARIABLES | ENGLISH LANGUAGE EQUIVALENT |
| --- | --- |
| REFMD | Load reference |
| WR | The turbine rated speed |
| REF1 | Corrected load reference |
| WS | The actual turbine speed |
| TEMP | Temporary storage location variable |
| SPDB | The speed deadband |
| GR1 | The speed regulation gain (normally set to yield rated megawatt speed correction for a 180 rpm speed error) |

-continued

| FORTRAN VARIABLES | ENGLISH LANGUAGE EQUIVALENT |
| --- | --- |
| X | Speed correction factor |
| HLF | The high limit function |

AUTOMATIC TURBINE START-UP PROGRAM FOR FOSSIL UNITS

A digital computer is a powerful tool for achieving a better and more efficient control of a turbo-generator unit. To take advantage of the computer's ability to scan, memorize, calculate, make decisions and take executive actions, the computer program should go further than the operating instructions, normally provided with each turbine, by scanning additional parameters if necessary, determining the trends in the parameter changes and performing computations beyond the capacity and duties of a human operator.

The general objective of the starting and load changing recommendations is the protection of the turbine parts against thermal-fatigue cracking caused by internal temperature variations. In the large turbines of present design the critical element is the H.P. rotor due to its relatively large diameters and high number of temperature variations at the first stage zone produced during startups and load changes. The operating procedures provided with each turbine, in the form of charts, assume that the machine is normally passing from one steady state to another, during a transient period, and the transition between the two selected states should be performed in a determined time to keep the thermal stresses below the allowable limit.

With the help of the computer, the thermal stresses in the rotor can be calculated minute by minute based on the actual temperature at the first stage provided by a thermocouple. The assumption that the turbine was in a steady state condition is no longer necessary. Once the thermal stress (or strain) is calculated, it can be compared with the allowable value, and the difference used as the index of the permissible first stage temperature variation, translated in the computer program as a variation of speed or load or rate of speed or load change.

Using the memory of the computer, values of some parameters can be stored for use in the estimation of their future values or rate of change, which in turn are used to take corrective measures before alarm or trip points are reached. Such is the case with metal temperature differentials and differential expansions.

Bearing vibration is another of the parameters for which the computer capacity is used in making logical decisions. Each bearing is under close supervision and when one of the vibrations reaches an alarm limit, its behavior is studied and a decision is made according to the estimated future value of the vibrations, and whether it is an increasing, steady or decreasing function. A priority system is also inserted due to the possibility that two or more bearings may be in a different stage of alarm.

Under the approach used in the program, the rotor stress (or strain) calculations, sub-program P#01, and its decision-making counterpart, sub-program P#04, are the main controlling sections. They will allow the unit to roll with relatively high acceleration until the anticipated value of strain or other controlling parameters predict that limiting values are to be reached in the near future. Then a lower rate is selected and, if the condition persists, a speed hold is generated.

The following describes the Automatic Turbine Start-Up Program (ATS) in the DEH-P2000 Controller. The ATS program employs general concepts including the rotor stress control concepts described in the aforementioned Berry patent. In providing automatic control and monitoring, the ATS provides improvments over the Berry patent and earlier control systems in which digital computers have been used to provide supervisory startup control over analog EH controls.

The ATS Program is stored and executed in the same Central Processing Unit (CPU) as the basis DEH Programs. Both Programs work directly together by means of shared core locations. They also share the same input/output hard- and software, which is needed to communicate with the outside world, i.e., to read and operate contacts. The ATS Program is capable of rolling the turbine from turning gear to synchronous speed. It will check the pre-roll conditions, determine if a soak period is required, transfer from throttle valve (TV) to governor valve (GV), check the presynchronizing conditions and allow the automatic synchronizer to put the unit on line or otherwise allow synchronization to occur, i.e. under accurate speed loop control.

During the operation of the turbine, whether during the acceleration period or under load, the computer will monitor the various parameters of the turbine, compare their values with limit values and print messages to inform the operator about the conditions of the machine to guide him in the operation of the unit.

The modes of operation are ATS Control and ATS supervision. If both the "turbine auto-start" and the "turbine supervision off" pushbuttons are not backlighted the ATS Program is in ATS Supervision and messages are printed out. Pressing the "turbine auto start" button brings the ATS Program into ATS control. Pressing the "turbine supervision off" button stops the messages from being printed out while the ATS Programs are still running. If the "turbine supervision off" button is pushed the second time, all current alarm messages and all subsequent messages are printed.

In ATS Control, the computer will control the unit from turning gear to synchronization and application of initial load.

The computer performs the following evaluations and control actions:
(a) Every minute prior to rolling off turning gear, the program checks and compares with allowable limits, the following parameters: Throttle temperature, differential expansions, metal temperature differentials, vacuum, exhaust temperatures, eccentricity, bearing metal temperatures, drain valve positions.
(b) Requests a change in throttle steam conditions to match impulse chamber steam temperature to metal temperature within $-100$ & $+200°$ F.
(c) Allows the turbine to roll off turning gear.
(d) Sets the target speed and selects the acceleration in the DEH controller.
(e) Determines the heat soak time at 2200 RPM and counts it down.
(f) Accelerates the turbine to 3300 RPM at controlled rates.
(g) Commands the DEH controller to transfer from throttle to governor control.
(h) Accelerates the turbine to synchronous speed.

(i) Allows the Automatic Synchronizer and DEH Controller to put the turbine on the line and apply minimum load.

(j) Calls for a "Load hold" at initial load if required by the thermal conditions of the turbine.

Under ATS Supervision, the function of the computer is limited to monitoring the various parameters and generating appropriate messages to assist the operator in the control of the turbine. The strain calculation is continuously performed to advise the operator about the thermal condition of the rotor. It is the operator's responsibility to match steam and metal temperatures, set demands, select rates of speed and load changes, determine the heat soak requirements and take all the necessary sequential steps to bring the turbine up to speed and load it.

All programs are called periodically and will run to completion depending on conditions set by a higher priority program when there is any Program P15 determines the appropriate action to be performed in a sequential operational order. Programs P01 through P14 check the turbine and generator parameters. They compute rotor temperatures and strain at impulse chamber zone; they calculate anticipated metal temperature differentials and differential expansions. Depending on the mode of operation these programs set or advise to set new DEH demands or holds.

3. PANEL INTERRUPT PROGRAM

A block diagram of the panel interrupt program 1156 is shown in FIG. 13.

The PANEL INTERRUPT program responds to Operator's Panel pushbutton requests by decoding the pushbutton identification and bidding the PANEL task to carry out the appropriate response. The PANEL INTERRUPT program is initiated by the Monitor interrupt handler.

The DEH turbine control system is designed to provide maximum flexibility to plant personnel in performing their function of operating the turbine. This flexibility is evidenced by an Operator's Panel with an array of pushbuttons arranged in functional groups, and an internal software organization which responds immediately to pushbutton requests by the operator. The heart of this instant response is the interrupt capability of the DEH control system.

Pressing any panel pushbutton activates a diode-decoding network which identifies the pushbutton, sets a group of six contacts to an appropriate coded pattern, and generates an interrupt to the computer. The Monitor interrupt handler responds within microseconds and runs the PANEL INTERRUPT program, which does a demand contact input scan of the special panel pushbutton contacts and bids the PANEL task to carry out the function requested by the operator. The panel interrupt program 1156 responds to pushbutton requests from the operator's panel 1130 and decodes any instructions therefrom. Then, the panel interrupt program 1156 bids or puts itself in a queue along with other panel requests for the panel task program 1112 in order to carry out the proper response. The operator's instructions from the operator's panel 1130 are routed to the proper location within the panel task program 1112 which calls upon a predetermined program for execution of a specific command.

4. VISUAL DISPLAY PROGRAM

Visual display of numerical information which resides in memory has been a traditional function of control computer systems. This feature provides communication between the operator and the controller, with both display and changing of internal information usually available. Continuous display of a quantity provides visual indication of trends, patterns and dynamic response of control system variables; periodically updated values of the displayed quantity are entered into the windows so that fast changes may readily be observed by operating and technical personnel.

The DEH control system has provision for visual display of six important control quantities through dedicated individual pushbuttons. In addition, complete valve status (i.e. position) may be displayed through a group of appropriate pushbuttons; all remaining control system variables, parameters or constants may be displayed through another pushbutton, in conjunction with keyboard-entered dictionary addresses which select the desired quantity for display.

Figure 15:
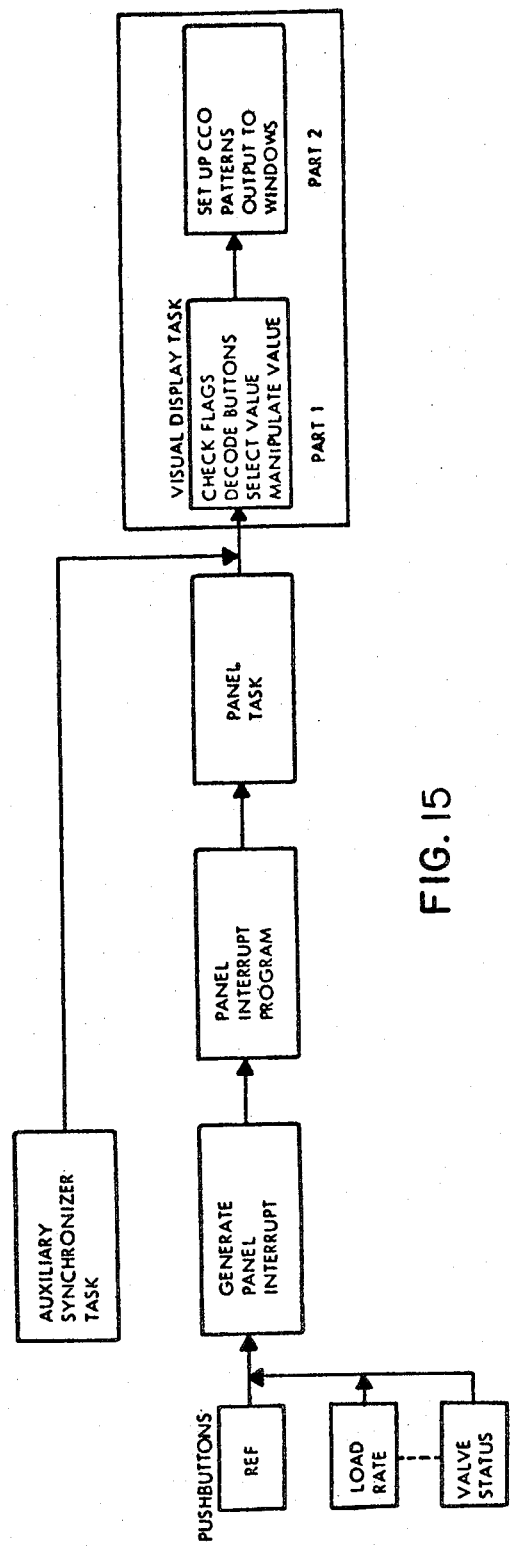
FIG. 15 is a block diagram of a visual display system which is operable in accordance with the principles of the invention.
Figure 16:
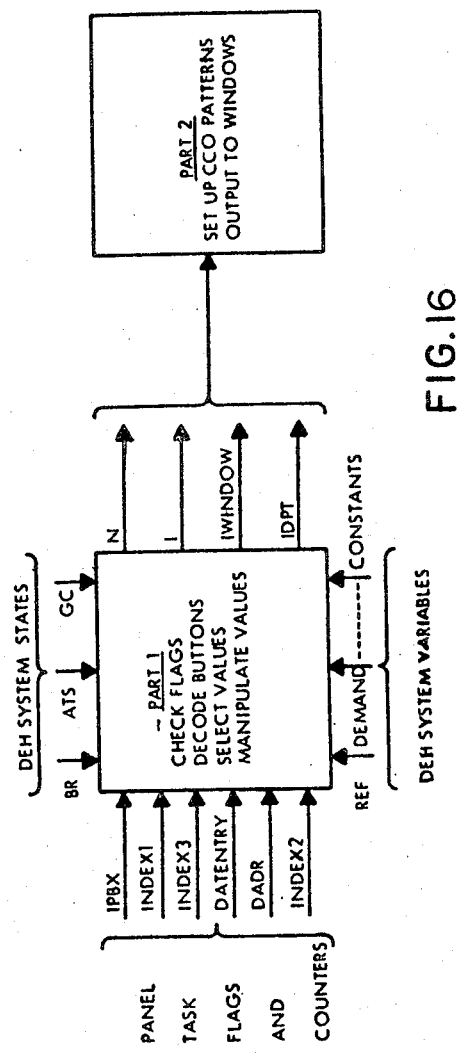
FIG. 16 is a block diagram of the execution of a two-part visual display function which is operable in accordance with the principles of the invention.

The visual display program 1134 as shown in FIG. 6 is connected with the panel interrupt program 1156 and the auxiliary synchronizer program 1114. The visual display program 1134 controls the display windows 1138 with a reference window 1852 and a demand window 1854. The demand window 1854 and the reference window 1852 are also shown in FIG. 12 as part of the operator's panel 1130. The visual display task 1134 aids in communication between an operator of the control panel 1130 of FIG. 12 and the digital electrohydraulic system 1100. By pressing an appropriate button such as the reference button 1856 a reference value will be displayed in the reference window 1852 and a demand value will be displayed in the demand window 1854. Similarly, for example, if a valve position limit display button 1858 is pressed a valve position limit value will be displayed in the reference window 1852 and the corresponding valve variable being limited is displayed in the demand window 1854. Upon pressing the load rate button 1858 the load rate will be displayed in the reference window 1852. In addition, a keyboard 1860 has the capability through an appropriate program to select virtually any parameter or constant in the DEH system 1100 and display that parameter in the reference window 1852 and the demand window 1854. Referring now to FIG. 14 a table of the display buttons and their functions is given in greater detail. In FIG. 15 a block diagram of the visual display program system is shown. FIG. 16 shows a block diagram of the execution of a two-part visual display function.

5. ANALOG SCAN PROGRAM

In order to carry out its function, a computer control system must be provided with inlput signals from the process or plant variables which are to be controlled. However, the vast majority of real process variables (for example pressure, temperature and position) are analog or continuous in their natural form, whereas the organization and internal structure of computers is digital or discontinuous in nature. This basic difference in information format between the controller and the controlled process must be overcome with interfacing equipment which converts process signals to an appropriate computer numerical value.

A device which can accomplish this function is the analog-to-digital (A/D) converter. The A/D converter provides the interface between plant analog instrumentation and the digital control system. Normally the analog signal as picked up from a transducer is in the millivolt or volt range, and the A/D converter produces an output bit pattern which may be stored in computer memory. A/D converters can only convert a limited number of analog inputs to digital form in a given interval of time. The usual method of stating this limit is to indicate the number of points (analog inputs) which can be converted in 1 sec. Thus, the A/D converter used in the DEH system has a capacity of 40 pps. Since the total number of analog inputs to the DEH system may be as high as 224, depending on the type of turbine to be controlled and the control system options selected, most of these must be scanned at a reduced frequency.

The nature of the plant variables which represent the analog inputs, and the sampling frequency of control programs using these inputs, are normally considered when one determines the scanning frequency of various analog input signals. In the DEH system, the control programs execute once a second and the primary analog signals used by the control system are generated megawatts, impulse pressure, throttle pressure, turbine speed and valve position. Since each of these variables may change a significant amount in a few seconds, all of these are scanned once a second. On the other hand, the majority of the analog inputs to the ATS program are temperatures which require minutes before significant changes in them may be observed. Consequently, all temperatures in the DEH system are scanned once a minute. The ATS program also requires a group of vibrations, which are scanned once every 5 sec, and a group of miscellaneous variables which are scanned once every 10 sec.

The analog scan program 1116, shown in FIG. 6 periodically scans all analog inputs to the DEH system 1100 for control and monitoring purposes. The function of the analog scan program 1116 is performed in two parts. The first part of the analog scan program 1116 comprises the scanning of a first group of analog inputs. Values of scanned inputs are converted to engineering units and the values are checked against predetermined limits as required for computations in the DEH computer.

The second part of the function of the analog scan program 1116 comprises the scanning of the analog inputs required for the automatic turbine startup program as shown in FIG. 6. Conversion and limit-checking of this latter group of inputs is performed by another program. The automatic turbine startup program is shown in FIG. 6 as the ATS periodic program 1140, the ATS analog conversion routine 1142 and the ATS message writer program 1144.

LOGIC CONTACT CLOSURE OUTPUT SUBROUTINE

The logic task 1110 includes a subroutine called a logic contact closure output subroutine 1910 therein. The logic contact closure output subroutine 1910 updates all the digital outputs to the status lamps and contacts 1128 for transmission thereto. The logic program 1110 handles a great number of contact or level outputs thereby keeping the output logic states of the DEH computer current. The logic contact closure output subroutine 1910 reduces the total storage requirements otherwise required for the logic program 1110. Additionally, the logic contact closure output subroutine 1910 is called by the logic program 1110 to provide a list of variables which are updated. A flow chart for the logic contact closure output subroutine 1910 is shown in FIGS. 17 and 18.

MAINTENANCE TEST

In order to take advantage of the full flexibility, adjustability and dynamic response of the DEH system 1100 a maintenance test system 1810 is provided, a logic flow chart of which is shown in FIG. 18. The maintenance test program 1810 allows an operator to change, adjust or tune a large number of operational parameters and constants of the DEH system 1100. The constants of the DEH system 1100 can therefore be modified without extensive adjustment or reprogramming. An operator is able to optimize the DEH system 1100 from the control panel 1130 as shown in FIG. 12 which allows for an essentially infinite variability in the choice of constants. Great flexibility and control is therefore available to an operator.

In addition, the maintenance test program 1810 of FIG. 18 allows an operator to use a simulation mode for operator training purposes.

COMPUTER SET MANUAL LOGIC

When the DEH system is in automatic control, it is possible for certain conditions to occur which require transfer to manual operator control. One of these is the case in which the maintenance test switch is moved to the test position. Even though a wired connection places the control in manual operation, the DEH LOGIC program sets a contact output requesting transfer to manual as a backup. The second situation occurs when the turbine is on automatic speed control and all speed input signals fail, as determined by the speed selection program in the CONTROL task. This speed channel failure will also require transfer to manual operation by a contact output from this LOGIC task.

Figure 19:
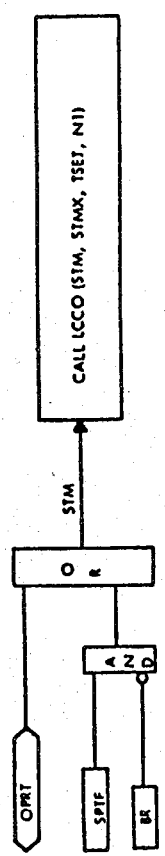
FIG. 19 is a flow chart of a transfer to manual operation subroutine which is operable in accordance with the principles of the invention.
Figure 20:
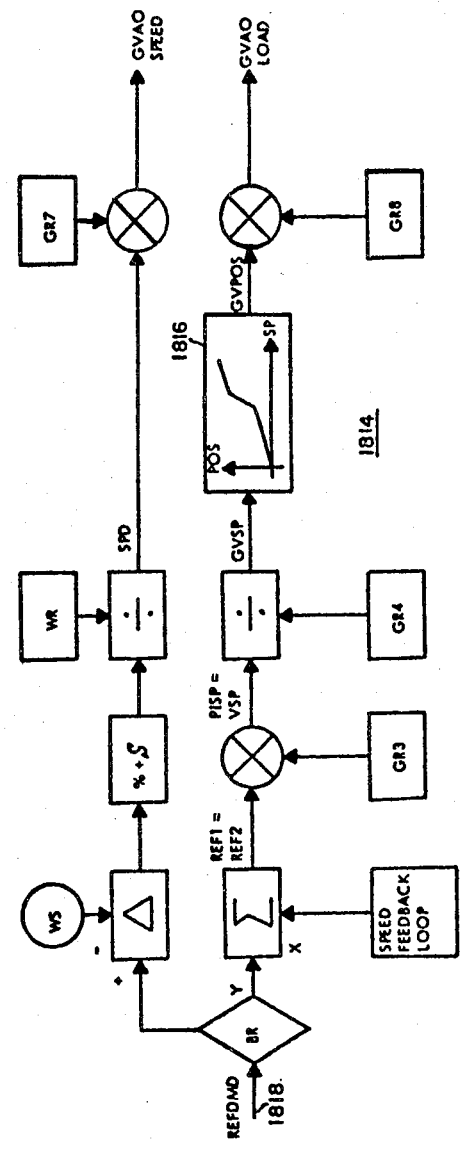
FIG. 20 is a block diagram of a load control system which is operable in accordance with the principles of the invention.

FIG. 19 shows a flow chart of a transfer to manual operation subroutine. In the event of specific malfunctions in the DEH system 1100 or the turbine system 10, the logic program 1110 transfers the DEH system 1100 back to the manual control of an operator. The malfunctions which initiate the transfer of the DEH system 1100 back to manual control include but are not limited to the failure of the speed signal while in speed control. STM is the logical variable to switch to turbine manual control, and is set by the maintenance test contact input (OPRT) or the speed channel failure variable (SPFT) while on speed control (i.e. the main breaker (BR) is not set). A call to the LCCO subroutine is then made.

MEGAWATT FEEDBACK LOGIC

Megawatt feedback is one of the two major loops used on turbine load control to maintain the governor valves at the correct position. The other feedback is impulse pressure; between these two loops it is possible to adapt the computer outputs to account for valve non-linearities and to assure that the megawatt setting in the reference window is actually being supplied by the turbine/generator.

The megawatt feedback logic places the megawatt loop in service on request from an operator's panel pushbutton, providing all permissive conditions are satisfied, and removes the loop from service from the operator's panel pushbutton or when any condition exists which requires removing the megawatt feedback. Placing the loop in service or removing it is done bumplessly, so that the governor valves remain at the same position. In addition, the REFERENCE and DEMAND values are automatically adjusted to agree with the new state of the DEH control system.

Figure 21:
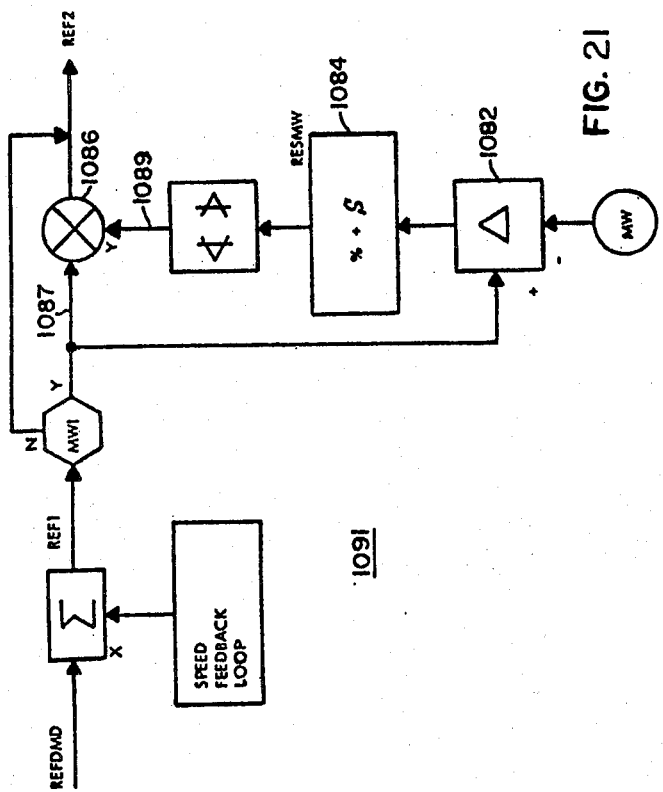
FIG. 21 is a block diagram of a megawatt feedback loop subroutine which is operable in accordance with the principles of the invention.

Referring to FIG. 21, a block diagram of the megawatt feedback loop is shown in greater detail than in FIG. 5. It should be noted that the speed compensated reference 1087, at the input of multiplication function 1086, is multiplied by the megawatt compensation 1089. The multiplication of the signals instead of a differencing provides an additional safety feature since the loss of either of the signals 1087 or 1089 will produce a zero output rather than a runaway condition.

IMPULSE PRESSURE FEEDBACK LOGIC

Impulse pressure feedback is the other of the two major loops used in the turbine load control to maintain the governor valves at the correct position. The impulse pressure feedback logic places the impulse pressure feedback loop in service on request from an operator's panel pushbutton, providing all permissive conditions are satisfied, and removes the loop from service on request from the operator or when any condition exists which requires removing impulse pressure feedback. Placing the loop in service or removing it is done automatically and bumplessly, so that the governor valves remain at the same position.

Figure 22:
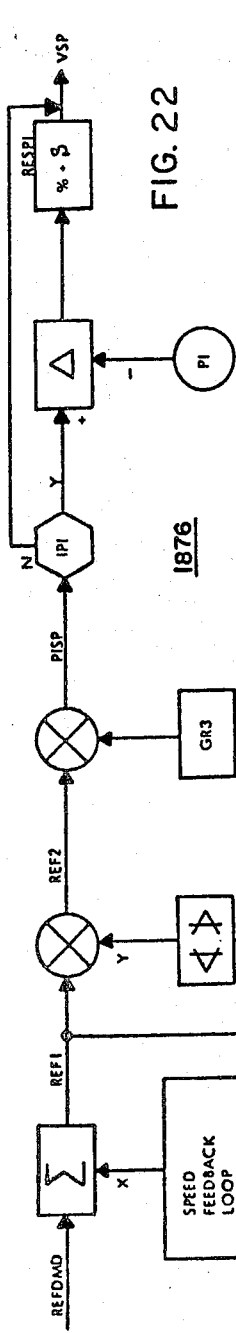
FIG. 22 is a block diagram of an impulse pressure loop with megawatt loop in service which is operable in accordance with the principles of the invention.

The impulse pressure feedback logic which includes the compare function 1090 and the impulse pressure 1088 of FIG. 5 is shown in greater detail in FIG. 22. The impulse pressure feedback loop (IMP loop) and the megawatt pressure feedback loop as shown in FIG. 21 adapt the DEH system 1100 by taking into account valve non-linearities and also assure that the megawatt setting selected by an operator is truly being supplied by the turbine 10 and the generator 16. The impulse pressure feedback logic 1816 provides the capability for the IMP loop to be bumplessly removed from service and placed in service. With a digital computer, bumpless transfer is achieved without the use of elaborate external circuitry because of the digital computational nature of the machine. A value can be computed instantaneously and inserted in the integrator 1218 of the proportional plus reset controller subroutine 1068 as shown in FIG. 7. In the preferred embodiment of the Digital Electro-Hydraulic control system 1100, the proportional plus reset controller 1168 is utilized by the following functions: the megawatt feedback loop 1091, the impulse pressure feedback loop 1816 and the speed feedback loop made up of the rated speed reference 1074, the compare function 1076 and the actual turbine speed function 1076.

6. Panel Task

The DEH Operator's Panel is the focal point of turbine operation; it has been designed to make use of the latest digital techniques to provide maximum operational capability. The Operator's Panel provides the primary method of communicating information and control action between the operator and the DEH Control System. This is accomplished through a group of pushbuttons and a keyboard (which together initiate a number of diverse actions), and two digital displays (which provide the operator with visual indication of internal DEH system numerical values).

When pressed, any of the buttons on the Operator's Panel provide momentary action during which a normally-open contact is connected to an electronic diode matrix. Operation of a button energizes a common computer interrupt for the Operator's Panel and applies voltage to a unique combination of 6 contact inputs assigned as a pushbutton decoder. The diode matrix may be used to identify up to 60 pushbuttons. When a button is pressed, the associated interrupt is read within 64 μsec, and the corresponding contact inputs scanned and stored in computer memory as a bit pattern for further processing.

Each of the buttons on the panel are backlighted. When a button is pressed and appropriate logical conditions exist, the lamp is turned on to acknowledge to the operator that the action he initiated has been carried out. Should the proper logical conditions not be set, the lamp is not turned on. This informs the operator that the action he requested cannot be carried out.

A few of the buttons are of the digital push-push type which when pushed once initiate an action, and when pushed again suppress that action. Some of these buttons also contain a split lens which indicates one action in the upper half of the lamp and another (usually opposite) action in the lower lens. In addition, certain button backlights are flashed under particular operating circumstances and conditions.

The buttons and keys on the Operator's Panel may be grouped in broad functional groups according to the type of action associated with each set of buttons. A brief description of these groups follows:

1. CONTROL SYSTEM SWITCHING—These buttons alter the configuration of the DEH Control System by switching in or out certain control functions. Examples are throttle pressure control and impulse pressure control.
2. DISPLAY/CHANGE DEH SYSTEM PARAMETERS—These buttons allow the operator to visually display and change important parameters which affect the operation of the DEH system. Examples are the speed and load demand, high and low load limits, speed and load rate settings, and control system tuning parameters.
3. OPERATING MODE SELECTION—This group of buttons provides the operator with the ability to select the turbine operating mode. Examples are permitting an Automatic Synchronizer or an Automatic Dispatch System to set the turbine reference, or selecting local operator automatic control of the turbine (which includes hold/go action).
4. VALVE STATUS/TESTING/LIMITING—This group of buttons allows valve status information display, throttle/governor valve testing, valve position limit adjustment.
5. AUTOMATIC TURBINE STARTUP—This group of buttons is used in conjunction with a special DEH program which continuously monitors important turbine variables, and which also may start up and accelerate the turbine during wide-range speed control.
6. MANUAL OPERATION—These buttons allow the operator to manually control the position of the turbine valves from the Operator's Panel. The DEH PANEL task has no direct connection with this group of buttons.
7. KEYBOARD ACTIVITY—These buttons and keys allow numerical data to be input to the DEH system. Such information may include requests for numerical values via the display windows, or may adjust system parameters for optimum performance.

Figure 23:
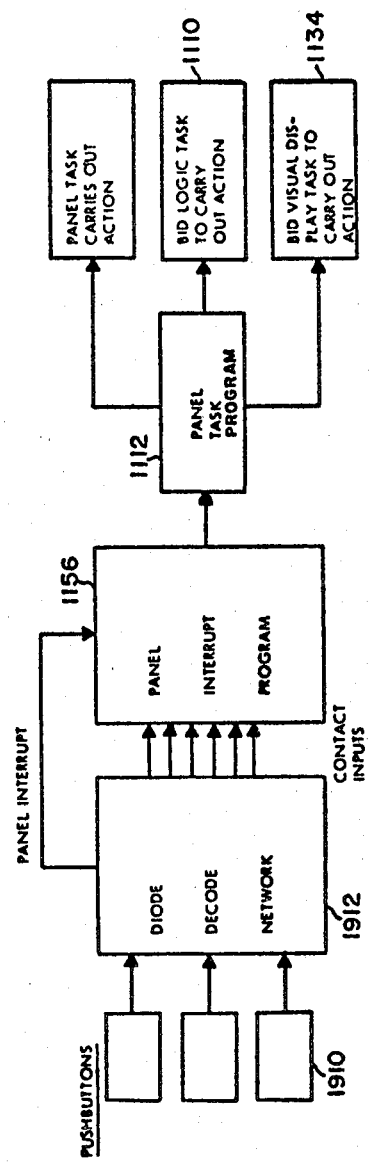
FIG. 23 is a block diagram showing a panel task interaction function which is operable in accordance with the principles of the invention.

The panel task 1112 responds to the buttons pressed on the operator's panel 1130 by an operator of the DEH control system 1100. The control panel 1130 is shown in FIG. 12. Referring now to FIG. 23, the interactions of the panel task 1112 are shown in greater detail. Pushbuttons 1110 are decoded in a diode decoding network 1912 which generates contact inputs to activate the panel interrupt program 1156. The panel interrupt program scans the contact inputs and bids the panel task 1112 whereby the pressed button is decoded and either the panel task 1112 carries out the desired action or the logic task 1110 is bid or the visual display task 1134 is called to carry out the desired command. In FIG. 23 the panel task 1112 is shown in block diagram form.

7. Control Program

Automatic control of turbine speed and load requires a complex, interacting feedback control system capable of compensating for dynamic conditions in the power system, the boiler and the turbine-generator. Impulse chamber pressure and shaft speed from the turbine, megawatts from the generator, and throttle pressure from the boiler are used in the controlled operation of the turbine.

In addition to the primary control features discussed above, the DEH system also contains provisions for high and low load limits, valve position limit, and throttle pressure limit; each of these can be adjusted from the Operator's Panel. A number of auxiliary functions are also available which improve the overall turbine performance and the capabilities of the DEH system. Brief descriptions of these follow:
 1. Valve position limit adjustment from the Operator's Panel.
 2. Valve testing from the Operator's Panel.
 3. Speed signal selection from alternate independent sources.
 4. Automatic instantaneous, and bumpless operating-mode selection from the Operator's Panel.
 5. A continuous valve position monitor and contingency-alert function for the operator during automatic control.
 6. A digital simulation and training feature which allows use of the Operator's Panel and most of the DEH system at any time on manual control, without affecting the turbine output or valve position. This powerful aid is used for operator and engineer training, simulation studies, control system tuning or adjustment, and for demonstration purposes.

In order to achieve these objectives, the CONTROL task is provided with analog inputs representing the various important quantities to be controlled, and also is supplied with contact inputs and system logical states.

Figure 25:
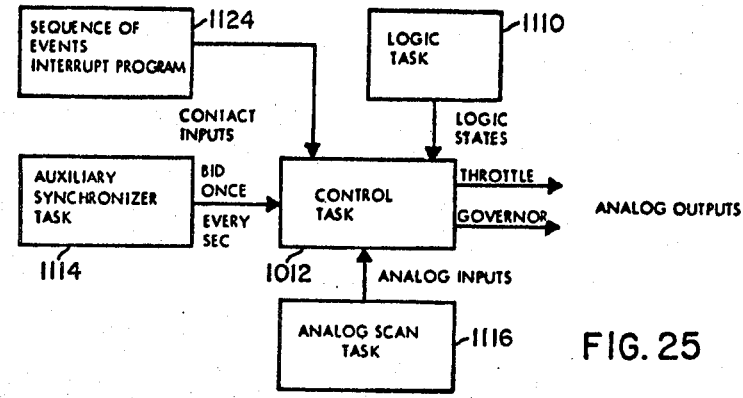
FIG. 25 is a block diagram showing a control task interface which is operable in accordance with the principles of the invention.
Figure 26A:
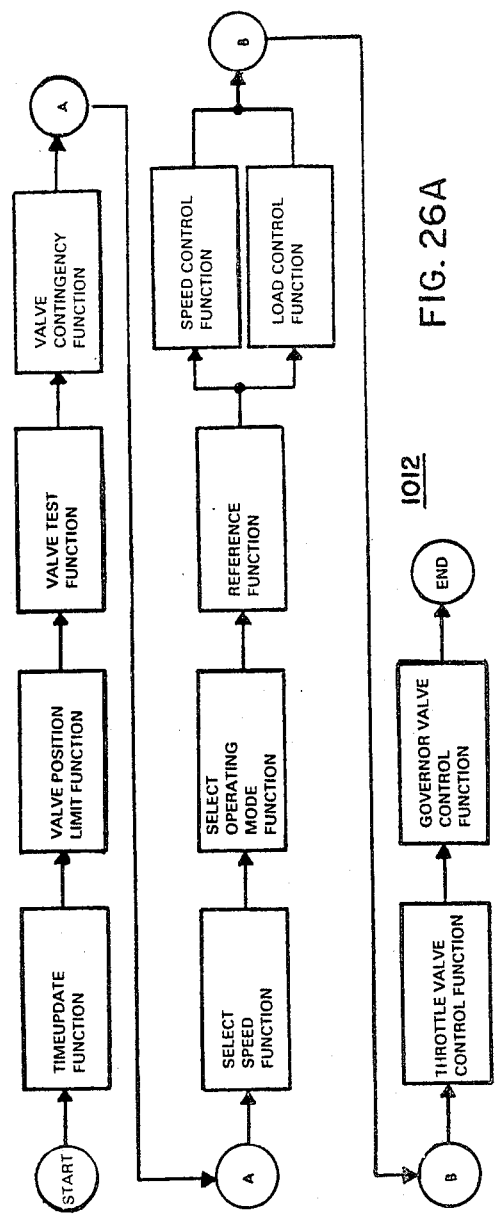
FIG. 26A is a block diagram showing a control program which is operable in accordance with the principles of the invention.

The control program 1012 and related programs are shown in greater detail in FIG. 25. In the computer program system, the control program 1012 is interconnected with the analog scan program 1116, the auxiliary sync program 1114, the sequence of events interrupt program 1124 and the logic task 1110. FIG. 26A shows a block diagram of the control program 1012. The control program 1012 accepts data from the analog scan program 1116, the sequence of events interrupt program 1124 and is controlled in certain respects by the logic program 1110 and the auxiliary synchronizing program 1114. The control program 1012, upon receiving appropriate inputs, computes the throttle valve TV1-TV4 and the governor valve GV1-GV8 outputs needed to satisfy speed or load demand.

Figure 27:
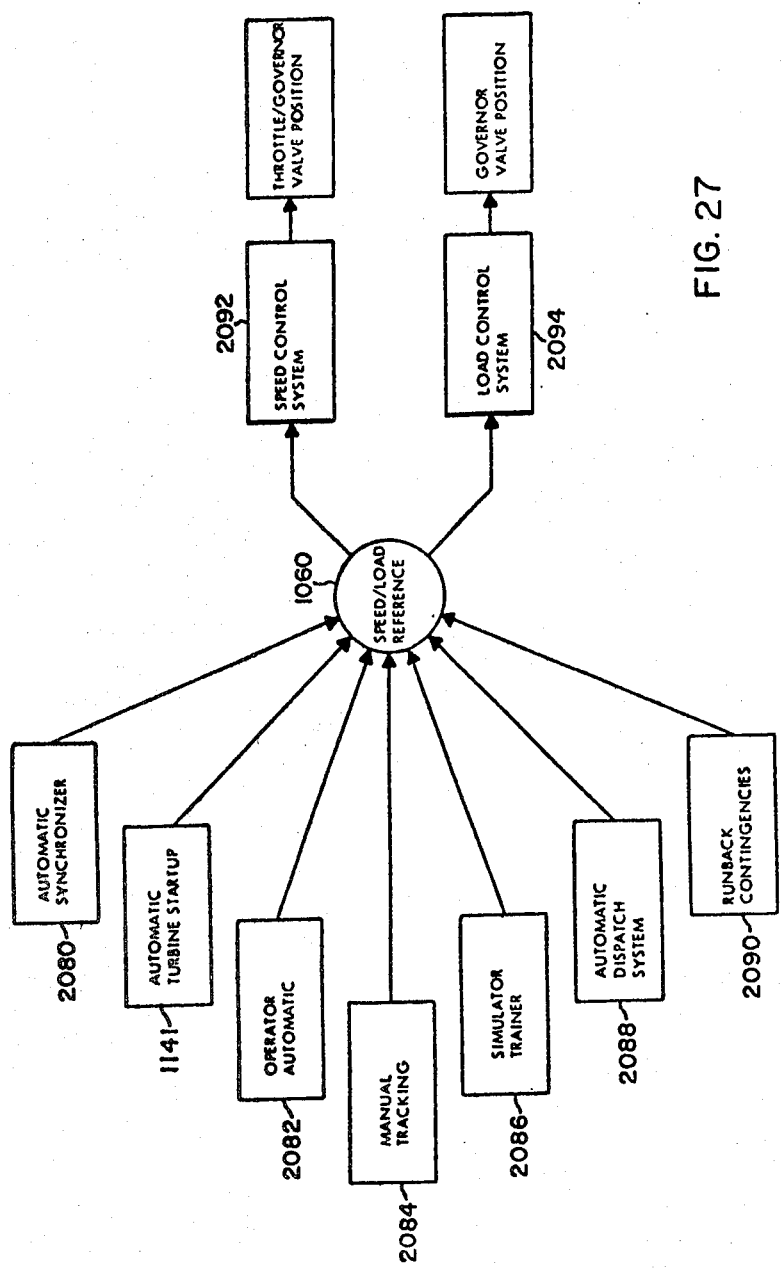
FIG. 27 shows a symbolic diagram of the use of a speed/load reference function which is operable in accordance with the principles of the invention.

The control program 1012 of the DEH control system 1100 functions, in the preferred embodiment, under three modes of DEH system control. The modes are manual, where the valves GV1-GV8 and TV1-TV4 are positioned manually through the hardwired control system and the DEH control computer tracks in preparation for an automatic mode of control. The second mode of control is the operator automatic mode, where the valves GV1-GV8 and TV1-TV4 are positioned automatically by the DEH computer in response to a demand signal entered from the keyboard 1130, of FIG. 12. The third mode of control is remote automatic mode, where the valves GV1-GV8 and TV1-TV4 are positioned automatically as in the operator automatic mode but use the automatic turbine startup program 1141 or an automatic synchronizer or an automatic dispatch system for setting the demand value. In the DEH turbine controller, the speed/load reference is the central and most important variable in the entire control system. The reference serves as the junction or meeting place between the turbine speed or load demand, selected from any of the various operating modes discussed in the last section, and the Speed or Load Control System, which directs the reference through appropriate control system strategy to the turbine throttle and governor valves to supply the request demand. FIG. 27 is a diagram which indicates the central importance of the reference in the DEH control system.

The speed/load reference function increments the internal turbine reference at the selected rate to meet the selected demand. This function is most useful when the turbine is on Operator Automatic, on the AUTOMATIC TURBINE STARTUP program, or in the Simulator/Trainer modes. This is because each of these control modes requests unique rates of change of the reference, while the remaining control modes, such as the Automatic Synchronizer and the Automatic Dispatch System, move the reference in pulses or short bursts which are carried out in one step. The Runback and Throttle Pressure contingency modes use some of the features of the reference function, but they bypass much of the subtle reference logic in their hurry to unload the turbine.

For these modes which request movement of the reference at a unique rate, the reference function must provide the controlled motion. Not only must the rate be ramped exactly, but the logic must be such that, at the correct time, the reference must be made exactly equal to the demand, with no overshoot or undershoot. In addition, the reference logic must be sensitive to the GO and HOLD states, and must start or stop movement instantly if requested to do so. Finally, the reference system must turn off the GO and HOLD lamps, if conditions dictate, by passing on to the LOGIC task the proper status information to accomplish this important visual indication feature.

SPEED LOAD REFERENCE FUNCTION

Referring now to FIG. 27, a block diagram of the operation of the speed/load reference function is shown. The decision breaker function 1060, of FIG. 5, is identical to the speed/load reference function 1060, of FIG. 27. A software speed control subsystem 2092 of FIG. 27, corresponds to the compare function 1062, the speed reference 1066 and the proportional plus reset controller function 1068, of FIG. 5. The software load control subsystem 1094, of FIG. 27, corresponds to the rate speed reference 1074, the turbine speed 1076, the compare function 1078, the proportional controller 1080, the summing function 1972, the compare function 1082, the proportional plus reset controller function 1084, the multiplication function 1086, the compare function 1090, the impulse pressure transducer 1088 and the proportional plus reset controller 1092, of FIG. 5. The speed/load reference 1060 is controlled by, depending upon the mode, and automatic synchronizer 1080, the automatic turbine starter program 1141, and operator automatic mode 1082, a manual tracking mode 2084, a simulator/trainer 2086, an automatic dispatch system 2088, or a run-back contingency load 2090. Each of these modes increments the speed/load reference function 1060 at a selected rate to meet a selected demand.

Figure 28:
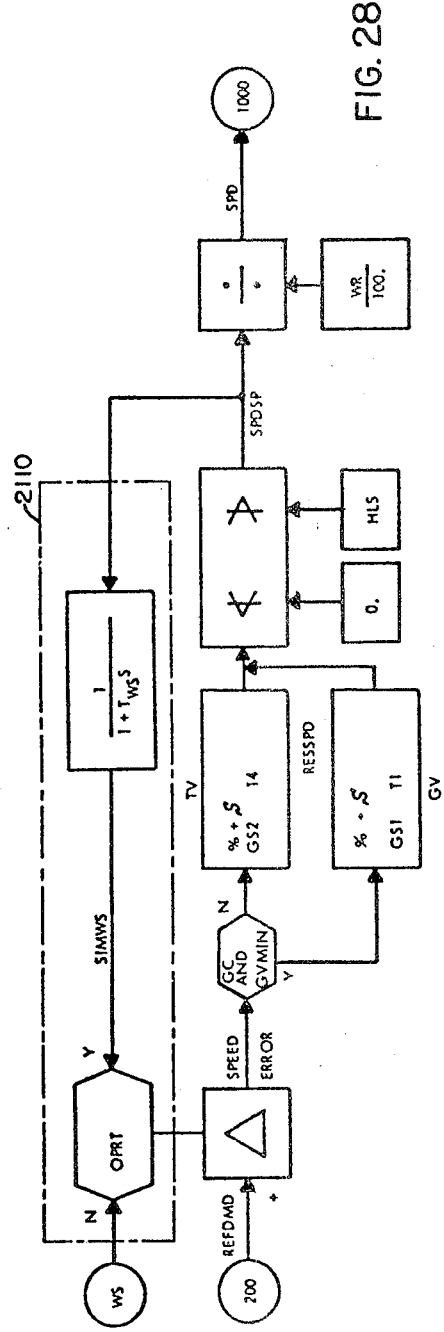
FIG. 28 is a block diagram showing a speed control function which is operable in accordance with the principles of the invention.

The speed control function positions the throttle and governor valves to achieve the existing speed reference with optimum dynamic and steady state response. This is accomplished by using individual proportional-plus-reset controllers for throttle and governor valve speed control, as shown in FIG. 28. The speed error between the turbine speed reference and actual speed drives the appropriate controller, which then reacts by positioning the proper valves to reduce the speed error to zero. The speed controller outputs and low-limit checked against zero and high-limit checked against the quantity HLS, which is a keyboard-entered constant set at 4200 rpm. This prevents the controllers from reaching a reset-windup condition which may inadvertently occur in odd circumstances. The speed controller output is then suitably ranged from 0 to 100 percent and sent downstream as the quantity SPD in the CONTROL task to the THROTTLE and GOVERNOR VALVE programs.

SPEED CONTROL FUNCTION

FIG. 28 is essentially a combination of FIG. 5 and FIG. 7 with an additional program path which generates a simulated speed signal in the maintenance test mode of operation. The simulated speed signal is generated by feeding back the speed signal to a first order lag transfer function, thereby approximating the initial response of the turbine-generator 10.

Figure 30:
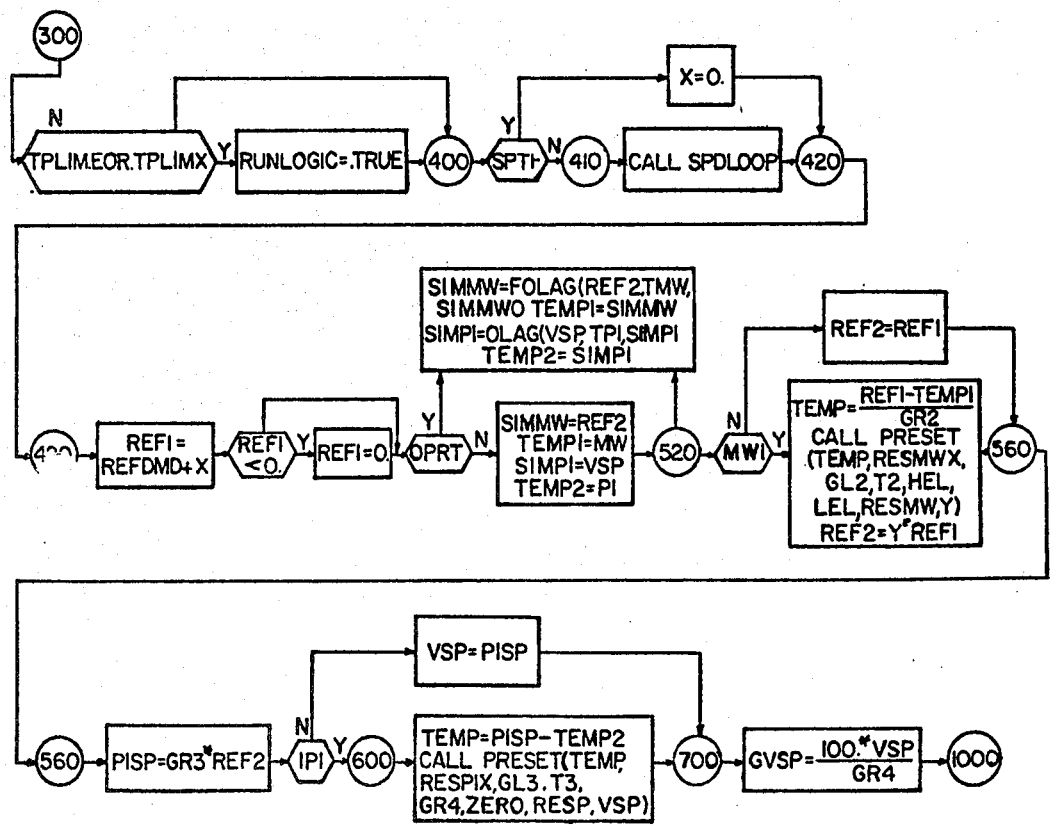
FIG. 30 includes a flow chart of the load control system which is operable in accordance with the principles of the invention.
Figure 29:
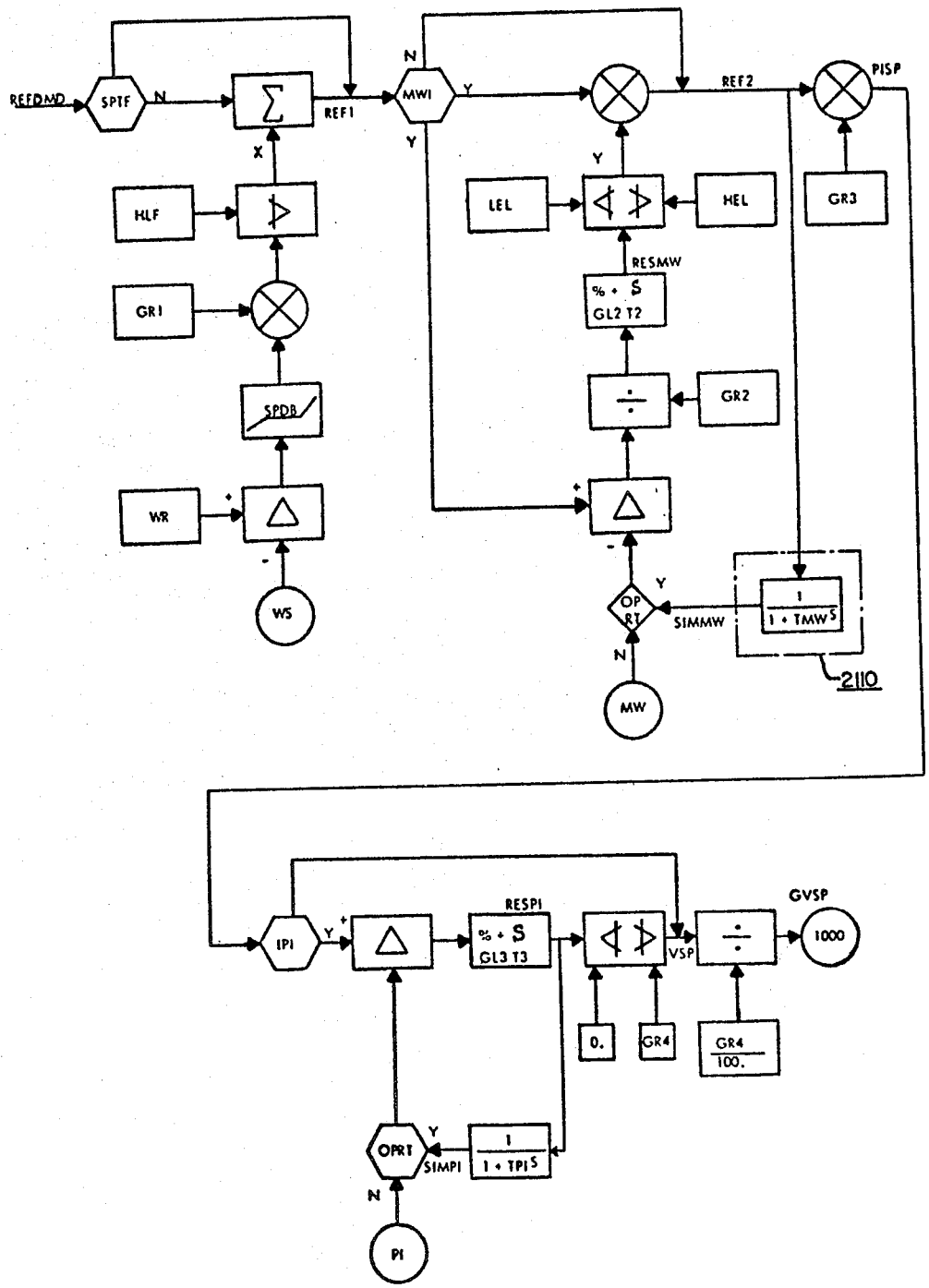
FIG. 29 shows a block diagram of the load control system which is operable in accordance with the principles of the invention.
Figure 31:
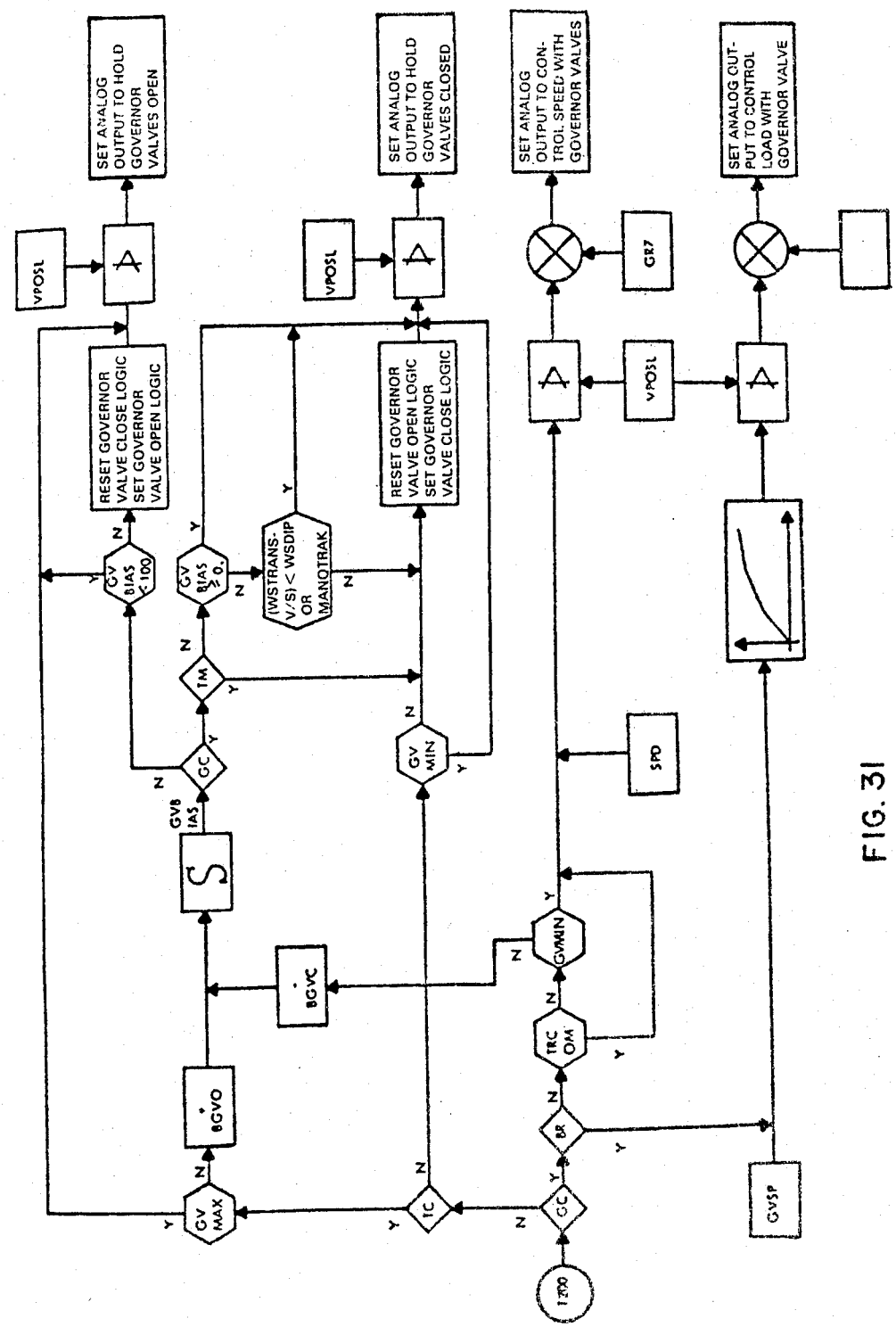
FIG. 31 shows a mixed block diagram of a governor control function program which is operable in accordance with the principles of the invention.

The load control function positions the governor valves to achieve the existing load reference with optimum dymanic and steady state response. This is accomplished with a feedforward-feedback control system strategy designed to stabilize interactions between the major turbine-generator variables: impulse chamber pressure, megawatts, shaft speed and valve position. FIGS. 29 and 30 show the control system which satisfies these objectives.

The main feedforward path is represented by the turbine load reference valve (REFDMD), which is computed by the operating mode selection function described eariler. The feedforward variable (REFDMD) is compensated with two feedback trim factors to account for frequency (speed) participation and megawatt mismatch. The speed compensation is provided by a proportional feedback loop in which the droop regulation gain (GR1) is adjusted to yield rated megawatts correction for a 180 rpm speed error. This speed feedback factor (X) is then summed with the turbine load reference (REFDMD) to produce the speed-corrected load reference (REF1).

A special feature which has been incorporated in the speed feedback loop is a software speed-deadband; this non-linear function filters out high-frequency low-amplitude noise on the speed input signal, thus keeping the load control system from responding to such meaningless information. The width of the speed deadband may be adjusted from the keyboard by setting the appropriate value into the constant SPDB. Another special feature of the speed deadband is the method of implementing this function in comparison with most standard control systems. The common way to incorporate the speed deadband in previous systems is to allow speed errors greater than the width of the deadband to enter the control system completely. This has been found to shock many systems into oscillatory conditions which may have undesirable effects. In the DEH Control System the speed error, when it is larger than the deadband, is smoothly entered into the speed compensation factor by a linear relationship. Thus the shock effect of a sudden speed error is removed completely.

The megawatt feedback loop provides a trim correction signal which is applied to the speed-compensated load reference (REF1) in a product form to yield the speed-and-megawatt corrected load reference (REF2). An additional highly desirable feature of megawatt feedback in the DEH system is that with it the reference and demand display windows on the Operator's Panel are calibrated in actual megawatts when the loop is in service. A proportional-plus-reset controller is used to reduce megawatt error to zero, with the loop providing a feedback factor (Y) which floats around unity (1.0) in performing its corrective action. As usual, high and low limits are provided to prevent reset windup and to bound the range of megawatt compensation.

The load reference (REF2), now corrected for speed and megawatt errors, becomes the set point for the impulse pressure cascade feedback loop or the direct demand for valve position, depending on whether the impulse pressure loop is in or out of service. REF2 is multiplied by a ranging gain (GR3) to convert the impulse pressure set point (PISP) in psi. If the loop is in service, then a proportional-plus-reset controller is implemented to drive the impulse pressure error to zero; as always, high and low limits restrict the range of variation of the controller to eliminate the possibility of reset windup. The final governor valve set point (VSP), whether it is generated by the feedback loop or directly from the load reference (REF2), is then converted into a percent valve demand (GVSP) by suitable ranging and is sent downstream in the control task to the THROTTLE and GOVERNOR VALVE programs.

LOAD CONTROL FUNCTION

The load control function block diagram shown in FIGS. 29 and 30 is an expansion of the load control, shown in FIG. 5, incorporating the speed loop subroutine and proportional control of function diagram of FIG. 9.

MANUAL TRACKING

Figure 26B:
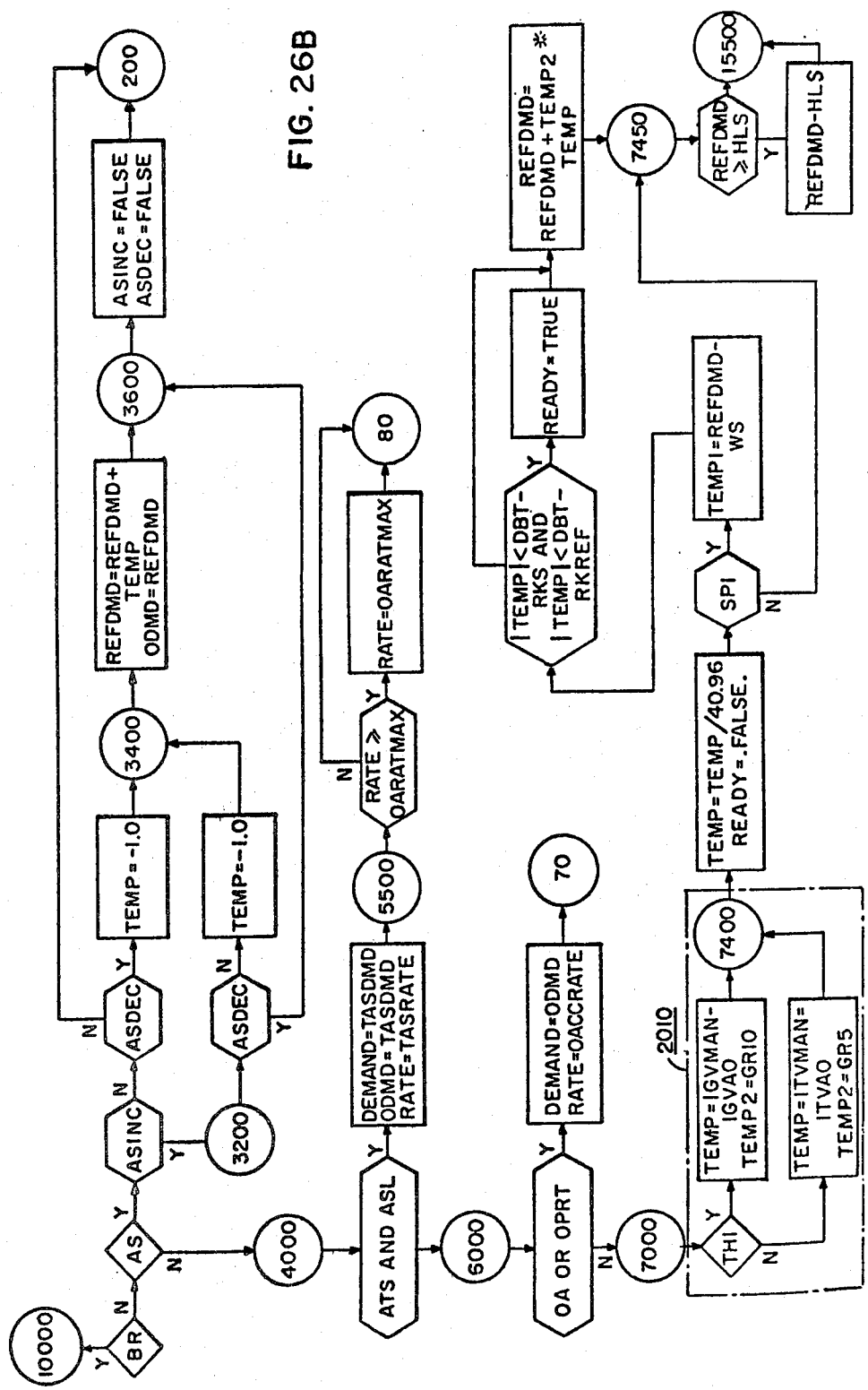
FIG. 26B shows a flow chart of a select operating mode function which is operable in accordance with the principles of the invention.

The select operating mode flow chart of FIG. 26B, includes a speed tracking function 2010 for transferring bumplessly fron one mode to another.

Figure 26C:
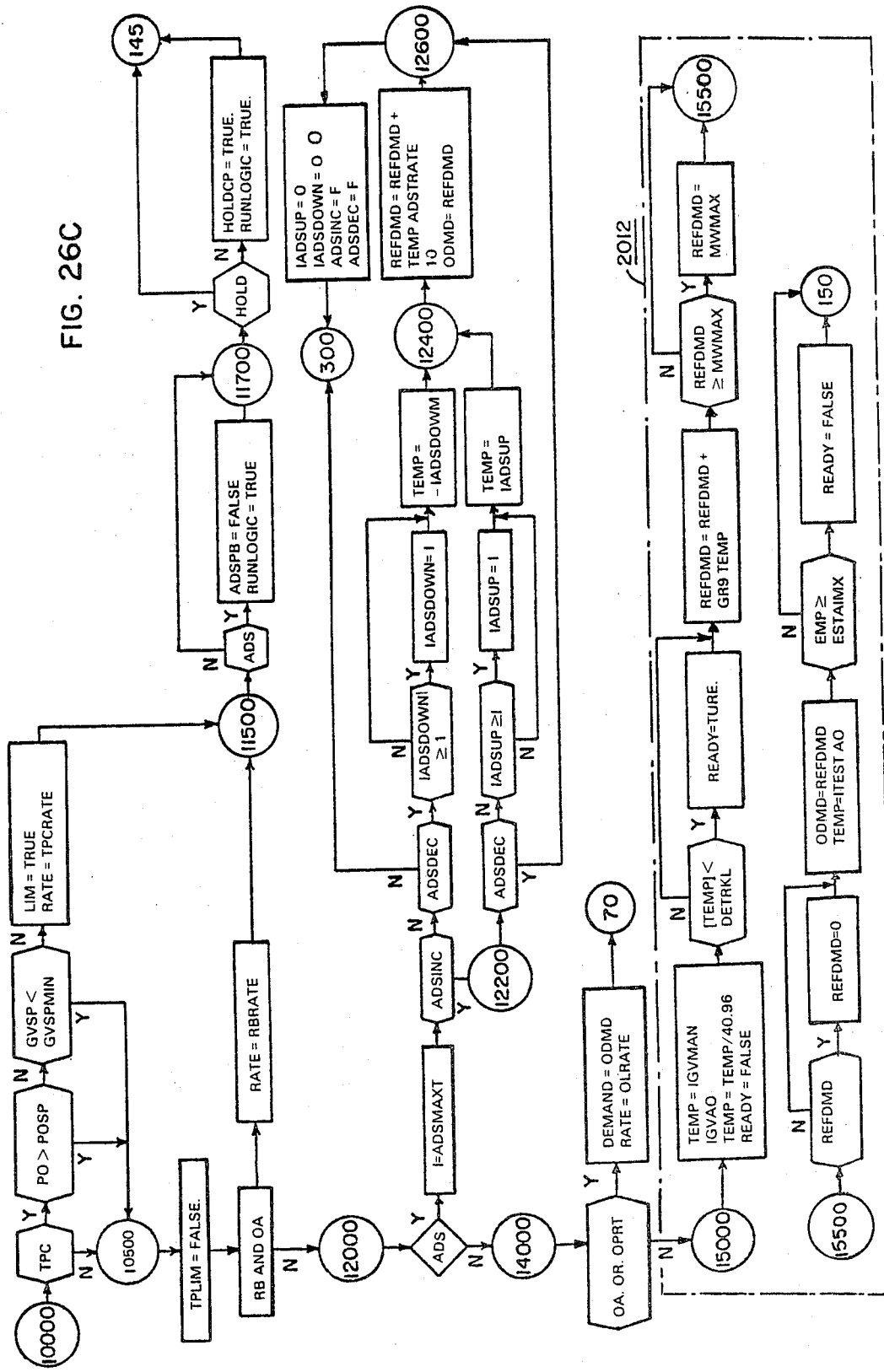
FIG. 26C shows a flow chart of a select operating mode function which is operable in accordance with the principles of the invention.

In FIG. 26C, a load tracking function 2012 provides for manual tracking during load control.

PANEL INTERRUPT PROGRAM

A scan of the panel contact inputs (which are on channel 0) is performed with an IOA instruction. The high-order bits are then masked out so that the six contacts on bits 0 through 5 remain to identify the push-button pressed. This information is then stored in location IPB in the BETA COMMON area, the PANEL task is bid, and return is made to the Monitor interrupt handler indirectly through location $00DF_{16}(0223_{10})$ in the Monitor zero table. The program size is 18 words and the data pool size is 3 words for a required storage of 21 words. The program is normally linked separately and loaded into the computer through the tape reader. The PANEL INTERRUPT program has been assigned core area $(1480$ to $149F)_{16}$; this is $20_{16}(32_{10})$ locations, thus allowing a few spares for growth.

The panel interrupt is number 33 in the total list of interrupts in the DEH system. The Monitor interrupt transfer table (INTB) must be initialized to contain the location of the PANEL INTERRUPT program. The table entry is at $0346_{16}$ and the value $1480_{16}$ must be entered in this location. Normally this is done with a special SYMBOLIC ASSEMBLY program which defines all interrupt locations, and which is loaded after complete debugging of the DEH system in the field.

VISUAL DISPLAY TASK

The VISUAL DISPLAY task is on priority level 8 and is normally bid by the AUX SYNC task every 1 sec; however, when the operator requests a new display quantity, then VISUAL DISPLAY will be bid initially by the PANEL task.

A description of the display pushbuttons is given in FIG. 14, where there is also included the value of the counter (IPBX) which identifies these buttons to the appropriate DEH programs. Since most of the display pushbuttons in FIG. 14 are dedicated to a single quantity, the programming mechanism to accomplish this function is straightforward. However, the general DEH parameter display requires a coded address to access the proper quantity in the various COMMON areas. This coding is necessary because the format of the displayed variable may be logical, integer or real (floating point); in addition, the variable may reside in the base DEH area, and thus exist in all systems, or it may reside in the AUTOMATIC TURBINE STARTUP area, and thus be an option which may or may not exist in all systems.

To accommodate these various situations, a dictionary addressing scheme has been designed which will provide access to every combination of variables. In this scheme all addresses are composed of four digits, each of which may validly range from 0 through 9. The most significant digit is coded to indicate the desired variable format (logical, integer or real) and the storage area (base DEH or ATS). The three least significant digits simply point to the relative location of the variable in either the base DEH or the ATS COMMON area.

The following table lists the address structure. The symbols XXX represent relative location in COMMON area and are completely catalogued in the dictionary portion of the operating instructions. The remaining most significant digit and its definition are tabulated.

| ADDRESS STRUCTURE | |
|---|---|
| Address | Definition |
| 1XXX | Base DEH system - logical variable |
| 2XXX | Base DEH system - integer variable |
| 3XXX | Base DEH system - real variable |
| 4XXX | Base DEH system - real constant which may be changed from keyboard under special conditions |
| 5XXX | ATS system - logical variable |
| 6XXX | ATS system - integer variable |
| 7XXX | ATS system - real variable |
| 8XXX | ATS system - real temperature variable |
| 9XXX | ATS system - real pressure variable |

Under normal conditions, the program is bid once a second by the AUX SYNC task. However, when the operator presses a panel pushbutton to request a new display, a separate path to the VISUAL DISPLAY task is taken. The pushbutton generates a panel interrupt which is serviced by the Monitor; this results in the PANEL INTERRUPT program being executed, and after decoding the pushbutton pressed the PANEL program runs. The PANEL task responds by setting appropriate flags and counters, and then bids the VISUAL DISPLAY task.

Whether called from the AUX SYNC or the PANEL task, the VISUAL DISPLAY program performs its functions the same way. It first checks the appropriate flags and counters previously set, decodes these, selects the proper numerical value from core storage, and then manipulates this value to the correct form. Then the VISUAL DISPLAY task sets up a contact output pattern for the number to be displayed and gates this to the display hardware.

The VISUAL DISPLAY program first reacts to a group of variables which have been set by the PANEL task, and then VISUAL DISPLAY creates another group of variables which will place the proper values in the windows. Concerning those variables generated by the PANEL program, IPBX indicates which display pushbutton has been pressed as shown in FIG. 14. INDEX1 and INDEX3 are flags which indicate special action; INDEX1 means a VALVE STATUS or PROGRAM DISPLAY pushbutton has been pressed and thus both display windows should be cleared preparatory to additional keyboard entries; INDEX3 indicates a dedicated pushbutton has been pressed and new values for the dedicated variable are being entered from the keyboard. DATENTRY and DADR are flags associated with changing DEH system constants while INDEX2 is a relative location in a COMMON area indicated by the symbols XXX in the above table.

The DEH system state (BR) is necessary when displaying REFERENCE in order to place the MW or SPEED message in the left-most windows. The state ATS is required when displaying REFERENCE and ACCELERATION RATE since these quantities are set by the ATS program, rather than from the keyboard, when the turbine is being accelerated by computed values from ATS. The state GC is necessary when displaying VALVE POSITION LIMIT since the limited quantity depends on whether the turbine is on throttle or governor control. The DEH system variables, such as REFERENCE, DEMAND, RATES and LIMITS are accessed from appropriate COMMON areas through the use of INDEX2.

Go Logic

When the DEH system is on operator automatic control, the turbine speed/load (DEMAND) is entered from the keyboard. The operator then may allow the turbine reference to adjust to the demand by pressing the GO pushbutton. When the operator does this, the GO lamp is turned on and logical states are set to begin moving the reference in the CONTROL task. When the reference equals the demand, the GO lamp is turned off. The GO logic detects the various conditions affecting the GO state and sets the status and lamp accordingly.

The GO pushbutton (GOPB), which is updated by the PANEL task, is the set signal for the GO flip-flop. The reset or clear signal, which will override the set signal, can occur from a number of different conditions as follows: the HOLD pushbutton (HOLDPB) as updated by the PANEL task, a computed hold condition (HOLDCP) as set by the CONTROL or LOGIC tasks, the DEH system not being in operator automatic control (OA) or in the maintenance test condition (OPRT) (during which the system may be used as a simulator/trainer), or the condition in which the reference has reached the demand and the CONTROL task sets the GOHOLDOF state to clear the GO lamp.

Hold Logic

When the DEH system is an operator automatic control, the turbine speed/load (DEMAND) is entered from the keyboard. The operator may then inhibit the turbine reference from adjusting to the demand by pressing the HOLD pushbutton. When the operator does this, the HOLD lamp is turned on and logical states are set to prohibit the reference from moving in the CONTROL task. The HOLD logic detects the various conditions affecting the HOLD state and sets the status and lamp accordingly.

The HOLD pushbutton state (HOLDPB), which is set by the PANEL task, or the hold state (HOLDCP) computed by the CONTROL or LOGIC tasks, acts as the set signal for the HOLD flip-flop. The reset or clear signal, which will override the set signal, can occur from a number of different conditions as follows: the DEH system not being on operator automatic control (OA) or in the maintenance test condition (OPRT) (during which the system may be used as a simulator/trainer), the GO flip-flop being set and thus overriding the HOLD state, or the condition in which the reference has reached the demand and the CONTROL task sets the GOHOLDOF state to clear the HOLD lamp. The HOLD logic program then resets the computed hold state (HOLDCP) and the GOHOLDOF state, so that they may be used in future decisions by the CONTROL and LOGIC tasks.

PANEL TASK

The PANEL task is assigned priority level $C_{16}(12_{10})$ and is bid by the PANEL INTERRUPT program when a button is pressed.

Figure 24:
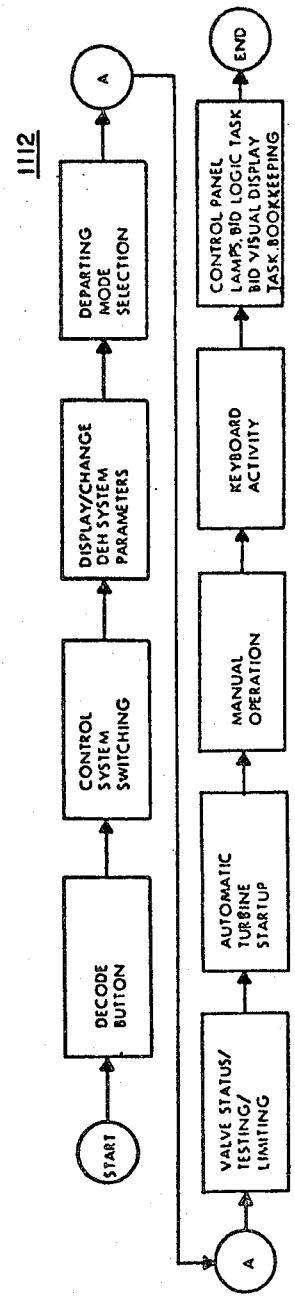
FIG. 24 is a block diagram of a panel program which is operable in accordance with the principles of the invention.

FIG. 24 shows a block diagram of the major functions performed by the PANEL task. These include executing each of the button group functions discussed above, as well as additional decisions, checks, and bookkeeping necessary to properly perform the action requested by the operator.

Button Decode

The BUTTON DECODE program examines the button identification (IPB) provided by the PANEL INTERRUPT program, and transfers to the proper location in the PANEL task to carry out the action required by this button. The program also does some bookkeeping checks necessary to keep the panel lamps in the correct state. A total of 54 buttons can be decoded in the current version of the DEH PANEL task.

The identification of the last button (IPBX), which had been pressed and which has associated with it a visual display mode lamp, is stored in a temporary integer location (JJ) for later use in turning off the last lamp. Then the current button identification (IPB) is checked to determine if it represents the ENTER pushbutton; if so, a special logical variable ENTERPB is reset for later use should the ENTER button be pressed two or more consecutive times. This has been found to be a rather common operator error and is flashed as an invalid request. The program then simply executes a FORTRAN computed GO TO statement and transfers to the appropriate portion of the PANEL task.

Display/Change DEH System Parameters

Eight buttons allow the operator to display or change various DEH system parameters. Six of these buttons are dedicated to the display or change of a single important parameter for each button. The remaining two buttons provide the ability to display or change a group of DEH system variables from each button. In addition, two special buttons (GO and HOLD) are intimately associated with one of the dedicated display/change buttons, and thus are also included in this discussion.

Before listing each of these buttons, a brief description of the display window mechanism is given. The DEH Operator B Panel contains two digital displays which are provided with five windows each. The left display, labeled REFERENCE, has two major functions. It either presents numerical information which currently exists in computer memory for the six dedicated buttons mentioned above, or it accepts address inputs from the keyboard for the two buttons assigned to display or change groups of DEH system variables. The right display, labeled DEMAND, also has two major functions. It either accepts keyboard inputs in preparation for changing any of the currently existing numerical information in computer memory for the six dedicated buttons mentioned above, or it presents currently existing information in computer memory for the two buttons assigned to display or change groups of DEH system variables.

Of the five windows in each digital display, the leftmost is reserved for mnemonic characters. These characters combine to form a short message identifying the numerical quantity in the remaining four windows. The following table lists the 11 available messages and an explanation of each. The four right windows in each display provide the numerical digits 0 through 9 and a decimal point where appropriate.

| MNEMONIC CHARACTER DEFINITION | |
|---|---|
| Message | Explanation |
| MW | Megawatt Symbol for Load Control |
| SPEED | Speed Symbol for Speed Control |
| % VALVE POSITION | Percent Valve Position for Valve Status |
| RPM/MIN | Acceleration Rate |
| MW/MIN | Load Rate |
| SYS PAR | General DEH System Parameter |
| IMP PRESS % | Impulse Pressure in Percent For Load Control |
| PRESS | General Pressure Variable |
| TEMP | General Temperature Variable |
| VALVE NO. | Valve Identification for Valve Status |
| — | Algebraic Negative Quantity |

A brief description of the eight buttons associated with display/change as well as the GO and HOLD buttons, follows:

1. REFERENCE—This button initiates a display or change of the DEH reference and demand for speed or load operation. When the turbine is on operator automatic control, new demand values may be entered from the keyboard. However, when the turbine is in a remote operating mode such as automatic synchronizer, dispatch or ACCELERATION program, the demand cannot be changed from the keyboard. Any attempt to do so is flashed as an invalid request.

2. ACCELERATION RATE—This button initiates a display or change of the acceleration rate used on wide-range speed operation. When the turbine is on operator automatic control, this value is entered by the operator, and may be changed from the keyboard. However, when the turbine is being accelerated by an AUTOMATIC STARTUP program, the displayed value is the rate selected by this program and cannot be changed from the keyboard. Any attempt to do so is flashed as an invalid request.

3. LOAD RATE—This button initiates a display or change of the load rate used on operator automatic control. This value may be displayed or changed at any time.

4. LOW LIMIT—This button is an optional feature which initiates a display or change of the low load limit used on all automatic load control modes. This value may be displayed or changed at any time.

5. HIGH LIMIT—This button is an optional feature which initiates a display or change of the high load limit used on all automatic load control modes. This value may be changed at any time.

Each of these buttons have high or low limits, whichever is appropriate, associated with them when changes are to be made in the values discussed above. Violation of these limits from a keyboard entry is flashed as an invalid request and the entry is ignored. More details of these limits are discussed in a later section where the KEYBOARD program is described.

6. VALVE POSITION LIMIT—This button initiates a display of the governor valve position limit and the quantity being limited. Change or adjustment of the valve position limit is accomplished by raise/lower buttons (described in a later section where the valve buttons are discussed). Any attempt to enter values from the keyboard in this display mode is flashed as an invalid request.

7. VALVE STATUS—This button initiates a display of the status (position) of the turbine throttle and governor valves. Thus, this button is associated with a group of DEH system variables. A description of the steps necessary to carry out this display function is given in later paragraphs (where the valve buttons are discussed).

8. TURBINE PROGRAM DISPLAY—This button initiates a display or change of any DEH system parameter not otherwise addressable with one of the unique buttons described above. These variables include pressures, temperatures, control system tuning constants, and calculated quantities in all parts of the DEH system. A dictionary is provided so that the address of such quantities may be entered from the keyboard. Further discussion of these points is given in later paragraphs where the keyboard is described.

9. GO—This button initiates a special DEH CONTROL program to adjust the turbine reference. The program ultimately positions the valves on operator automatic control. The reference then moves at the appropriate load or acceleration rate until the reference and demand are equal. The updated reference value is continually displayed in the REFERENCE windows so that the operator may observe it changing to meet the demand, which is displayed in the DEMAND windows.

10. HOLD—This button interrupts the reference adjustment process described above, and holds the reference at the value existing at the moment the HOLD button is pressed. In order to continue the adjustment process on the reference, the operator must press the GO button.

A brief description of the steps necessary to display or change any of the first six variables discussed above follows; description of cases 7 and 8 are withheld until a later section. When the operator wishes to display or change any of the DEH dedicated system parameters, he must execute a sequence of steps which result in the desired action. The steps are listed as follows:

1. The operator presses the appropriate button; the DEH programs display the current value of the parameter in the reference windows while the demand windows are cleared to allow for possible keyboard entry.
2. If the operator wishes only to observe the parameter value, then he does nothing else. The value remains in the reference windows until some new button is pressed.
3. If the operator wishes to change the parameter, he types in on the keyboard the new value which he desires. This is displayed in the DEMAND windows, but will not yet be entered into the DEH programs.
4. If the operator is satisfied with the new value as it appears in the demand windows, he may enter the new quantity into the DEH operating system by pressing the ENTER button. The ENTER button is described in more detail in a later section on the keyboard.
5. If for any reason the operator is not satisfied with the value as it appears in the demand windows, he may press the CANCEL button. The CANCEL button will be described in more detail in a later section on the keyboard. This removes the number from the DEMAND windows and allows the operator to begin a new sequence for the parameter.
6. Assuming that the operator is satisfied with the number and that he presses the ENTER button, the new value of the parameter appears in the REFERENCE window and the DEMAND window is cleared. This is an acknowledgment that the DEH programs have accepted the number and are using the new value from that point on.
7. If for any reason the numerical value entered into the DEH system violates preprogrammed conditions (such as high limits less than low limits), the entire operation is aborted and the INVALID REQUEST lamp is flashed.

The above description of data manipulation is modified somewhat when the operator wishes to display or change the turbine reference and demand. Both of these quantities are displayed when the reference button is pressed. During wide-range speed control, the left REFERENCE display contains the turbine speed reference value, while the right DEMAND display contains the turbine speed demand. During load control the REFERENCE display contains the turbine load reference while the demand display contains the turbine load demand.

Since the reference and demand control the turbine valves directly, it is essential that the operator have a unique handle on these quantities so that he may start or stop reference changes quickly and easily. This is accomplished by use of the GO and HOLD buttons in conjunction with the reference button. The GO and HOLD buttons control two reference states in the DEH system, which indicate whether the reference and demand are equal or unequal. When these quantities are equal, both the GO and HOLD backlights are off. When these quantities are unequal, either the GO or the HOLD lamp is on. If the GO light is turned on, the reference is changing to meet the demand value at the selected rate. Should the operator wish to stop the reference adjustment process, he simply presses the HOLD button. The HOLD button then backlights and holds the reference at its current value. When the operator wishes to start the reference moving again, he must press the GO button, which then backlights and enables the reference to adjust to the proper value.

The sequence of steps for displaying or changing the reference follows:

1. The operator presses the reference button. The DEH programs display the current value of reference in the left windows and the current value of demand in the right windows.
2. If the operator wishes to change the demand, he types the new value on the keyboard. This is displayed in the DEMAND windows, but is not yet entered into the DEH programs.
3. If the operator is satisfied with the new value, he presses the ENTER button. This places the new demand value in the DEH programs and turns the HOLD lamp, assuming that the new demand satisfies certain limit checks to be described shortly. If these conditions are not met, the INVALID REQUEST lamp is flashed, the new value is ignored, and the original value is returned to the DEMAND windows.
4. If the operator is not satisfied with the new value (set in Step 3), he simply presses the CANCEL button. The DEH programs then ignore this value and return the original value to the DEMAND windows.
5. If a new demand is finally entered and the HOLD lamp comes on, the operator may start the reference adjusting to this new demand by pressing the GO button. The HOLD lamp is turned off, the GO lamp is turned on, and the reference begins to move at the selected rate toward the demand.
6. At any time, the operator may inhibit the reference adjustment by pressing the HOLD button. He may then restart the reference adjustment by pressing the GO button.
7. When the reference finally equals the demand both the GO and HOLD lamps will be turned off.

Each of the eight display buttons set the integer pointer (IPBX) to its assigned value and the appropriate panel lamps are turned off and on. IPBX is then checked by the VISUAL DISPLAY task, which selects the numerical values from computer memory and displays then in the windows.

The TURBINE PROGRAM DISPLAY button also resets a few logical states in preparation for keyboard entries. These are discussed in later paragraphs on the keyboard description. The remote control modes AS, ADS and ATS for the Automatic Synchronizer, Dispatch System and TURBINE STARTUP program are checked, along with the manual control state (TM) if the maintenance test switch (OPRT) is not set. All of these modes exclude the possibility of the GO and HOLD buttons being active, so these buttons are ignored in these states and the PANEL program simply exits. However on operator automatic control, the HOLD button state (HOLDPB) is set, or the GO button state (GOPB) is set. In the latter case, HOLDPB is also reset. The LOGIC task is requested to The LOGIC task is requested to run by setting the RUNLOGIC variable, and the program then exits.

LCCO SUBROUTINE

The subroutine is called only by the LOGIC task and thus is not reentrant. Arguments to the LCCO subroutine include three variables which indicate the appropriate action to be taken, and a pointer to a table of contact output words and bits which define the hardware connections for the quantities which must be set or reset.

The LCCO subroutine is designed so that a call from the LOGIC task provides a list of the variables necessary to evaluate whether or not contact outputs should be actuated and, if so, whether they should be set or reset. Not all calls to LCCO involve the logical pushbutton state; in those cases this argument (LVIPB) is a dummy which satisfies the calling sequence but accomplishes no other significant action. An exclusive-OR test is made on LV and LVX; if they are alike, no further action is taken. If they are different, this means contact outputs must be actuated.

The LCCO program size is 68 words and the data pool size is 92 words for a required storage of 160 locations. The program is normally linked separately and loaded into the computer through the tape reader. The core area assigned to LCCO is $(18D0$ to $196F)_{16}$; this is $AO_{16}(160_{10})$ locations, which is exactly that required by the subroutine.

Maintenance Test

The MAINTENANCE TEST system is activated by a two-position key-lock switch on the Operator's Panel. The function of this switch is to allow tuning or adjusting of certain constants in the DEH Control System, or to allow operation of the DEH system in a simulation mode for training purposes. When such tests are to be performed, the maintenance test key is moved to the right position; this immediately switches the turbine to manual control by a wired connection and sets a contact input to the DEH system. The LOGIC task then reacts in three ways: first, a contact output is set which turns on a monitor lamp above and to the right of the maintenance test switch; second, another contact output is set which requests transfer to manual as a backup to the wired connection; and third, the manual-tracking portion of the DEH Control System is disabled.

When the maintenance test action is completed and the test switch returned to the off position, the LOGIC task resets the two contact outputs to turn off the maintenance test lamp and to release the request for manual control. In addition, this part of the program enables the manual-tracking system by resetting the turbine REFERENCE and DEMAND to zero and allowing the normal control programs to run.

Keyboard Activity

There are fourteen buttons associated with keyboard activity on the DEH Operator's Panel. Of this total, eleven are numerical keys; these include the integers 0 through 9 and a decimal point. Three additional buttons are available for use with the keyboard to aid in data display or change. A brief description of these buttons follows:

1. NUMERICAL BUTTONS 0 THROUGH 9—When the operator keys in numbers of these buttons, the corresponding values are displayed in the reference or demand windows, whichever are appropriate, for the function being performed. The values move from right to left in the windows as new keys are pressed, and both leading and trailing zeros are always displayed. If more than four numerical keys are pressed, the left-most value in the windows is lost as the new value is entered in the right-most window, and the remaining values shift left one position.
2. DECIMAL POINT BUTTON—When the decimal point key is pressed, the PANEL program retains this information but does not yet display it. When the next numerical key is pressed, both the value and the decimal point appear in the right-most window. The decimal point is positioned in the lower left-hand corner of the window position. Should additional numerical keys be pressed, the decimal point moves one position to the left with the number with which it was originally entered. Should the decimal point be shifted out of the left-most window it is lost, and a new point may be entered.
3. ENTER—When this button is pressed, the PANEL program enters the value residing in the reference or demand windows, whichever is appropriate, into core memory and performs the correct action requested by the keyboard activity. This action may consist of visual display, parameter change, or intermediate steps in a sequence of operations as described in preceding sections.
4. CANCEL—When this button is pressed, the PANEL program clears both the reference and demand windows, deletes any intermediate values in computer memory, and aborts the entire sequence of operations which was canceled. The operator may then begin a new sequence of steps.
5. CHANGE—This button indicates a sequence of operations necessary to alter numerical values residing in the DEH system memory. The steps necessary to change parameters are described earlier.

The decimal point key and keys 0–9 are serviced to check the validity of the requested entry and to set the entry if it is valid. Among other checks, a check is made on the integer IPBX, which represents the visual display and change button which has been previously pressed. If this value equals 2, thus indicating the acceleration rate button has been pressed, and the Automatic Turbine Startup mode (ATS) is in control, all keyboard buttons are invalid. During the ATS mode the acceleration rate is controlled by the startup program, and thus may be visually displayed but cannot be changed from the keyboard.

Should the ATS state be satisfied, the pointer IPBX is checked to determine if it is equal to 6; if so, the keyboard entry is flashed as invalid because this represents the valve position limit display mode, which cannot use the keyboard. If this situation is all right, the valve test button state (VTESTPB) is checked; should VTESTPB be set and the valve being tested NVTEST is non-zero, the keyboard entry is invalid. This is because NVTEST indicates that some valve has already been selected for test, thus implying that no further keyboard activity is necessary.

Finally, some special tests are made if IPBX equals 1; this means the reference display mode has been selected. If this is the case, all remote control modes such as Automatic Synchronizer (AS), Automatic Dispatch System (ADS), and Automatic Turbine Startup (ATS), imply that the keyboard cannot be used during reference display. Thus these result in the INVALID REQUEST lamp being flashed. In addition, should the turbine be on manual control (TM) or unlatched (NOT ASL), and not in the maintenance test mode (OPRT), then keyboard activity is also invalid during reference display. All of these cases are invalid for keyboard entry because the turbine demand and reference are set by the remote mode or the manual tracking system. The only time that the operator may use the keyboard in the reference display mode is during operator automatic control or during the maintenance test condition in which the DEH system is being used as a simulator and trainer.

Should all of these tests be passed properly, the logical state KEYENTRY is set and the numerical value in location KEY is checked. This is the keyboard button which has just been pressed, and must lie between 0 and 9 inclusive; otherwise, the entry is flashed as invalid. For a valid value of KEY, the program then places the new number in its proper position in the integer array (IW). This array has a place for each of the four window positions of the visual display and, as keyboard buttons are pressed, the entries move down one position in IW and the latest key is entered in the top position. The pointer ID maintains the proper position for each new key. Thus, if ID equals 0, this means there are no entries in the array IW. The value KEY is thus placed in the first position of IW. However, if ID is not zero, then a FORTRAN DO loop is executed to move the entries in IW down one position prior to entering the new value of key in the first position at statement 414. Then the value of the pointer ID is checked again; if it is less than 3, it is incremented by 1. If it is equal to 3, it retains that value. This is the mechanism used to accept more than four keyboard values with only the last four key entries being retained.

ANALOG BACKUP SYSTEM

Throttle Valve Control (Applicable Only to Units with Steam Chest Inlet Configurations)

Throttle valves are used on wide-range speed control from turning gear to approximately 90 percent of rated speed. From this point to full rated speed, governor valves are used for control.

When the DEH Control System is in the Operator Automatic mode of operation, the control signal from the computer analog output card (TVAAZ1) is permitted to control the throttle valves, through the Servo-/Linear Variable Differential Transformer (S/LVDT) Cards. The Analog Backup System tracks the computer output.

To accomplish this tracking, the analog comparator compares the TVAAZ1 signal to the output of digital-to-analog (D/A) converter (TVMAZ1). If TVAAZ1 exceeds TVMAZ1, the comparator generates a raise signal. This signal causes the up/down counter to count up at a preset rate and increase its digital output. The digital-to-analog (D/A) converter output (TVMAZ1) increases until it equals TVAAZ1. Thus the Analog Backup System continuously tracks signal TVAAZ1, when the DEH Control System is in the Operator Automatic mode.

When the DEH Control System is in the Turbine Manual mode of operation, the analog output (TVMAZ2) controls the throttle valves through the S/LVDT Cards; the computer output (TVAAZ2) is blocked. The auto/manual logic circuitry blocks the analog comparator output and allows the TV RAISE and TV LOWER pushbuttons on the Operator B Panel to control the up/down counter. Pressing the TV RAISE button causes the up/down counter to count up at a slow rate. If the FAST ACTION pushbutton is pressed at the same time however, a faster rate is selected. The up/down counter output is converted to an analog output and used to control the throttle valves (TVMAZ2). With the DEH Control System in the Turbine Manual mode, the digital portion tracks the analog output with a computer software program.

In summary, when the system is in the Operator Automatic mode, the Analog Backup System tracks the computer output. When the system goes to the Turbine Manual mode, the analog system output equals the computer output and the transfer is made without moving the throttle valves (bumpless transfer). While the system is in the Turbine Manual, the TV RAISE and TV LOWER pushbuttons control the throttle valve position and the digital portion tracks the analog system output. If the system is put back in the Operator Automatic mode, the transfer is made without a bump.

Governor Valve Control

Governor valves are used for speed and load control. If there are separate valve actuators for each valve, the DEH Control System may be in either single valve or sequential valve operation.

There are two types of inputs to the S/LVDT Cards. One type is the sequential valve inputs (GV1AZ1, GV2AZ1); these signals are generated independently of the Analog Backup System. The second type of input (GV*AZ1) is the single valve input; this input is generated either by the computer (GVAAZ2) or by the analog system (GVMAZ2).

When the system is in single valve operation (or when sequential valve operation is not supplied), the sequential valve inputs to the S/LVDT Cards are zero. The GV*AZ1 signal controls the governor valves. Except for the fact that the analog output is biased so that positive and negative values can be obtained, the governor valve control circuits are the same as the throttle valve control circuits previously discussed.

The Analog Backup System tracks the computer output (GVAAZ1) when the control system is in the Operator Automatic mode. The analog system is controlled by the GV RAISE and GV LOWER pushbuttons when the control system is in the Turbine Manual mode and the computer tracks the analog output. The control signal (GV*AZ1) goes to all S/LVDT Cards; all valves move the same amount at the same time.

When the control system is in sequential valve operation (and in the Operator Automatic mode), the sequential inputs (GV1AZ1, GV2AZ1) are controlled by the computer. The computer also sets the single valve input (GV*AZ1) to zero. The computer then uses the sequential inputs to individually control the governor valves.

If the control system transfers to the Turbine Manual mode while in sequential valve operation, the computer keeps the sequential valve input signals (GV1AZ1, GV2AZ1) constant. Bumpless transfer occurs since the governor valves do not move. When the transfer is complete, the operator can position the valves with the GV RAISE and GV LOWER pushbuttons. Pressing the GV RAISE pushbutton increases the output of the D/A converter (GVMAZ) and thus increases the single valve input signal (GV*AZ1). GV*AZ1 is summed with the sequential input signals (GV1AZ1 and GV2AZ1); this increases the output of the S/LVDT Cards, and opens all the valves by the same amount.

If the GV LOWER pushbutton is pressed, the single valve input signal (GV*AZ1) is decreased. This signal is summed with the sequential input signals, causes a decrease in S/LVDT Card output, and closes all the valves by the same amount. The up/down counter counts below its mid range and causes the D/A converter output (GVMAZ1) to go negative. This feature allows the valves to be closed, even though the sequential valve input remains constant.

The digital system continuously tracks the single valve input (GV*AZ1) with a computer software program. When transfer to Operator Automatic is initiated (by pressing the OPER AUTO pushbutton), transfer occurs without changing the valve position (bumpless transfer).

In summary, for units with individual servos, the governor valves can operate in either the single valve or sequential valve mode. In either case, the Analog Backup System tracks the computer generated single valve output signal when in Operator Automatic mode, and positions the valves when in Turbine Manual mode.

APPENDIX 1

Glossary of Variable and Parameter Designations for Flowcharts, etc. - Alphabetical Listing

| NAME | TYPE | CORE LOC. | KEYBOARD ADR. | AREA | FUNCTION |
|---|---|---|---|---|---|
| A11X |  | 0F20 |  | LIBRARY | FLOATING ADD FUNCTION |
| ABS |  | 0F0D |  | LIBRARY | ABSOLUTE VALUE FUNCTION |
| ADS | L | 1357 | 1472 | ZETA | LOGICAL STATE |
| ADSDEC | L | 138C | 1525 | ZETA | LOGICAL STATE |
| ADSDOWN | L | 118C | 1013 | ALPHA | CONTACT INPUT |
| ADSDOWNX | L | 1370 | 1497 | ZETA | LOGICAL STATE |
| ADSINC | L | 138B | 1524 | ZETA | LOGICAL STATE |
| ADSMAXT | R | 12A0 | 3145 | DELTA | KEYBOARD-ENTERED CONSTANT |

| | | | | | |
|---|---|---|---|---|---|
| ADSPB | L | 13D6 | 1599 | THETA | OPERATORS PANEL BUTTON STATE |
| ADSPERM | L | 118D | 1014 | ALPHA | CONTACT INPUT |
| ADSRATE | R | 127C | 3127 | DELTA | KEYBOARD-ENTERED CONSTANT |
| ADSUP | L | 118B | 1012 | ALPHA | CONTACT INPUT |
| ADSUPX | L | 136F | 1496 | ZETA | LOGICAL STATE |
| ADSX | L | 137D | 1510 | ZETA | LOGICAL STATE |
| AIDBMW | R | 1286 | 3132 | DELTA | KEYBOARD-ENTERED CONSTANT |
| AIDBPI | R | 1288 | 3133 | DELTA | KEYBOARD-ENTERED CONSTANT |
| AIFAILMW | L | 138F | 1528 | ZETA | LOGICAL STATE |
| AIFAILMX | L | 1391 | 1530 | ZETA | LOGICAL STATE |
| AIFAILPI | L | 1390 | 1529 | ZETA | LOGICAL STATE |
| AIFAILPX | L | 1392 | 1531 | ZETA | LOGICAL STATE |
| ALPHA | | 1180 | | ALPHA | LABELED COMMON |
| ANASPDF | L | 1396 | 1535 | ZETA | LOGICAL STATE |
| ANASPDFX | L | 1397 | 1536 | ZETA | LOGICAL STATE |
| ARF | | 3A82 | | LIBRARY | FORMATTED ARGUMENT TRANSFER |
| AS | L | 1356 | 1471 | ZETA | LOGICAL STATE |
| ASDEC | L | 138E | 1527 | ZETA | LOGICAL STATE |
| ASDOWN | L | 1187 | 1008 | ALPHA | CONTACT INPUT |
| ASDOWNX | L | 1362 | 1483 | ZETA | LOGICAL STATE |
| ASINC | L | 138D | 1526 | ZETA | LOGICAL STATE |
| ASL | L | 1190 | 1017 | ALPHA | CONTACT INPUT |
| ASLX | L | 135F | 1480 | ZETA | LOGICAL STATE |
| ASPB | L | 13D5 | 1598 | THETA | OPERATORS PANEL BUTTON STATE |
| ASPERM | L | 1188 | 1009 | ALPHA | CONTACT INPUT |
| ASUP | L | 1186 | 1007 | ALPHA | CONTACT INPUT |
| ASUPX | L | 1361 | 1482 | ZETA | LOGICAL STATE |
| ASX | L | 137C | 1509 | ZETA | LOGICAL STATE |
| ATS | L | 1389 | 1522 | ZETA | LOGICAL STATE |
| ATSSCAN | R | 129A | 3142 | DELTA | KEYBOARD-ENTERED CONSTANT |
| ATSX | L | 138A | 1523 | ZETA | LOGICAL STATE |
| AUTOSTAR | L | 13D0 | 1593 | THETA | OPERATORS PANEL BUTTON STATE |
| | | | | | |
| BETA | | 11AA | | BETA | LABELED COMMON |
| BGVC | R | 1246 | 3100 | DELTA | KEYBOARD-ENTERED CONSTANT |
| BGVO | R | 1244 | 3099 | DELTA | KEYBOARD-ENTERED CONSTANT |
| BINT(1) | R | 12CC | 3167 | DELTA | KEYBOARD-ENTERED CONSTANT |
| BINT(2) | R | 12CE | 3168 | DELTA | KEYBOARD-ENTERED CONSTANT |
| BINT(3) | R | 12D0 | 3169 | DELTA | KEYBOARD-ENTERED CONSTANT |
| BINT(4) | R | 12D2 | 3170 | DELTA | KEYBOARD-ENTERED CONSTANT |
| BINT(5) | R | 12D4 | 3171 | DELTA | KEYBOARD-ENTERED CONSTANT |
| BR | L | 1363 | 1484 | ZETA | LOGICAL STATE |
| BRX | L | 1364 | 1485 | ZETA | LOGICAL STATE |
| BTVC | R | 1252 | 3106 | DELTA | KEYBOARD-ENTERED CONSTANT |
| BTVO | R | 1242 | 3098 | DELTA | KEYBOARD-ENTERED CONSTANT |
| | | | | | |
| C01X | | 10B7 | | LIBRARY | INTEGER TO REAL FUNCTION |
| C02: | | 10B2 | | LIBRARY | INTEGER TO REAL CONVERSION |
| C10X | | 108A | | LIBRARY | REAL TO INTEGER FUNCTION |
| C20: | | 108A | | LIBRARY | REAL TO INTEGER CONVERSION |
| CADSDOWN | L | 136C | 1493 | ZETA | LOGICAL STATE |
| CADSUP | L | 136B | 1492 | ZETA | LOGICAL STATE |
| CCOMANOTRAK | L | 13B7 | 1568 | ETA | FLASHING FLAG |
| CCOREADY | L | 13B8 | 1569 | ETA | FLASHING FLAG |
| CCOREFHL | L | 13B5 | 1566 | ETA | FLASHING FLAG |
| CCOREFLL | L | 13B4 | 1565 | ETA | FLASHING FLAG |
| CCOVPLIM | L | 13B6 | 1567 | ETA | FLASHING FLAG |
| CDLDMD | R | 132A | 4214 | EPSILON | COMPUTED VARIABLE |
| CDLRATE | R | 1328 | 4213 | EPSILON | COMPUTED VARIABLE |
| CLOSEDB | R | 1240 | 3097 | DELTA | KEYBOARD-ENTERED CONSTANT |
| CLOSEPB | L | 13DA | 1603 | THETA | OPERATORS PANEL BUTTON STATE |
| CM1 | | 0F00 | | LIBRARY | REAL NEGATION FUNCTION |
| CM2 | | 0F00 | | LIBRARY | REAL NEGATION FUNCTION |
| CM3 | | 0F00 | | LIBRARY | REAL NEGATION FUNCTION |
| CRESETPB | L | 13C4 | 1581 | THETA | OPERATORS PANEL BUTTON STATE |
| | | | | | |
| D11X | | 0FA2 | | LIBRARY | FLOATING DIVIDE FUNCTION |
| DADR | L | 11B7 | 1056 | BETA | FLAG |
| DATENTRY | L | 11B3 | 1052 | BETA | FLAG |

| | | | | | |
|---|---|---|---|---|---|
| DBTRKL | R | 125E | 3112 | DELTA | KEYBOARD-ENTERED CONSTANT |
| DBTRKREF | R | 12A6 | 3148 | DELTA | KEYBOARD-ENTERED CONSTANT |
| DBTRKS | R | 1260 | 3113 | DELTA | KEYBOARD-ENTERED CONSTANT |
| DEC: | | 3AC7 | | LIBRARY | INITIATE DECODE - FORMATTER |
| DECPT | L | 11B5 | 1054 | BETA | FLAG |
| DELTA | | 1210 | | DELTA | LABELED COMMON |
| DEMAND | R | 12F4 | 4187 | EPSILON | COMPUTED VARIABLE |
| DIGSPDF | L | 1394 | 1533 | ZETA | LOGICAL STATE |
| DIGSPDFX | L | 1395 | 1534 | ZETA | LOGICAL STATE |
| DLINK | L | 13D3 | 1596 | THETA | OPERATORS PANEL BUTTON STATE |
| | | | | | |
| ENC: | | 3AC3 | | LIBRARY | INITIATE ENCODE - FORMATTER |
| EPSILON | | 12E0 | | EPSILON | LABELED COMMON |
| ETA | | 13A0 | | ETA | LABELED COMMON |
| EXIT | | 09B2 | | MONITOR | PROGRAM EXIT HANDLER |
| | | | | | |
| FF | | | | LOGIC TASK | FLIPFLOP FUNCTION |
| FLGWRD | I | 11AC | 2045 | BETA | FLAG |
| FOLAG | | | | CONTROL TASK | FIRST ORDER LAG FUNCTION |
| | | | | | |
| GAMMA | | 11E0 | | GAMMA | LABELED COMMON |
| GC | L | 1350 | 1465 | ZETA | LOGICAL STATE |
| GCX | L | 1381 | 1514 | ZETA | LOGICAL STATE |
| GL2 | R | 1232 | 3090 | DELTA | KEYBOARD-ENTERED CONSTANT |
| GL3 | R | 1234 | 3091 | DELTA | KEYBOARD-ENTERED CONSTANT |
| GO | L | 1359 | 1474 | ZETA | LOGICAL STATE |
| GOHOLDOF | L | 137B | 1508 | ZETA | LOGICAL STATE |
| GOPB | L | 13CB | 1588 | THETA | OPERATORS PANEL BUTTON STATE |
| GOT: | | 10D7 | | LIBRARY | COMPUTED GO TO FUNCTION |
| GOX | L | 135A | 1475 | ZETA | LOGICAL STATE |
| GR1 | R | 1262 | 3114 | DELTA | KEYBOARD-ENTERED CONSTANT |
| GR2 | R | 1264 | 3115 | DELTA | KEYBOARD-ENTERED CONSTANT |
| GR3 | R | 1266 | 3116 | DELTA | KEYBOARD-ENTERED CONSTANT |
| GR4 | R | 1268 | 3117 | DELTA | KEYBOARD-ENTERED CONSTANT |
| GR5 | R | 126A | 3118 | DELTA | KEYBOARD-ENTERED CONSTANT |
| GR6 | R | 126C | 3119 | DELTA | KEYBOARD-ENTERED CONSTANT |
| GR7 | R | 126E | 3120 | DELTA | KEYBOARD-ENTERED CONSTANT |
| GR8 | R | 1270 | 3121 | DELTA | KEYBOARD-ENTERED CONSTANT |
| GR9 | R | 1272 | 3122 | DELTA | KEYBOARD-ENTERED CONSTANT |
| GR10 | R | 1274 | 3123 | DELTA | KEYBOARD-ENTERED CONSTANT |
| GS1 | R | 122E | 3088 | DELTA | KEYBOARD-ENTERED CONSTANT |
| GS2 | R | 128A | 3134 | DELTA | KEYBOARD-ENTERED CONSTANT |
| GV | L | 13CE | 1591 | THETA | OPERATORS PANEL BUTTON STATE |
| GVBIAS | R | 130C | 4199 | EPSILON | COMPUTED VARIABLE |
| GVCONT | L | 13A7 | 1552 | ETA | FLASHING FLAG |
| GVDB | R | 1278 | 3125 | DELTA | KEYBOARD-ENTERED CONSTANT |
| GVINIT | R | 128E | 3136 | DELTA | KEYBOARD-ENTERED CONSTANT |
| GVMAX | L | 137A | 1507 | ZETA | LOGICAL STATE |
| GVMIN | L | 1379 | 1506 | ZETA | LOGICAL STATE |
| GVPOS | R | 1136 | 4220 | EPSILON | COMPUTED VARIABLE |
| GVSP | R | 130A | 4198 | EPSILON | COMPUTED VARIABLE |
| GVSPMIN | R | 124E | 3104 | DELTA | KEYBOARD-ENTERED CONSTANT |
| | | | | | |
| HEL | R | 122A | 3086 | DELTA | KEYBOARD-ENTERED CONSTANT |
| HLF | R | 1228 | 3085 | DELTA | KEYBOARD-ENTERED CONSTANT |
| HLL | R | 12E8 | 4181 | EPSILON | COMPUTED VARIABLE |
| HLLMAX | R | 1218 | 3077 | DELTA | KEYBOARD-ENTERED CONSTANT |
| HLS | R | 1226 | 3084 | DELTA | KEYBOARD-ENTERED CONSTANT |
| HOLD | L | 135C | 1477 | ZETA | LOGICAL STATE |
| HOLDCP | L | 1358 | 1473 | ZETA | LOGICAL STATE |
| HOLDPB | L | 13CA | 1587 | THETA | OPERATORS PANEL BUTTON STATE |
| HOLDX | L | 135D | 1478 | ZETA | LOGICAL STATE |
| | | | | | |
| IADSDOWN | I | 11B9 | 2058 | BETA | COUNTER |
| IADSUP | I | 11B8 | 2057 | BETA | COUNTER |
| ICC01 | I | 11BD | 2062 | BETA | COUNTER |

| | | | | | |
|---|---|---|---|---|---|
| ICC02 | I | 11BE | 2063 | BETA | COUNTER |
| ICOUNTER(1) | I | 11C8 | 2073 | BETA | COUNTER |
| ICOUNTER(2) | I | 11C9 | 2074 | BETA | COUNTER |
| ICOUNTER(3) | I | 11CA | 2075 | BETA | COUNTER |
| ICOUNTER(4) | I | 11CB | 2076 | BETA | COUNTER |
| ICOUNTER(5) | I | 11CC | 2077 | BETA | COUNTER |
| ICOURSE | I | 11BF | 2064 | BETA | COUNTER |
| IDPT | I | 11B6 | 2055 | BETA | COUNTER |
| IDUTY | I | 11C6 | 2071 | BETA | COUNTER |
| IFINE | I | 11C0 | 2065 | BETA | COUNTER |
| IGV1SS | I | 11FE | 2127 | GAMMA | ANALOG INPUT |
| IGV2SS | I | 11FF | 2128 | GAMMA | ANALOG INPUT |
| IGV3SS | I | 1200 | 2129 | GAMMA | ANALOG INPUT |
| IGV4SS | I | 1201 | 2130 | GAMMA | ANALOG INPUT |
| IGV5SS | I | 1202 | 2131 | GAMMA | ANALOG INPUT |
| IGV6SS | I | 1203 | 2132 | GAMMA | ANALOG INPUT |
| IGV7SS | I | 1204 | 2133 | GAMMA | ANALOG INPUT |
| IGV8SS | I | 1205 | 2134 | GAMMA | ANALOG INPUT |
| IGVA0 | I | 11F5 | 2118 | GAMMA | ANALOG INPUT |
| IGVCOM | I | 11F6 | 2119 | GAMMA | ANALOG INPUT |
| IGVMAN | I | 11F4 | 2117 | GAMMA | ANALOG INPUT |
| INDEX1 | I | 11AE | 2047 | BETA | COUNTER |
| INDEX2 | I | 11AF | 2048 | BETA | COUNTER |
| INDEX3 | I | 11B2 | 2051 | BETA | COUNTER |
| INDEX11 | I | | | PANEL TASK | COUNTER |
| INTSCAN | I | 11C5 | 2070 | BETA | COUNTER |
| INVREQ | L | 13A8 | 1553 | ETA | FLASHING FLAG |
| INVREQX | L | 13B2 | 1563 | ETA | FLASHING FLAG |
| IOLDCT | I | 11C1 | 2066 | BETA | COUNTER |
| IPB | I | 11AA | 2043 | BETA | COUNTER |
| IPBX | I | 11AB | 2044 | BETA | COUNTER |
| IPI | L | 136D | 1494 | ZETA | LOGICAL STATE |
| IPIPB | L | 13C1 | 1578 | THETA | OPERATORS PANEL BUTTON STATE |
| IPIX | L | 136E | 1495 | ZETA | LOGICAL STATE |
| ISCAN | I | 11C2 | 2067 | BETA | COUNTER |
| ISICOUNT | I | 11BA | 2059 | BETA | COUNTER |
| ISPCOUNT | I | 11B4 | 2053 | BETA | COUNTER |
| ITESTA0 | I | 1206 | 2135 | GAMMA | ANALOG INPUT |
| ITF | I | 11BC | 2061 | BETA | FLAG |
| ITIME | I | 11CD | 2078 | BETA | COUNTER |
| ITV1SS | I | 11FA | 2123 | GAMMA | ANALOG INPUT |
| ITV2SS | I | 11FB | 2124 | GAMMA | ANALOG INPUT |
| ITV3SS | I | 11FC | 2125 | GAMMA | ANALOG INPUT |
| ITV4SS | I | 11FD | 2126 | GAMMA | ANALOG INPUT |
| ITVA0 | I | 11F8 | 2121 | GAMMA | ANALOG INPUT |
| ITVCOM | I | 11F9 | 2122 | GAMMA | ANALOG INPUT |
| ITVMAN | I | 11F7 | 2120 | GAMMA | ANALOG INPUT |
| IVPL | I | 11BB | 2060 | BETA | COUNTER |
| IWINDOW | I | 11B0 | 2049 | BETA | COUNTER |
| | | | | | |
| LCC0 | | 18C0 | | LOGIC TASK | PANEL/STATUS CCO SUBROUTINE |
| LDBX | | 1071 | | LIBRARY | LOAD BIT FUNCTION |
| LEL | R | 122C | 3087 | DELTA | KEYBOARD-ENTERED CONSTANT |
| LLL | R | 12E6 | 4180 | EPSILON | COMPUTED VARIABLE |
| LLLRP | L | 1366 | 1487 | ZETA | LOGICAL STATE |
| LLLMIN | R | 1216 | 3076 | DELTA | KEYBOARD-ENTERED CONSTANT |
| LLX | L | 1367 | 1488 | ZETA | LOGICAL STATE |
| | | | | | |
| M11X | | 0F9F | | LIBRARY | FLOATING MULTIPLY FUNCTION |
| M:AB | | 09B8 | | MONITOR | TASK ABLE HANDLER |
| M:ANI | | 0579 | | MONITOR | ANALOG INPUT HANDLER |
| M:CCO | | 07F7 | | MONITOR | CONTACT OUTPUT HANDLER |
| M:DA | | 09AC | | MONITOR | TASK DISABLE HANDLER |
| M:HT | | 090C | | MONITOR | TASK HALT HANDLER |
| M:IN | | 09CD | | MONITOR | TASK INITIATE (BID) HANDLER |
| M:SPNADJ | | 06B1 | | MONITOR | VIDAR SPAN/ADJUST HANDLER |
| M:TD | | 08F6 | | MONITOR | TIME DELAY HANDLER |
| MANSTRAK | L | 13A3 | 1548 | ETA | FLASHING FLAG |
| MANSTRAKX | L | 13AD | 1558 | ETA | FLASHING FLAG |

| | | | | | |
|---|---|---|---|---|---|
| MANTPC | L | 1184 | 1005 | ALPHA | CONTACT INPUT |
| MANTPCX | L | 139C | 1541 | ZETA | LOGICAL STATE |
| MGB | L | 1185 | 1006 | ALPHA | CONTACT INPUT |
| MGBX | L | 1360 | 1481 | ZETA | LOGICAL STATE |
| MON24V | L | 1195 | 1022 | ALPHA | CONTACT INPUT |
| MON24VX | L | 1377 | 1504 | ZETA | LOGICAL STATE |
| MONOPCT | L | 1194 | 1021 | ALPHA | CONTACT INPUT |
| MW | R | 11E0 | 4049 | GAMMA | ANALOG INPUT |
| MWI | L | 1371 | 1498 | ZETA | LOGICAL STATE |
| MWINIT | R | 124A | 3102 | DELTA | KEYBOARD-ENTERED CONSTANT |
| MWIPB | L | 13C3 | 1580 | THETA | OPERATORS PANEL BUTTON STATE |
| MWIX | L | 1372 | 1499 | ZETA | LOGICAL STATE |
| MWMAX | R | 1292 | 3138 | DELTA | KEYBOARD-ENTERED CONSTANT |
| MWTF | L | 1183 | 1004 | ALPHA | CONTACT INPUT |
| | | | | | |
| NDF | | 3A67 | | LIBRARY | TERMINATE FORMATTED RECORD |
| NOMINS | I | 11C7 | 2072 | BETA | COUNTER |
| NSYNC1 | I | 11C3 | 2068 | BETA | COUNTER |
| NSYNC2 | I | 11C4 | 2069 | BETA | COUNTER |
| NVTEST | I | 11AD | 2046 | BETA | COUNTER |
| | | | | | |
| OA | L | 1354 | 1469 | ZETA | LOGICAL STATE |
| OACCRATE | R | 12E2 | 4178 | EPSILON | COMPUTED VARIABLE |
| OALITE | L | 137E | 1511 | ZETA | LOGICAL STATE |
| OALITEX | L | 1387 | 1520 | ZETA | LOGICAL STATE |
| OARATMAX | R | 1212 | 3074 | DELTA | KEYBOARD-ENTERED CONSTANT |
| OAX | L | 1355 | 1470 | ZETA | LOGICAL STATE |
| ODMD | R | 12E0 | 4177 | EPSILON | COMPUTED VARIABLE |
| ODMDLMAX | R | 1210 | 3073 | DELTA | KEYBOARD-ENTERED CONSTANT |
| OFFSET(1) | R | 1450 | 3361 | LAMBDA | KEYBOARD-ENTERED CONSTANT |
| OFFSET(2) | R | 1452 | 3362 | LAMBDA | KEYBOARD-ENTERED CONSTANT |
| OFFSET(3) | R | 1454 | 3363 | LAMBDA | KEYBOARD-ENTERED CONSTANT |
| OLDGVCON | L | 13B1 | 1562 | ETA | FLASHING FLAG |
| OLDREFHL | L | 13AB | 1556 | ETA | FLASHING FLAG |
| OLDREFLL | L | 13AA | 1555 | ETA | FLASHING FLAG |
| OLDTVCON | L | 13B0 | 1561 | ETA | FLASHING FLAG |
| OLDVPLIM | L | 13AC | 1557 | ETA | FLASHING FLAG |
| OLDVSTAT | L | 13AF | 1560 | ETA | FLASHING FLAG |
| OLRATE | R | 12E4 | 4179 | EPSILON | COMPUTED VARIABLE |
| OLRATMAX | R | 1214 | 3075 | DELTA | KEYBOARD-ENTERED CONSTANT |
| OPCOP | L | 1182 | 1003 | ALPHA | CONTACT INPUT |
| OPCOVSPD | L | 1199 | 1026 | ALPHA | CONTACT INPUT |
| OPCOVSPX | L | 1365 | 1486 | ZETA | LOGICAL STATE |
| OPCSPEED | R | 11E6 | 4052 | GAMMA | ANALOG INPUT |
| OPCTEST | L | 119A | 1027 | ALPHA | CONTACT INPUT |
| OPCTF | L | 1181 | 1002 | ALPHA | CONTACT INPUT |
| OPENPB | L | 13DB | 1604 | THETA | OPERATORS PANEL BUTTON STATE |
| OPRT | L | 119B | 1028 | ALPHA | CONTACT INPUT |
| OPRTX | L | 135B | 1476 | ZETA | LOGICAL STATE |
| | | | | | |
| PERCCI | R | 1298 | 3141 | DELTA | KEYBOARD-ENTERED CONSTANT |
| PERSCAN | L | 137F | 1512 | ZETA | LOGICAL STATE |
| PERSCANX | L | 1380 | 1513 | ZETA | LOGICAL STATE |
| PI | R | 11E2 | 4050 | GAMMA | ANALOG INPUT |
| PISP | R | 1304 | 4195 | EPSILON | COMPUTED VARIABLE |
| PLANTCCI | | 0120 | | SI INTERRUPT | SCAN PLANT CCI SUBROUTINE |
| PO | R | 11E4 | 4051 | GAMMA | ANALOG INPUT |
| POINT(1) | R | 1444 | 3355 | LAMBDA | KEYBOARD-ENTERED CONSTANT |
| POINT(2) | R | 1446 | 3356 | LAMBDA | KEYBOARD-ENTERED CONSTANT |
| POINT(3) | R | 1448 | 3357 | LAMBDA | KEYBOARD-ENTERED CONSTANT |
| POREF | R | 1254 | 3107 | DELTA | KEYBOARD-ENTERED CONSTANT |
| POS(1) | R | 13EC | 3311 | IOTA | KEYBOARD-ENTERED CONSTANT |
| POS(2) | R | 13EE | 3312 | IOTA | KEYBOARD-ENTERED CONSTANT |
| POS(3) | R | 13F0 | 3313 | IOTA | KEYBOARD-ENTERED CONSTANT |
| POS(4) | R | 13F2 | 3314 | IOTA | KEYBOARD-ENTERED CONSTANT |
| POS(5) | R | 13F4 | 3315 | IOTA | KEYBOARD-ENTERED CONSTANT |
| POS(6) | R | 13F6 | 3316 | IOTA | KEYBOARD-ENTERED CONSTANT |

| | | | | | |
|---|---|---|---|---|---|
| POSP | R | 123E | 3096 | DELTA | KEYBOARD-ENTERED CONSTANT |
| PRESET | | 26B0 | | CONTROL TASK | PI CONTROLLER SUBROUTINE |
| PRINT(1) | R | 145A | 3366 | LAMBDA | KEYBOARD-ENTERED CONSTANT |
| PRINT(2) | R | 145C | 3367 | LAMBDA | KEYBOARD-ENTERED CONSTANT |
| PRINT(3) | R | 145E | 3368 | LAMBDA | KEYBOARD-ENTERED CONSTANT |
| PRINT(4) | R | 1460 | 3369 | LAMBDA | KEYBOARD-ENTERED CONSTANT |
| PRINT(5) | R | 1462 | 3370 | LAMBDA | KEYBOARD-ENTERED CONSTANT |
| PRINT(6) | R | 1464 | 3371 | LAMBDA | KEYBOARD-ENTERED CONSTANT |
| PRINT(7) | R | 1466 | 3372 | LAMBDA | KEYBOARD-ENTERED CONSTANT |
| PRINT(8) | R | 1468 | 3373 | LAMBDA | KEYBOARD-ENTERED CONSTANT |
| PRINT(9) | R | 146A | 3374 | LAMBDA | KEYBOARD-ENTERED CONSTANT |
| PRINT(10) | R | 146C | 3375 | LAMBDA | KEYBOARD-ENTERED CONSTANT |
| PRINT(11) | R | 146E | 3376 | LAMBDA | KEYBOARD-ENTERED CONSTANT |
| | | | | | |
| RATE | R | 12F6 | 4188 | EPSILON | COMPUTED VARIABLE |
| RB | L | 1191 | 1018 | ALPHA | CONTACT INPUT |
| RBRATE | R | 127A | 3126 | DELTA | KEYBOARD-ENTERED CONSTANT |
| READY | L | 13A4 | 1549 | ETA | FLASHING FLAG |
| READYX | L | 13AE | 1559 | ETA | FLASHING FLAG |
| REI: | | 114B | | LIBRARY | INTEGER FUNCTION RETURN |
| REF | | 39EF | | LIBRARY | INITIATE FORMATTED READ |
| REF1 | R | 12FA | 4190 | EPSILON | COMPUTED VARIABLE |
| REF2 | R | 12FC | 4191 | EPSILON | COMPUTED VARIABLE |
| REFDMD | R | 12F8 | 4189 | EPSILON | COMPUTED VARIABLE |
| REFHLIM | L | 13A1 | 1546 | ETA | FLASHING FLAG |
| REFLLIM | L | 13A0 | 1545 | ETA | FLASHING FLAG |
| RER: | | 115A | | LIBRARY | REAL FUNCTION RETURN |
| RESMW | R | 1312 | 4202 | EPSILON | COMPUTED VARIABLE |
| RESMWX | R | 131E | 4208 | EPSILON | COMPUTED VARIABLE |
| RESPI | R | 1314 | 4203 | EPSILON | COMPUTED VARIABLE |
| RESPIX | R | 1320 | 4209 | EPSILON | COMPUTED VARIABLE |
| RESSPD | R | 1310 | 4201 | EPSILON | COMPUTED VARIABLE |
| RESSPDX | R | 1322 | 4210 | EPSILON | COMPUTED VARIABLE |
| RIB: | | 114C | | LIBRARY | INTEGER FUNCTION RETURN |
| RRB: | | 115B | | LIBRARY | REAL FUNCTION RETURN |
| RUNLOGIC | L | 1376 | 1503 | ZETA | LOGICAL STATE |
| RVPLL | L | 118F | 1016 | ALPHA | CONTACT INPUT |
| RVPLR | L | 118E | 1015 | ALPHA | CONTACT INPUT |
| | | | | | |
| PRINT(12) | R | 1470 | 3377 | LAMBDA | KEYBOARD-ENTERED CONSTANT |
| PRINT(13) | R | 1472 | 3378 | LAMBDA | KEYBOARD-ENTERED CONSTANT |
| PRINT(14) | R | 1474 | 3379 | LAMBDA | KEYBOARD-ENTERED CONSTANT |
| PRINT(15) | R | 1476 | 3380 | LAMBDA | KEYBOARD-ENTERED CONSTANT |
| PRINT(16) | R | 1478 | 3381 | LAMBDA | KEYBOARD-ENTERED CONSTANT |
| PRINT(17) | R | 147A | 3382 | LAMBDA | KEYBOARD-ENTERED CONSTANT |
| PRINT(18) | R | 147C | 3383 | LAMBDA | KEYBOARD-ENTERED CONSTANT |
| PRINT(19) | R | 147E | 3384 | LAMBDA | KEYBOARD-ENTERED CONSTANT |
| | | | | | |
| S11X | | 0F23 | | LIBRARY | FLOATING SUBTRACT FUNCTION |
| SAT: | | 10F1 | | LIBRARY | SUBPROGRAM ARGUMENT TRANSFER |
| SBT: | | 10F0 | | LIBRARY | SUBPROGRAM ARGUMENT TRANSFER |
| SEOPB | L | 13D1 | 1594 | THETA | OPERATORS PANEL BUTTON STATE |
| SFT: | | 110B | | LIBRARY | STATEMENT FUNCTION TRANSFER |
| SIMAX | R | 1294 | 3139 | DELTA | KEYBOARD-ENTERED CONSTANT |
| SIMMW | R | 1318 | 4205 | EPSILON | COMPUTED VARIABLE |
| SIMPI | R | 131A | 4206 | EPSILON | COMPUTED VARIABLE |
| SIMWS | R | 131C | 4207 | EPSILON | COMPUTED VARIABLE |
| SIO | L | 118A | 1011 | ALPHA | CONTACT INPUT |
| SLLLBP | L | 1388 | 1521 | ZETA | LOGICAL STATE |
| SLOPE(1) | R | 12B8 | 3157 | DELTA | KEYBOARD-ENTERED CONSTANT |
| SLOPE(2) | R | 12BA | 3158 | DELTA | KEYBOARD-ENTERED CONSTANT |
| SLOPE(3) | R | 12BC | 3159 | DELTA | KEYBOARD-ENTERED CONSTANT |
| SLOPE(4) | R | 12BE | 3160 | DELTA | KEYBOARD-ENTERED CONSTANT |
| SLOPE(5) | R | 12C0 | 3161 | DELTA | KEYBOARD-ENTERED CONSTANT |
| SP(1) | R | 13E0 | 3305 | IOTA | KEYBOARD-ENTERED CONSTANT |
| SP(2) | R | 13E2 | 3306 | IOTA | KEYBOARD-ENTERED CONSTANT |
| SP(3) | R | 13E4 | 3307 | IOTA | KEYBOARD-ENTERED CONSTANT |
| SP(4) | R | 13E6 | 3308 | IOTA | KEYBOARD-ENTERED CONSTANT |
| SP(5) | R | 13E8 | 3309 | IOTA | KEYBOARD-ENTERED CONSTANT |
| SP(6) | R | 13EA | 3310 | IOTA | KEYBOARD-ENTERED CONSTANT |
| SPAN(1) | R | 144A | 3358 | LAMBDA | KEYBOARD-ENTERED CONSTANT |
| SPAN(2) | R | 144C | 3359 | LAMBDA | KEYBOARD-ENTERED CONSTANT |
| SPAN(3) | R | 144E | 3360 | LAMBDA | KEYBOARD-ENTERED CONSTANT |

```
SPD         R    130E   4200   EPSILON        COMPUTED VARIABLE
SPDB        R    1280   3129   DELTA          KEYBOARD-ENTERED CONSTANT
SPDLOOP          2FB0          CONTROL TASK   SPEED FEEDBACK LOOP SUBROUTINE
SPDSP       R    12FE   4192   EPSILON        COMPUTED VARIABLE
SPI         L    1373   1500   ZETA           LOGICAL STATE
SPIPB       L    13C5   1582   THETA          OPERATORS PANEL BUTTON STATE
SPIX        L    1374   1501   ZETA           LOGICAL STATE
SPTF        L    1375   1502   ZETA           LOGICAL STATE
SPTFX       L    135E   1479   ZETA           LOGICAL STATE
STBX             1052          LIBRARY        STORE BIT FUNCTION
STM         L    1352   1467   ZETA           LOGICAL STATE
STMX        L    1353   1468   ZETA           LOGICAL STATE

T1          R    1238   3093   DELTA          KEYBOARD-ENTERED CONSTANT
T2          R    123A   3094   DELTA          KEYBOARD-ENTERED CONSTANT
T3          R    123C   3095   DELTA          KEYBOARD-ENTERED CONSTANT
T4          R    128C   3135   DELTA          KEYBOARD-ENTERED CONSTANT
TASDMD      R    1326   4212   EPSILON        COMPUTED VARIABLE
TASRATE     R    1324   4211   EPSILON        COMPUTED VARIABLE
TC          L    1351   1466   ZETA           LOGICAL STATE
TCLITE      L    1383   1516   ZETA           LOGICAL STATE
TCLITEX     L    1384   1517   ZETA           LOGICAL STATE
TESTAIMX    R    12A2   3146   DELTA          KEYBOARD-ENTERED CONSTANT
TESTAO      R    1316   4204   EPSILON        COMPUTED VARIABLE
THETA            13C0          THETA          LABELED COMMON
THI         L    1192   1019   ALPHA          CONTACT INPUT
TM          L    1193   1020   ALPHA          CONTACT INPUT
TMW         R    125A   3110   DELTA          KEYBOARD-ENTERED CONSTANT
TMX         L    139D   1542   ZETA           LOGICAL STATE
TPC         L    1368   1489   ZETA           LOGICAL STATE
TPCPB       L    13C7   1584   THETA          OPERATORS PANEL BUTTON STATE
TPCRATE     R    127E   3128   DELTA          KEYBOARD-ENTERED CONSTANT
TPCX        L    1369   1490   ZETA           LOGICAL STATE
TPI         R    125C   3111   DELTA          KEYBOARD-ENTERED CONSTANT
TPLIM       L    139A   1539   ZETA           LOGICAL STATE
TPLIMX      L    139B   1540   ZETA           LOGICAL STATE
TPTF        L    1180   1001   ALPHA          CONTACT INPUT
TRCOM       L    1385   1518   ZETA           LOGICAL STATE
TRCOMX      L    1386   1519   ZETA           LOGICAL STATE
TRPB        L    13C0   1577   ETA            FLASHING FLAG
TRTVGV      L    139E   1543   ZETA           LOGICAL STATE
TRTVGVX     L    139F   1544   ZETA           LOGICAL STATE
TSOFF       L    1398   1537   ZETA           LOGICAL STATE

VIDAROS     L    136A   1491   ZETA           LOGICAL STATE
VIDAROSX    L    1393   1532   ZETA           LOGICAL STATE
VPLIM       L    13A2   1547   ETA            FLASHING FLAG
VPLLPB      L    13D9   1602   THETA          OPERATORS PANEL BUTTON STATE
VPLRPB      L    13D8   1601   THETA          OPERATORS PANEL BUTTON STATE
VPOSL       R    12EA   4182   EPSILON        COMPUTED VARIABLE
VPOSLINC    R    124C   3103   DELTA          KEYBOARD-ENTERED CONSTANT
VPOSLMAX    R    121A   3078   DELTA          KEYBOARD-ENTERED CONSTANT
VSP         R    1306   4196   EPSILON        COMPUTED VARIABLE
VSTATCON    L    13A5   1550   ETA            FLASHING FLAG
VSTATUS     L    13CD   1590   THETA          OPERATORS PANEL BUTTON STATE
VTESTINC    R    1250   3105   DELTA          KEYBOARD-ENTERED CONSTANT
VTESTPB     L    13D2   1595   THETA          OPERATORS PANEL BUTTON STATE

TSOFFX      L    1399   1538   ZETA           LOGICAL STATE
TURBSPOF    L    13D4   1597   THETA          OPERATORS PANEL BUTTON STATE
TV          L    13CF   1592   THETA          OPERATORS PANEL BUTTON STATE
TVBIAS      R    1308   4197   EPSILON        COMPUTED VARIABLE
TVCONT      L    13A6   1551   ETA            FLASHING FLAG
TVDB        R    1276   3124   DELTA          KEYBOARD-ENTERED CONSTANT
TVMAX       L    1378   1505   ZETA           LOGICAL STATE
TVMIN       L    1382   1515   ZETA           LOGICAL STATE
TWS         R    1258   3109   DELTA          KEYBOARD-ENTERED CONSTANT
```

| | | | | | |
|---|---|---|---|---|---|
| X | R | 1300 | 4193 | EPSILON | COMPUTED VARIABLE |
| XIT: | | 1127 | | LIBRARY | INTEGER ARITHMETIC EXIT |
| XPERIOD | R | 1458 | 3365 | LAMBDA | KEYBOARD-ENTERED CONSTANT |
| XPRINT | R | 1456 | 3364 | LAMBDA | KEYBOARD-ENTERED CONSTANT |
| XTO: | | 1139 | | LIBRARY | REAL ARITHMETIC EXIT |
| XTIME | R | 1440 | 3353 | LAMBDA | KEYBOARD-ENTERED CONSTANT |
| XUPDATE | R | 1442 | 3354 | LAMBDA | KEYBOARD-ENTERED CONSTANT |
| | | | | | |
| WR | R | 1224 | 3083 | DELTA | KEYBOARD-ENTERED CONSTANT |
| WRF | | 39FE | | LIBRARY | INITIATE FORMATTED WRITE |
| WS | R | 1334 | 4219 | EPSILON | COMPUTED VARIABLE |
| WSCOURSE | R | 1330 | 4217 | EPSILON | COMPUTED VARIABLE |
| WSDIG | R | 132E | 4216 | EPSILON | COMPUTED VARIABLE |
| WSDIP | R | 1248 | 3101 | DELTA | KEYBOARD-ENTERED CONSTANT |
| WSERROR | R | 1236 | 3092 | DELTA | KEYBOARD-ENTERED CONSTANT |
| WSFINE | R | 1332 | 4218 | EPSILON | COMPUTED VARIABLE |
| WSHPSI | R | 11E8 | 4053 | GAMMA | ANALOG INPUT |
| WSMAX | R | 1284 | 3131 | DELTA | KEYBOARD-ENTERED CONSTANT |
| WSMAXAI | R | 12A4 | 3147 | DELTA | KEYBOARD-ENTERED CONSTANT |
| WSMIN | R | 1282 | 3130 | DELTA | KEYBOARD-ENTERED CONSTANT |
| WSREFMIN | R | 1296 | 3140 | DELTA | KEYBOARD-ENTERED CONSTANT |
| WSTRANS | R | 132C | 4215 | EPSILON | COMPUTED VARIABLE |
| WSWITCH | R | 1256 | 3108 | DELTA | KEYBOARD-ENTERED CONSTANT |
| | | | | | |
| ZETA | | 1350 | | ZETA | LABELED COMMON |
| | | | | | |
| Y | R | 1302 | 4194 | EPSILON | COMPUTED VARIABLE |

I claim:

1. A system for operating an electric power generating plant comprising a steam turbine, means including a steam generating system for supplying steam to said turbine, a generator driven by said turbine and adapted to generate a predetermined electrical load for network operation with other generators, said turbine including a plurality of turbine sections, a predetermined throttle valve arrangement, a predetermined governor valve arrangement, said throttle and governor valves disposed to control the flow of steam between said steam generating system and said turbine, a control system including an automatic control having means for controlling said governor and throttle valves to control the turbine speed in accordance with input speed and speed change rate demands, said speed controlling means including control elements and associated logic elements characterized with other registered system parameters, said automatic control system further including means for controlling said governor and throttle valves to control the turbine load in accordance with input load and load change rate demands, said load controlling means including control and associated logic elements characterized with other registered system parameters, said automatic control further including means for generating system protection signals in accordance with predetermined input variable signals and in accordance with other registered parameters, a control panel having means for selectively generating parameter value signals to change selectively the values of said other parameters, means for switchably coupling the parameter value signals to said automatic control and for registering the parameter value signals in said automatic control in place of the selected ones of said other parameters so as to restructure said automatic control to function in accordance with the selected ones of said other parameters, a manual backup control for said governor and throttle valves, means for transferring the operation of said control system from said automatic control to said manual backup control when said generating and coupling means are operated to register parameter changes, and means for disabling said generating and coupling means from registering parameter changes in said automatic control unless transfer has occurred to said manual backup control.

2. A power plant system as set forth in claim 1 wherein said other parameters include constants associated with said control elements and further include high and low limits for predetermined system variables.

3. A plant operating system as set forth in claim 1 wherein said other parameters include set points for predetermined variables associated with said control elements.

4. A plant operating system as set forth in claim 1 wherein said other parameters include alarm limits for predetermined variables associated with the turbine protection system.

5. A plant operating system as set forth in claim 1 wherein said automatic control includes a digital computer which includes said logic and control elements and further includes means for registering said other parameter values.

6. A steam turbine control system for a large electric power steam turbine which drives a generator to produce electric power through breaker means and which is provided with a plurality of turbine sections and a predetermined throttle valve arrangement and a predetermined governor valve arrangement, said system comprising an automatic control having means for controlling said governor and throttle valves to control the turbine speed in accordance with input speed and speed change rate demands, said speed controlling means including control elements and associated logic elements characterized with other registered system parameters, said automatic control system further including means for controlling said governor and throttle valves to control the turbine load in accordance with input load and load change rate demands, said load controlling means, including control and associated logic elements characterized with other registered system parameters, said automatic control further including means for generating system protection signals in accordance with predetermined input variable signals and in accordance with other registered parameters, a control panel having means for selectively generating parameter value signals to change selectively the values of said other parameters, means for switchably coupling the parameter value signals to said automatic control and for registering the parameter value signals in said automatic control in place of the selected ones of said other parameters so as to restructure said automatic control to function in accordance with the selected ones of said other parameters, a manual backup control for said governor and throttle valves, means for transferring the operation of said control system from said automatic control to said manual backup control when said generating and coupling means are operated to register parameter changes, and means for disabling said generating and coupling means from registering parameter changes in said automatic control unless transfer has occurred to said manual backup control.

7. A turbine control system as set forth in claim 6 wherein said automatic control includes a digital computer which includes said logic and control elements and further includes means for registering said other parameter values.

8. A turbine control system as set forth in claim 7 wherein said other parameters include constants associated with said control elements and further include high and low limits for predetermined system variables.

9. A turbine control system as set forth in claim 7 wherein said other parameters include set points for predetermined variables associated with said control elements.

10. A turbine control system as set forth in claim 7 wherein said other parameters include alarm limits for predtermined variables associated with the turbine protection system.

11. A turbine control system as set forth in claim 6 wherein means are provided for selectively sensing and displaying existing registered values of said other parameters, means are provided for displaying parameter values to be entered, and means are provided for rejecting parameter signals which fail to conform to predetermined validity requirements.

* * * * *